(12) United States Patent
Crichlow

(10) Patent No.: US 12,162,051 B2
(45) Date of Patent: Dec. 10, 2024

(54) DISPOSAL OF HIGH-LEVEL WASTE INTO DEEP SALT FORMATIONS

(71) Applicant: Henry Crichlow, Norman, OK (US)

(72) Inventor: Henry Crichlow, Norman, OK (US)

(*) Notice: Subject to any disclaimer, the term of this patent is extended or adjusted under 35 U.S.C. 154(b) by 863 days.

(21) Appl. No.: 17/243,491

(22) Filed: Apr. 28, 2021

(65) Prior Publication Data

US 2022/0362820 A1 Nov. 17, 2022

(51) Int. Cl.
| | | |
|---|---|---|
| *B09B 1/00* | (2006.01) | |
| *E21B 7/04* | (2006.01) | |
| *E21B 7/28* | (2006.01) | |
| *E21B 19/00* | (2006.01) | |
| *E21B 41/00* | (2006.01) | |
| *E21B 43/10* | (2006.01) | |
| *G21F 9/24* | (2006.01) | |
| *G21F 9/34* | (2006.01) | |

(52) U.S. Cl.
CPC .............. *B09B 1/008* (2013.01); *E21B 7/046* (2013.01); *E21B 7/28* (2013.01); *E21B 19/00* (2013.01); *E21B 41/005* (2013.01); *E21B 43/10* (2013.01); *G21F 9/24* (2013.01); *G21F 9/34* (2013.01)

(58) Field of Classification Search
CPC ................................. B09B 1/008; G21F 9/24
See application file for complete search history.

(56) References Cited

U.S. PATENT DOCUMENTS

| | | | |
|---|---|---|---|
| 4,326,820 A | 4/1982 | Uerpmann | |
| 4,692,061 A * | 9/1987 | Lindorfer | E21F 17/16 |
| | | | 405/52 |
| 4,906,135 A | 3/1990 | Brassow | |
| 5,171,483 A | 12/1992 | Tollison | |
| 5,863,283 A * | 1/1999 | Gardes | B09B 1/008 |
| | | | 588/259 |
| 9,833,819 B2 | 12/2017 | Burget | |

(Continued)

OTHER PUBLICATIONS

Bracke, et al, Status of Deep Borehole Disposal of High-Level Radioactive Waste in Germany, Energies, 2019; 12(13):2580. https://doi.org/10.3390/en12132580 (Year: 2019).*

(Continued)

*Primary Examiner* — Anthony J Zimmer
*Assistant Examiner* — Eric Scott Sherman
(74) *Attorney, Agent, or Firm* — Eric Kelly

(57) ABSTRACT

Systems, methods, processes, and/or steps for the long-term disposal of high-level nuclear and radioactive waste, along with other radioactive waste forms, is done within deep salt formation(s) of predetermined characteristics. Waste may be emplaced within a given deep salt formation and after emplacement, creep of that deep salt formation around the deposited waste may entirely entomb that emplaced waste safely for geologic time periods. To emplace the waste, wellbore(s) may be drilled from the Earth's terrestrial surface into the given deep salt formation and then either a mostly horizontal wellbore may be formed within the given deep salt formation and/or a human-made cavern may be formed down and within the given deep salt formation. After emplacement, creep of the deep salt formation will destroy the initial boundaries of the horizontal wellbore and/or of the human-made cavern. This creep sealing process may occur over relatively short time periods.

15 Claims, 15 Drawing Sheets

(56) References Cited

U.S. PATENT DOCUMENTS

| | | | |
|---|---|---|---|
| 10,427,191 | B2 | 10/2019 | Crichlow |
| 10,518,302 | B2 | 12/2019 | Crichlow |
| 10,751,769 | B1 | 8/2020 | Muller |
| 10,807,132 | B2 | 10/2020 | Crichlow |
| 10,878,972 | B2 | 12/2020 | Muller |
| 2009/0145659 | A1 | 6/2009 | Foppe |
| 2019/0227192 | A1 | 7/2019 | Castagnoli |
| 2019/0295735 | A1 | 9/2019 | Crichlow |
| 2020/0027605 | A1 | 1/2020 | Crichlow |
| 2020/0269291 | A1 | 8/2020 | Crichlow |
| 2020/0269293 | A1 | 8/2020 | Crichlow |
| 2020/0411206 | A1 | 12/2020 | Crichlow |
| 2021/0005338 | A1 | 1/2021 | Crichlow |
| 2021/0025241 | A1 | 1/2021 | Crichlow |
| 2021/0027902 | A1 | 1/2021 | Crichlow |
| 2021/0057121 | A1 | 2/2021 | Crichlow |
| 2021/0057122 | A1 | 2/2021 | Crichlow |

OTHER PUBLICATIONS

"3D Geomechanical Modeling of Salt-CreepB ehavior on Wellbore Casing for Presalt Reservoirs", Hanyi Wang, Robello Samuel., SPE Drilling and Completion, Society of Petroleum Engineers, 2016.

ARMA 08-041, "Geomechanical Effects of a 3D Vertical Salt Well Drilling by FEA", Mackay, F., Inoue, N. and Fontoura, S.A.B, Group of Technology and Petroleum Engineering / PUC-Rio, Rio de Janeiro, Rio de Janeiro, Brazil., Botelho, F., Petrobras, Macae, Rio de Janeiro, Brazil.

"A Study on Natural Radioactivity in Khewra Salt Mines, Pakistan"., Muzahir Ali BALOCH1*, Aziz Ahmed QURESHI1, Abdul WAHEED1, Muhammad ALI1, NawabALI3, Muhammad TUFAIL2, Saima BATOOL1, Muhammad AKRAM3, Poonam IFTIKHAR1, Hamza QAYYUM1, Shahid MANZOOR1and Hameed Ahmed KHAN1.

The Waste Isolation Pilot Plant: A Potential Solution for the Disposal of Transuranic Waste (1996), 184 pages | 8.5 × 11 | Paperback, ISBN 978-0-309-05491-1 | DOI 10.17226/5269 http://nap.edu/5269.

"Experimental determination of single-crystal halite thermal conductivity, diffusivity and specific heat from 75° C. to 300° C.". Alexander Urquhart and Stephen Bauer, Geomechanics Department, Sandia National Laboratories, Albuquerque, New Mexico, 87123.

"Diapirs and Salt Domes", The Mechanism of Formation, Anna S. Lord, , Sandia National Laboratories, Albuquerque, New Mexico, 87123.

Deep Geologic Disposal of Radioactive Waste at the Waste Isolation Pilot Plant and the proposed Yucca Mountain repository, Peter Swift, Stanford University, Feb. 6, 2017.

"Effects of Heat From High-Level Waste on Performance of Deep Geological,Repository Components", Report of a Technical Committee Meeting on Effects of Heat From Radioactive Waste in Deep Geological Repositories Organized by the International Atomic Energy Agency and Held in Stockholm, Aug. 28-Sep. 2, 1983.

ARMA 11-176: "Numerical Analysis of Casing Failure under Non-Uniform Loading in Subsalt Wells in Paradox Basin", Xinpu Shen, Halliburton, Houston, TX, USA.

ARMA 18-984: "Managing Creep Closure in Salt Uncertainty While Drilling", Orozco, Sergio O.; Pino, Javier; Paredes, Miguel A.; Vásquez, José L. and Xavier, Alberto, Halliburton, Villahermosa, Mexico, Copyright 2018 ARMA, American Rock Mechanics Association.

ARMA 20-1431: "Salt rock behavior prediction with an elasto-viscoplastic constitutive model implemented in FLAC3D", Ninanya, K., Pontifícia Universidade Católica do Rio de Janeiro, Rio de Janeiro, RJ, Brazil , Romanel, C. Pontifícia Universidade Católica do Rio de Janeiro, Rio de Janeiro, RJ, Brazil.

Major Arizona Salt Deposits ,vol. 11 No. 4 Earth Sciences and Mineral Resources in Arizona Dec. 1981.

"Drilling Long Salt Sections Along the U.S. Gulf Coast", J.W. Barker, SPE, Exxon Co. Intl.; K.W. Feland,* Exxon Co. U.S.A.; and V-H. 15ao, SPE, Exxon Production Research Co.

"Salt Domes in the Gulf Coast Aquifer", H. Scott Hamlin Chapter 12., Texas Department of Water Resources and the Texas Water Commission during 1984 and 1985.

"Challenges evolve for directional drilling through salt in deep water GOM"., R R Israel, D'Ambrosios, AD :Eavitt, Schlumberger. Oct. 20, 2009 Drilling Contractor.

"Forging a Path Forward on US Nuclear Waste Management": Options for Policy Makers, Thursday, Jan. 28, 2021, by Dr. Matt Bowen Nuclear Energy, United States, Columbia SIPA Center on Global Energy Policy.

Sandia Report Sand/\/\-0450 Unlimited Release UC-70, Printed Mar. 1983, "Summary Evaluation of the Waste Isolation Pilot Plant (WIPP) Site Suitability" Wendell D. Weart, Prepared by Sandia Labs.

Actinide Sorption Under WIPP-Relevant Conditions, Technical Report—Mar. 2017, https://www.researchgate.net/publication/316441856, DOI: 10.2172/1351205.

Nuclear Waste Disposal—Better planning needed at Waste Isolation Pilot Plant. GAO, Congressional Committee Report, GAO-21-48, Nov. 2020.

"DOMES and BASINS", jpb-Domes and basins Strukturgeologie-2017.

"Drilling Around Salt: Stresses, Risks, Uncertainties", Maurice B. Dusseault, Peng, GEOMEC A.S. and Porous Media Research Institute, University of Waterloo, Waterloo, Ontario Canada, N2L 3G1. Vincent Maury, GEOMEC A.S., 12 Avénue des Pyréneés, 64320 IDRON, France. ,Francesco Sanfilippo, GEOMEC A.S., Via Cairoli 106, Casalmaggiore (CR), 26041, Italy, Frédéric J. Santarelli, GEOMEC A.S., Olav Duuns gate 12, Stavanger N-4021, Norway.

"Drilling Through Salt: Constitutive Behavior and Drilling Strategies", Maurice B. Dusseault.

"Closure of open wellbores in creeping salt sheets", R. Weijermars et al, Bureau of Economic Geology , University of Texas, Geophysical Journal International, Apr. 24, 2013.

"Identification of Salt Deposits on Seismic Images using Deep Learning Method for Semantic Segmentation", Aleksandar Milosavljevic, Faculty of Electronic Engineering, University of Niš, Aleksandra Medvedeva 14, 18000 Niš, Serbia.

"Infinite Line Source Model". Lyesse Laloui, A F Rotta Loria, Analysis and Design of Energy Geostrctures 2020. Science Direct.

"Isotope Dating of the Potash and Rock Salt Deposit at Bamnet Narong, NE-Thailand", Bent T. Hansen1*, Klaus Wemmer, Monique Eckhardt1, Prinya Putthapiban, San Assavapatchara, Geoscience Center Göttingen, University of Göttingen, Göttingen, Germany, Geoscience Programme, Kanchanaburi Campus, Mahidol University, Kanchanaburi, Thailand, Department of Mineral Resources, Bureau of Geological Survey, Bangkok, Thailand, Received Jun. 27, 2016; accepted Aug. 19, 2016; published Aug. 22, 2016.

"Thermal conductivity and diffusivity of fine-grained sedimentary rocks", Malgorzata Labus,• Krzysztof Labus, Journal of Thermal Analysis and Calorimetry (2018) 132:1669-1676, https://doi.org/10.1007/s10973-018-7090-5.

"Modeling of Fluid Flow and Heat Transfer in a Pre-Salt Oil Production Well" Thomas Eduardt Hafemann, thomas_hafemann@polo.ufsc.br, Universidade Federal de Santa Catarina, Florianópolis, SC Marcus Vinicius Duarte Ferreira, mvdferreira@petrobras.com.br PETROBRAS/CENPES, Rio de Janeiro, RJ Jader Riso Barbosa Jr., jrb@polo.ufsc.br Universidade Federal de Santa Catarina, Florianópolis, SC Alexandre Kupka da Silva, a. kupka@ufsc.br Universidade Federal de Santa Catarina, Araranguá, SC.

"Modelling of rock salt creep" Master Thesis, Frederik Ancker Agergaard, S042044, Sep. 27, 2009, DTU Civil Engineering.

"A numerical approach for investigation of stress states induced by salt structures" Fábio Anderson Fonteles Teófiloa, ☐, Edgard Poiate Juniorb, Deane Roehla, Luiz Fernando Marthaa , TecGraf Institute and Pontifical Catholic University of Rio de Janeiro, Rio de Janeiro, Brazil, PETROBRAS Petróleo Brasileiro S.A, Rio de Janeiro, Brazil., International Journal of Rock Mechanics and Mining Sciences.

(56) References Cited

OTHER PUBLICATIONS

"Pre-salt Santos basin—Challenges and New Technologies for the Development of the Pre-salt Cluster", Santos Basin, Brazil, May 2009, DOI: 10.4043/19880-MS Ricardo L. Carneiro BeltraoCristiano Sombra Cristiano SombraAntonio LageAntonio Lage, Carlos Cunha Dias Henriques Carlos Cunha Dias Henriques.

OTC-29764-MS: "Salt Creeping Analysis on Deepwater Wells Submitted to Cooling Operations on Trapped Annular", Cristiano Eduardo Agostini, Luiz Felippe Medeiros Almeida, Nelson Moreira Júnior, Mateus Dias Magalhães, Roger Savoldi Roman, Eduardo Schnitzler, and Alan Pinheiro Silva, Petrobras.

"Summary of Rock Salt Deposits in the United States as Possible Storage Sites for Radioactive Waste Materials", Geological Survey Bulletin 1148, W. G. Pierce and E. I. Rich Prepared on behalf of the U.S., Atomic Energy Commission, 1962.

"A Study on Natural Radioactivity in Khewra Salt Mines, Pakistan", Muzahir Ali BALOCH1*, Aziz Ahmed QURESHI1, Abdul WAHEED1, Muhammad ALI1, Nawab ALI3, Muhammad TUFAIL2, Saima BATOOL1, Muhammad AKRAM3, Poonam IFTIKHAR1, Hamza QAYYUM1, Shahid MANZOOR1and Hameed Ahmed KHAN1., J. Radiat. Res., 53, 411-421 (2012).

Thermodynamic evidence of giant salt deposit formation by serpentinization: an alternative mechanism to solar evaporation Mathieu Debure, Arnault Lassin, Nicolas C . Marty, Francis Claret Aurelien Virgone, Sylvain Calassou & Eric C . Gaucher, Received: Mar. 22, 2019, Accepted: Jul. 30, 2019, Published: Aug. 12, 2019., www.nature.com/scientificreports.

"Salt Deposits in the United States and Regional Geologic Characteristics Important for Storage of Radioactive Waste", Book • Mar. 1978 ,Geology and petroleum in Oklahoma and Southern Midcontinent View project Mineral and water resources of Oklahoma, excluding petroleum View project, Kenneth S. Johnson, University of Oklahoma.

Department of the Interior, Franklin K. Lane, Secretary, United States Geological Survey George Otis Smith, Director. Bulletin 669, Salt Resources of the United States, by W. C. Phalen 1919.

"Salt usually seals, but sometimes leaks: Implications for mine and cavern stabilities in the short and long term". Earth-Science Reviews, John KeithWarren, Chulalongkorn University, Geology—Petroleum Geoscience, 254 Phayathai Road, Pathumwan 10330, Bangkok, Thailand.

SPE/IADC-204117-MS, "Borehole Disposal of Nuclear Waste" Håvard Kristiansen, Norwegian Nuclear Decommissioning; Bernt Sigve Aadnøy, University of Stavanger, Copyright 2021, SPE/IADC International Drilling Conference and Exhibition, This paper was prepared for presentation at the SPE/IADC International Drilling Conference and Exhibition to be held virtually on Mar. 8-12, 2021. The officialproceedings were published online on Mar. 8, 2021. This paper was selected for presentation by an SPE/IADC program.

"Stress, temperature, and pore pressure perturbations around a salt dome", Oct. 2015 Conference: Eurock 2015 & 64th Geomechanics Colloquium At: Salzburg, Austria, Tobias MeierTobias MeierTobias BackersTobias Backers Georg Dresen Georg Dresen Peter Gippe.

United States Department of the Interior Geological Survey Thermal Properties of Rocks, by Eugene C. Robertson Open-File Report 88-441, This report is preliminary and has not been reviewed for conformity with U.S. Geological Survey editorial standards and stratigraphic nomenclature. 1 Reston, Virginia, 1988.

"Drilling in Salt Formations and Rate of Penetration Modelling", MSc Thesis, Mats Håpnes, Petroleum Geoscience and Engineering, Supervisor: John-Morten Godhavn, IPT Department of Petroleum Engineering and Applied Geophysics, Submission date: Jun. 2014, Norwegian University of Science and Technology.

Finsterle, et al., Thermal Evolution near Heat-Generating Nuclear Waste Canisters Disposed in Horizontal Drillholes, Energies, 2019, 12, 596; doi:10/3390/en12040596.

Whitson, et al., Lessons Learned in the Planning and Drilling of Deep, Subsalt Wells in the Deepwater Gulf of Mexico; Society of Petroleum Engineers, 2001, SPE 71363, pp. 1-9.

Castagnoli, et al. "Drilling Geomechanics Salt Creep Monitoring: How to Optimize Mud Weight in Real Time and Get a Safe Time Window While Drilling, Tripping, Running and Catnenting Casing in Salt Formations." AAPG International Conference and Exhibition. 2016.

* cited by examiner

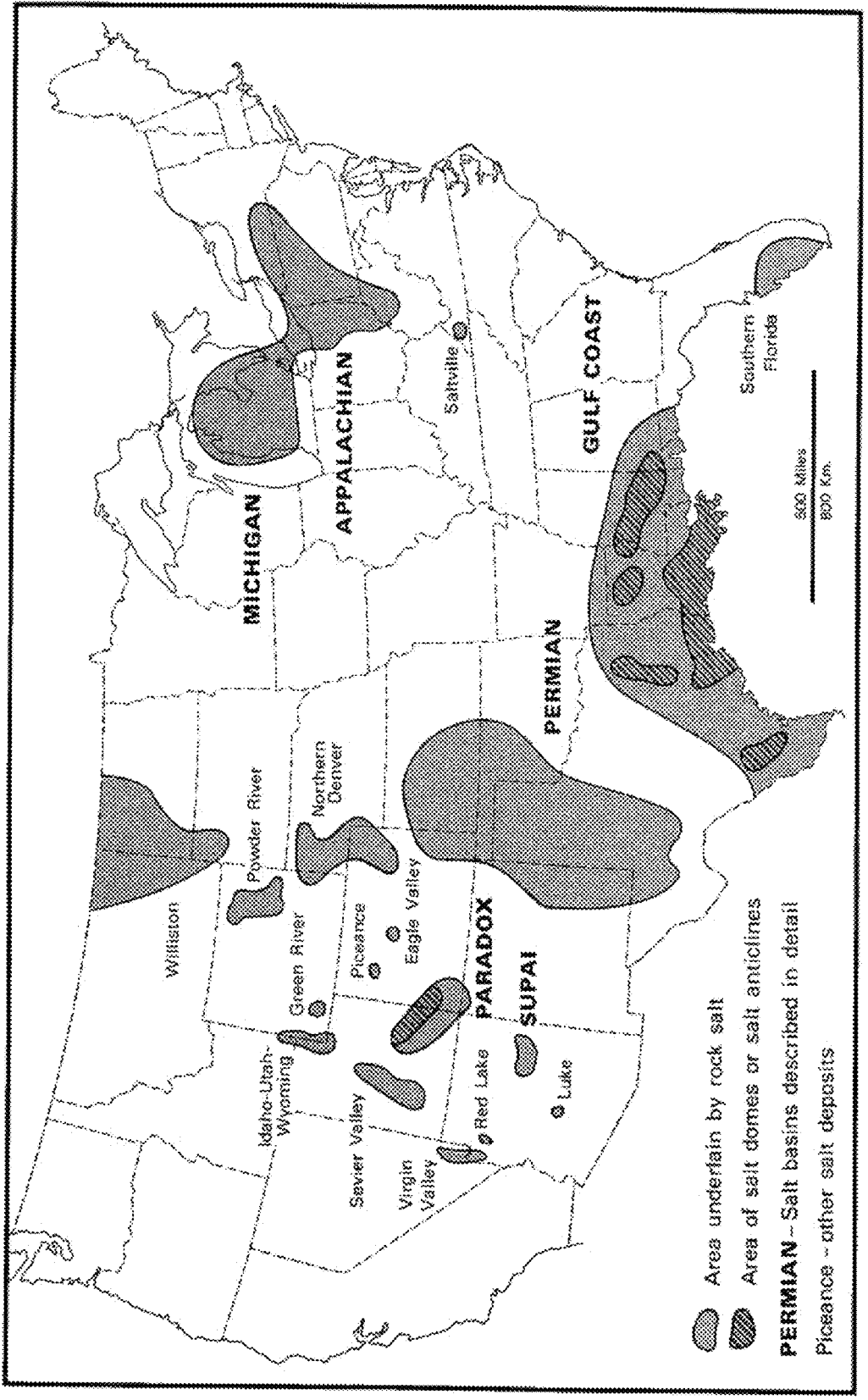
Figure 1. Map showing rock-salt deposits in United States.
FIG. 1I (Johnson)

| Salt Creep in in/day vs mud weight (ppg) or psi/ft | | | | |
|---|---|---|---|---|
| Mud Weight (ppg) | 10.5 | 12 | 13 | 14 |
| psi/ft | 0.54 | 0.624 | 0.676 | 0.728 |
| Salt Type | Creep (in/day) | | | |
| Tachyhydrite | 5.628 | 2.1096 | 1.0392 | 0.4704 |
| Carnallite | 1.0008 | 0.3576 | 0.1608 | 0.0624 |
| Halite | 0.1248 | 0.0432 | 0.0192 | 0.0096 |

TABLE 1

FIG. 11

DISPOSAL OF HIGH-LEVEL WASTE INTO DEEP SALT FORMATIONS

TECHNICAL FIELD OF THE INVENTION

The present invention relates in general to containment, storage, and/or disposal of radioactive materials (e.g., nuclear waste); and more specifically to the containment, storage, and/or disposal of radioactive materials (e.g., nuclear waste) within deeply located salt formations of predetermined characteristics (such as, but not limited to predetermined plastic deformable and/or creep properties).

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2021) there is a massive quantity of nuclear waste accumulating across the world. There are basically two major sources. High-level waste (HLW) from the generation of electric power in nuclear fired power plants and HLW from nuclear weapons production. Both sources of waste must be addressed, controlled, and disposed of safely. This patent application addresses these sources of HLW and how to safely dispose of that HLW.

With respect to the nuclear power plants, the waste is derived from spent nuclear fuel assemblies (SNF) which are used in the power plants to generate electric power. This type of HLW is normally stored on the surface (e.g., Earth's terrestrial surface as opposed to subterranean), in cooling ponds or special casks, until a final repository is available. In (2020) in the United States (U.S.) alone there are more than 80,000 metric tons (MT) of this high-level solid waste (HLW) being stored in cooling pools and in concrete casks on the surface. These surface storage operations are very costly, typically costing hundreds of millions of dollars annually. This type of HLW is generally called spent nuclear fuel (SNF) and consists of thousands of nuclear fuel assemblies which have been removed from operating nuclear power plants. These fuel assemblies are highly radioactive and also thermally active and continue to generate sensible heat which must be safely removed by maintaining these assemblies in cooling tanks at the onsite surface storage site. There are approximately 80,000 individual fuel assemblies being stored today in the U.S. and about 15,000 MT being added annually. There is a significant need for new mechanisms and processes to safely get rid of the surface storage of this radioactive waste and to sequester this SNF waste in a safe manner. In this application HLW and SNF may be used interchangeably to describe the solid nuclear waste product.

Current scientific knowledge teaches that the conversion of nuclear waste to an acceptable waste form requires either, (a) that the wastes be separated from the other constituents and processed separately, or (b) that the wastes together with the other constituents be processed together. Both processes present a variety of technical challenges. Due to the radioactivity and toxicity of the wastes, separation can be both hazardous, expensive, and prone to human-induced accidental problems.

To date, and based on the prior art, in order to provide a satisfactory and economical final disposal of these wastes, it is desirable that the wastes be processed into a final form without the hazardous and expensive step of removing the other constituents. It has been understood that the waste in this final form prevents removal of the fissile constituents of the wastes and further immobilizes the waste to prevent degradation and transport of the waste by environmental mechanisms.

Several methods for providing an acceptable final form for waste are known in the art, including: (a) vitrification and/or (b) ceramification.

Vitrification to produce borosilicate glasses having waste constituents bound within the glasses has been shown as an effective method for treatment of low volumes of HLW. In the vitrification process, wastes are mixed with glass-forming additives and converted into an amorphous glassy form by high temperature melting and cooling. There are several inherent technical drawbacks of vitrification. A further drawback of vitrification arises due to the low solubility of many of the waste components of interest in glass which prohibits large concentrations of the waste components in the final glass form. This low solubility greatly increases the required volume of the final waste form for a given volume of radioactive waste components of interest, thus unfortunately the waste volume "grows" under the vitrification paradigm. This makes the overall nuclear waste product even larger than the original thus requiring more storage and costs.

Ceramification produces another form of nuclear waste. It can be accomplished by the incorporation of waste components of interest into a synthetic rock ("synroc") which is a ceramic material. The synroc process has been fully developed and as commercialized in Australia (ANSTO) produces a crystalline final waste form and involves several complex expensive steps involving high temperatures and pressures utilized to successfully create a suitable final waste form.

The cost associated with these two primary methodologies (vitrification and ceramification) is prohibitive. Published information from the U.S. Hanford Nuclear facility which is designed for vitrification operations has a projected cost level of $16 billion in U.S. dollars.

Published information from the ANSTO facility which is designed for ceramification operations has a projected cost of hundreds of millions of dollars. Commercial revenues are expected to pay for development. Both of these processes (e.g., vitrification and/or ceramification) increases a volume of waste product to be stored. Thus, use of these processes may be counter-intuitive with a goal of minimizing an amount of nuclear waste. That is, use of these processes creates even more nuclear waste that needs to be safely handled and stored.

Based on the inherent shortcomings of the prior art, there exists a critical need for an effective, economical method for developing and utilizing an acceptable nuclear waste process for nuclear waste products; a process that precludes the need for all the expensive, time-consuming, and dangerous intermediate operations that are currently being used or contemplated to render the nuclear waste in a form that eventually, still has to be buried in deep underground repositories. An approach is needed that minimizes these intermediate steps. To solve the above-described problems, the present invention provides systems, methods, and steps to dispose of the nuclear waste currently accumulating on the surface.

The novel approaches taught as part of this patent application provides systems, methods, and steps wherein the HLW/SNF waste disposal operations may go directly from the existing fuel assembly rod cooling ponds to the underground disposal repository in deep salt formations with minimal additional effort and without the afore-listed intermediary steps of vitrification and ceramification.

With respect to the nuclear weapons industry, the waste is derived from weapons processing is different but also produces significant harm to humans and the environment. In the U.S., the nuclear weapons production industry has left a massive and devastating legacy when the nuclear reactors were decommissioned at the end of the Cold War. For example, the weapons manufacturing process left behind about 53 million U.S. gallons (volumetric equivalent of about 200,000 cubic meters [$m^3$]) of high-level radioactive waste stored within 177 storage tanks. In addition, 25,000,000 cubic feet ($ft^3$) (710,000 $m^3$) of solid radioactive waste and a resulting contamination zone covering several square miles of contaminated groundwater beneath each such site. Much of this liquid waste has been leaking into the surrounding earth creating significant health and environmental problems. There is a tremendous safety and environmental need to store and/or dispose of such radioactive materials.

In the past, it has been challenging, dangerous, and expensive to try to store radioactive and/or nuclear materials (such as waste materials) in underground caverns except for those cases where solid quantities of material are stored in barrels, individual capsular containers, slurry material, open pits and also within shallow mines which are very close to the surface.

With respect to the HLW geological repository system in deep underground formations, this subject patent application contemplates the utilization of deep bedded salt formations to sequester and entomb the HLW material. The deep salt formations display the desired deformable rock and physical properties that allow the salt mass to creep, seal and ultimately and completely embed the HLW material in the deep salt formations/zones.

There is a long felt, but unmet, needs for systems, methods, steps, means, and/or mechanisms that would allow high-level nuclear waste (HLW) which exists in a variety of difficult to manage physical forms (e.g., liquids, sludges, powders, solids, etc.) to be finally and/or permanently stored and/or disposed of very deep within the Earth and also in substantial quantities.

A need, therefore, exists for new systems, methods, steps, means, and/or mechanisms to safely dispose of radioactive waste in a controlled manner along with depositing these radioactive wastes in a system that is designed to meet the requirements of public acceptance along with regulatory guidelines.

It is to these ends that the present invention has been developed to dispose of the HLW products in deep salt formations that exhibit creep and seal attributes thus allowing safe long-term disposal of that deposited waste.

BRIEF SUMMARY OF THE INVENTION

To minimize the limitations in the prior art, and to minimize other limitations that will be apparent upon reading and understanding the present specification, the present invention may describe systems, methods, processes, and/or steps for the long-term disposal of high level nuclear and radioactive waste products/materials, along with other radioactive waste forms, within deep salt formation(s) of predetermined characteristics. In some embodiments, such waste may be emplaced within a given deep salt formation and after emplacement, creep of that deep salt formation around the emplaced waste may entirely and completely entomb that emplaced waste safely for geologic time periods. In some embodiments, to emplace the waste, wellbore(s) may be drilled from the Earth's terrestrial surface into the given deep salt formation; and then either a mostly horizontal wellbore may be formed within the given deep salt formation and/or a human-made cavern may be formed within the given deep salt formation. In some embodiments, after emplacement, creep of the deep salt formation will destroy the initial boundaries of the horizontal wellbore and/or of the human-made cavern. In some embodiments, this creep sealing process may occur over relatively short time periods (e.g., a decade or less), but the resulting entombed waste may be geologically stable over geologic time scales (e.g., millions of years). This creep process results in the waste being completely and homogenously sealed inside a matrix of the deep salt formation for geological time.

With respect to horizontal or lateral drilling operations at great depth, horizontal drilling or the drilling of lateral wellbores has been improved considerably over the last decades. Downhole tools and downhole motors operating with specialized bottom hole assemblies (BHAs) have been able to overcome some of the obstacles to efficient horizontal drilling in deep formations. This improvement has been particularly noticeable in the ability to drill through and below deep salt formations to target productive oil and gas producing zones where significant petroleum production exists. This technology may be used to drill horizontally within deep salt formations.

With respect to drilling and under-reaming of human-made caverns in deep formations, in recent years, in the drilling industries, over 2,500,000 feet of under-reaming drilling has been successfully achieved. The reaming technology in oil well drilling is not new. Reaming patents exist as early as 1939. However, the recent technological developments in the drilling industry have made it possible to help resolve the problems involved in making human-made caverns a reality in deep geologic zones.

Recently (2018), an oil well service company has published that it successfully drilled a fifty-four (54) inch wellbore during an offshore well drilling from a drilling platform. Modifying such oilfield drilling technology allows implementation of embodiments of the present invention.

Because of drilling design improvements, it is now possible to resolve the problems involved in disposing of nuclear waste in deep human-made caverns.

Some of the technical drivers that have allowed the embodiments of present invention herein to be implemented are as follows: drilling rig design features have improved; increased hydraulic pressure availability at the drill bit; available drilling rig horsepower up to as much as 4,000 hydraulic horsepower; available pump horsepower; available rig capacity up to 2,000,000 pounds of dead weight lift is available; high downhole drilling fluid pressures can be maintained; drilling rig ability to pump slurries of high density, pounds per gallon (ppg) have increased considerably; and remote and automatic control software for rig operations.

In light of the problems associated with the known methods of disposing of nuclear waste (including in liquid/slurry format), it may be an object of some embodiments, to provide a method for the disposal of nuclear waste in horizontal (lateral) wellbores and human-made caverns which is safe, with high volumetric capacity, cost-effective, and may be performed with modified oil field equipment.

Some embodiments may specifically address technical considerations, such as, but not limited to, disposal of HLW materials in human-made repositories implemented in geological formations, such as deep salt formations. This patent application is directed at disposal of a variety of HLW forms in deep, naturally occurring, bedded salt formations that are capable of measurable plastic deformation when subjected to unbalanced stresses. The initial disposal repositories may be horizontal (lateral) wellbore systems and/or human-made cavern systems in deep salt formations.

It is an objective of the present invention to provide systems and methods to dispose of radioactive material(s), such as, but not limited to, SNF assemblies (and/or portions thereof), HLW, WGP parts, components, portions thereof, combinations thereof, and/or the like.

It is another objective of the present invention to provide systems and methods that are configured to dispose of a variety of radioactive material(s) in various/different waste forms, such as, but not limited to, SNF assemblies (and/or portions thereof, HLW, WGP parts/components, portions thereof, combinations thereof, and/or the like.

It is another objective of the present invention to provide such systems and methods that are designed to dispose of the radioactive material(s) in manner that is much more affordable (cheaper) than prior art technologies.

It is another objective of the present invention to provide methods and systems that are configured to dispose of the radioactive material(s) in manner that is safe to human health and to the environment.

It is another objective of the present invention to provide methods and systems such that the HLW radioactive material(s) are disposed in manner that meets applicable regulatory guidelines.

It is another objective of the present invention to provide such disposal methodologies that are configured to dispose of the radioactive material(s) in manner that generally meets public acceptance.

It is another objective of the present invention to provide such HLW disposal means that are configured to dispose the radioactive material(s), wherein the method and systems provide more robust mechanisms than prior art systems.

It is another objective of the present invention to provide methods and systems that are configured to dispose of the radioactive material(s), wherein the systems may accommodate relatively large amounts of radioactive waste. Systems capable of accommodating hundreds of thousands of pounds of waste material.

It is another objective of the present invention to provide such methods and systems that are designed to dispose of the radioactive material(s), wherein implementing such means requires minimal infrastructure and/or accessory upgrades (e.g., existing SNF assemblies/subassemblies, systems, capsule systems, used in power generation may be utilized).

It is another objective of the present invention to provide such methods and means that are designed to dispose of the radioactive material(s), wherein implementation of such disposal means may be readily scaled up, as needed/desired to disposed of widely distributed accumulated waste materials across the country (e.g., the U.S.).

It is another objective of the present invention to provide such disposal means that are configured to select deep salt formations/zones that possess the desired physical and chemical properties than facilitate HLW disposal.

It is another objective of the present invention to provide such disposal means that are configured to select the appropriate deep salt formation in which the salt type and the existing formation pressures and temperatures of the salt provide the desired plastic deformation of the salt formation that allows for effective HLW disposal.

It is another objective of the present invention to provide such disposal systems that are configured to implement either a wellbore system with a vertical section and a distal horizontal (lateral) section, or a vertical wellbore section complimented there below with an under-reamed disposal cavern (human-made cavern).

It is another objective of the present invention to provide such wellbore systems that have wellbore casing and liner components/elements that allow disposal of the HLW in a variety of forms wherein the waste-capsule may contain the radioactive waste, such as, but not limited to, a SNF assembly and/or subassembly forms.

It is another objective of the present invention to provide such disposal systems that are configured to dispose of the radioactive material(s) utilizing at least one human-made cavern that is implemented below the vertical wellbore system.

It is another objective of the present invention to provide a system of wellbore liners utilized in the wellbore system which may be retractable and may be sequentially withdrawn (retracted) in steps from the horizontal (lateral) wellbore systems.

It is another objective of the present invention to provide a disposal wellbore system which on retracting the liner, provides at least one open-hole wellbore system in which the HLW material is in direct contact with the deep salt formation.

It is another objective of the present invention to provide a disposal system in deep salt formations such that subsequent salt creep into and filling of the open hole wellbore around the waste forms would provide for long term entombment of the HLW material deposited within that deep salt formation.

It is another objective of the present invention to provide a disposal system in deep salt formations such that subsequent salt creep into and the filling of the human-made cavern around the deposited waste forms provides for long-term entombment of the HLW material deposited within the deep salt formation.

It is another objective of the present invention to provide a seal mechanism (e.g., plug) in the vertical wellbore, above the horizontal (lateral) wellbore system to limit migration of HLW products away from the horizontal (lateral) wellbore.

It is yet another objective of the present invention to provide a seal mechanism (e.g., plug) in the vertical wellbore, above the disposal human-made cavern to limit migration of HLW products away from the disposal human-made cavern.

Recapping at least some of the above noted objectives, some embodiments may provide systems, methods, steps, means, and/or mechanisms for the storage and/or disposal of radioactive materials within deep salt formations that may be safe (for humans and the environment), economically feasible, and efficient.

These and other advantages and features of the present invention are described herein with specificity so as to make the present invention understandable to one of ordinary skill in the art, both with respect to how to practice the present invention and how to make the present invention.

The preceding and other steps, objects, and advantages of the present invention will become readily apparent upon further review of the following detailed description of the preferred method as illustrated in the accompanying drawings.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1G shows the massive salt formations which are mined out to form rooms for excavation, removal, and collection of the commercial salt mineral.

FIG. 1I may show a geographical distribution of available deep salt deposits across the U.S. some of which may be available and suitable for disposal of HLW materials therein according to embodiments of the present invention.

FIG. 3 further shows various stages of deformation during the salt creep process.

FIG. 11 may be of Table 1 of an empirical dataset of creep rate of salts.

Figure 1A:
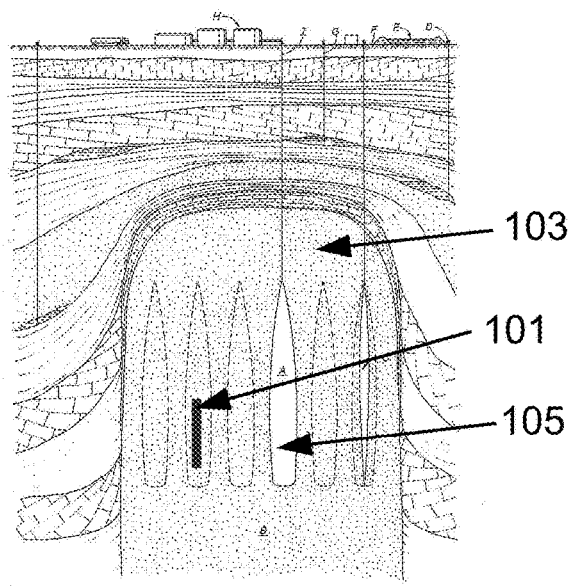
FIG. 1A may be a prior art schematic (cross-sectional side view) showing an overview of a prior art embodiment for the storage and/or disposal of radioactive materials within a leached out near surface salt dome.

| REFERENCE NUMERAL SCHEDULE | |
|---|---|
| 101 | nuclear waste 101 |
| 103 | salt formation 103 |
| 105 | cavity from leaching 105 |
| 111 | seal/plug 111 |
| 113 | wellbore 113 |
| 121 | disposal room 121 |
| 123 | shallow salt cavern 123 |
| 125 | nuclear waste 125 |
| 127 | removable load distribution medium 127 |
| 131 | wellbore (vertical wellbore) 131 |
| 132 | lateral (horizontal) wellbore 132 |
| 133 | waste capsule 133 |
| 134 | waste 134 |
| 135 | deep geological formation 135 |
| 136 | other formation 136 |
| 137 | plug 137 |
| 138 | drilling rig 138 |
| 139 | surface (Earth's surface or terrestrial surface) 139 |
| 140 | human-made cavern 140 |
| 151 | salt cave 151 |
| 153 | shallow salt formation 153 |

REFERENCE NUMERAL SCHEDULE

| | |
|---|---|
| 155 | human-sized figure 155 |
| 157 | salt floor 157 |
| 160 | temperature response graph for a specific system 160 |
| 161 | vertical temperature axis 161 |
| 162 | horizontal logarithmic time axis 162 |
| 163 | vertical power axis 163 |
| 164 | power decline curve 164 |
| 165 | highest temperature curve at deposited waste capsule 165 |
| 166 | waste capsule wall temperature curve 166 |
| 167 | well casing temperature curve 167 |
| 168 | wellbore wall temperature curve 168 |
| 169 | temperature curve at 0.1 meter into rock 169 |
| 170 | temperature curve at 0.5 meter into rock 170 |
| 171 | temperature curve at 1.0 meter into rock 171 |
| 201 | pre-salt (below salt) productive formation 201 |
| 203 | supra-salt (above salt) productive formation 203 |
| 205 | casing string 205 |
| 207 | liner 207 |
| 209 | casing 209 |
| 211 | liner 211 |
| 213 | open section 213 |
| 300 | salt creep response curve 300 |
| 301 | deformation rate of salt (right vertical axis) 301 |
| 302 | creep deformation (left vertical axis) 302 |
| 303 | time axis (bottom horizontal axis) 303 |
| 304 | curve for deformation rate 304 |
| 305 | transient creep zone 305 |
| 306 | steady-state creep zone 306 |
| 307 | accelerated creep zone 307 |
| 400 | HLW disposal system 400 |
| 401 | deep salt formation (disposal formation) 401 |
| 403 | overlain other formation 403 |
| 405 | underlain other formation 405 |
| 407 | lateral (horizontal) extent of deep salt formation 407 |
| 409 | vertical depth/thickness of deep salt formation 409 |
| 411 | drilling-rig 411 |
| 413 | vertical wellbore 413 |
| 415 | horizontal (lateral) wellbore 415 |
| 500 | HLW disposal system 500 |
| 501 | HLW (or radioactive material) 501 |
| 503 | wellhead 503 |
| 505 | vertical wellbore liners (casing string) 505 |
| 507 | horizontal (lateral) wellbore liner 507 |
| 509 | largest (first) diameter casing/liner 509 |
| 511 | medium (second) diameter liner 511 |
| 513 | cement 513 |
| 515 | toe 515 |
| 517 | heel 517 |
| 518 | wellbore annulus between liner and casing 518 |
| 519 | variable length indicator 519 |
| 601 | terminal end of liner 601 |
| 603 | direction of retraction 603 |
| 605 | region of wellbore without liner 605 |
| 800 | HLW disposal system 800 |
| 801 | HLW 801 |
| 803 | human-made cavern 803 |
| 805 | initial human-made cavern void space 805 |
| 903 | former human-made cavern walls 903 |
| 913 | plug 913 |
| 1000 | method of HLW disposal in deep salt formation 1000 |
| 1001 | step of locating a suitable deep salt formation 1001 |
| 1003 | step of determining deep salt formation intrinsic properties 1003 |
| 1005 | step of determining disposal type, wellbore and/or human-made cavern 1005 |
| 1007 | step of constructing human-made cavern in deep salt formation 1007 |
| 1009 | step of constructing lateral wellbore system in deep salt formation 1009 |
| 1011 | step of storing HLW in surface facilities 1011 |
| 1013 | step of collecting the HLW materials 1013 |
| 1015 | step of preparing human-made cavern 1015 |
| 1017 | step of partial retracting liner in lateral wellbore 1017 |
| 1019 | step of depositing HLW into human-made cavern and/or into wellbores 1019 |
| 1021 | step of determining if all HLW is loaded 1021 |
| 1023 | step of repeating depositing steps until all HLW deposited 1023 |
| 1025 | step of removing liner from wellbore and/or not restricting creep 1025 |
| 1027 | step of sealing wellbore 1027 |

DETAILED DESCRIPTION OF THE INVENTION

Note, U.S. Pat. No. 10,807,132, by the same inventor, is incorporated by reference with this present patent application.

Note, ranges disclosed herein may include the range endpoints. For example, "a range of between 1 to 3," includes the endpoints of 1 and 3, unless otherwise explicitly noted.

Unless otherwise stated herein, "HLW" may refer to any type of waste material wherein long-term disposal thereof may be desired. For example, and without limiting the scope of the present invention, HLW may refer to: high-level nuclear waste, spent nuclear fuel (SNF), weapons grade plutonium (WGP), nuclear waste, radioactive waste, waste, waste material, portions thereof, combinations thereof, and/or like. In some embodiments, HLW may also refer to the capsules and/or containers that contain HLW. For example, when HLW may be loaded into a wellbore and/or into a human-made cavern as shall be discussed below, that HLW may be contained within a capsule/container in some embodiments or uncontained in other embodiments.

Unless otherwise stated herein, "vertical" is at least substantially (mostly) parallel to a local gravity vector of the Earth, wherein local is at or near a given site for drilling wellbores (or a site where a wellbore has been previously drilled). In some embodiments, a five (5) degree deviation from true/absolute vertical may be still considered vertical in the context of this patent application.

Unless otherwise stated herein, "lateral" and "horizontal" may be used interchangeably. Unless otherwise stated herein, "lateral" and/or "horizontal" are substantially (mostly) perpendicular to "vertical." Unless otherwise stated herein, "lateral" and/or "horizontal" are substantially (mostly) perpendicular to a given local gravity vector of the Earth.

In this patent application, "deep salt formations" (e.g., deep salt formations 401) refer to deep bedded salt zones, deposits, and/or formations that are at least 10,000 feet below the surface of the Earth and having a predetermined range of acceptable plasticity and/or creep characteristics; as distinguished from subterranean geologic "salt domes" which are intrusive salt rock systems (diapirs) within existing sedimentary formations. That is, "deep salt formations" (e.g., deep salt formations 401) and "salt domes" are different types of geologic formations, with different properties and/or characteristics.

Unless otherwise stated herein, "liner" and "casing" may be used interchangeably and may refer to a physical component(s) that may line or case the interior of a given wellbore, including when such liners and/or casings may be temporary and/or transient.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A shows a prior art system for the disposal of waste material, including nuclear waste 101, in a salt formation 103 (see e.g., U.S. Pat. No. 4,906,135). Salt formation 103 can be a salt dome formation. These salt domes 103 are usually normally close to the surface 139 (i.e., shallow and not deep), for example in Texas in a four-county region the depths of the salt dome 103 tops range from near zero (surface) to less than 2,000 feet below the surface 139 and are limited in areal extent as well. The salt formation 103 utilized in this prior art is a naturally occurring salt dome in which a storage cavity 105 is leached out from the surrounding salt formation 103. The use of such leached out storage cavities 105 in a salt formation 103 for material storage has been in widespread use for storage of hydrocarbons. This prior art poses several major potential and undesirable problems. The cavity 105 can remain stable as long as no intrusions from water influx and/or disturbances from seismic activity occur. It has been recognized that repetitive long-term use of salt dome 103 storage for material may lead to a hysteresis effect in which the internal volume of the salt dome cavity 105 decreases. Decades long use of these cavities 105 have led to sloughing off of the internal cavity 105 wall and collapse and subsequent non-utility of the cavity 105. Since nuclear waste disposal time is measured in thousands of years, this collapse activity without the ability to seal the cavity 105 completely creates serious future problems for HLW stored in such a manner, as the HLW and/or portions/derivatives thereof can migrate out of that given deteriorating cavity 105.

Figure 1B:
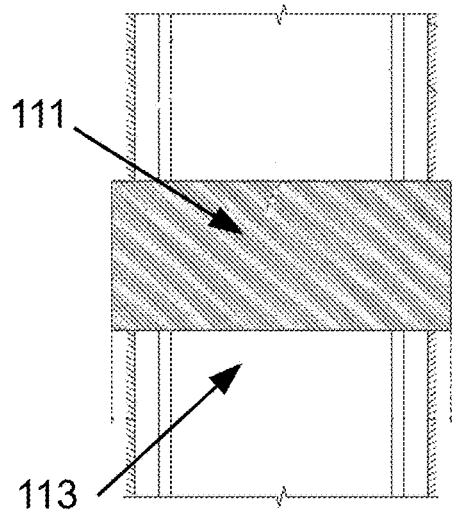
FIG. 1B may be a prior art schematic (cross-sectional side view) showing a view of a prior art embodiment for the storage and/or disposal of radioactive materials within a vertical wellbore and a means for plugging said vertical wellbore with a formation derived material to act as the plug.

FIG. 1B teaches a prior art embodiment in which a seal/plug 111 is implemented in a wellbore section 113 (see e.g., U.S. Pat. No. 10,751,769). The plug 111 in the vertical wellbore 113 is implemented to prevent and protect waste stored below plug 111 in the wellbore repository system from moving vertically up through the wellbore 113 to the surface of the Earth. This prior art contemplates the use of plug 111 which may be of similar rock or different rock material from the formation rock material that surrounds the wellbore 113. It is indicated in this prior art process that the plug 111 may be a formation rock capable of creeping and plugging the wellbore region permanently.

Under some circumstances this plug 111 may be futile or ineffective in plugging the wellbore 113 since pressure acting on the plug 111 material may actually displace and force the plug 111 vertically upward or downward in the wellbore 113 rather than plug 111 being compressed. For example, there may be an increase of hydrostatic pressure due to natural water influx into the formations above or below the plug 111 forcing the plug 111 to move. Such pressure may unplug the wellbore 113 allowing directional flow of the waste material.

In addition, the prior art discusses the use of crushed or particulate material for plug 111. Introducing particulate or crushed material for plug 111, provides porosity in the plug 111 medium which has to be reduced to zero before any creep may occur between the particles since the porous space "absorbs" any volume change before plastic deformation and creep may occur of the overall plug 111. It is well recognized that creep occurs at a molecular level in the deformable material. Any applied pressure will have to compress the rock material to near zero porosity before creep may occur in the overall plug 111. This compression to zero porosity in plug 111 may be difficult to achieve in a human-made compact granular material. In addition, compression to zero porosity, if possible, may require undesirably very long periods of time under the existing low pressures contemplated in the prior art embodiment. For example, in some cases it may take several thousand years depending on the level of active compressive forces and the hardness of the granular material.

Figure 1C:
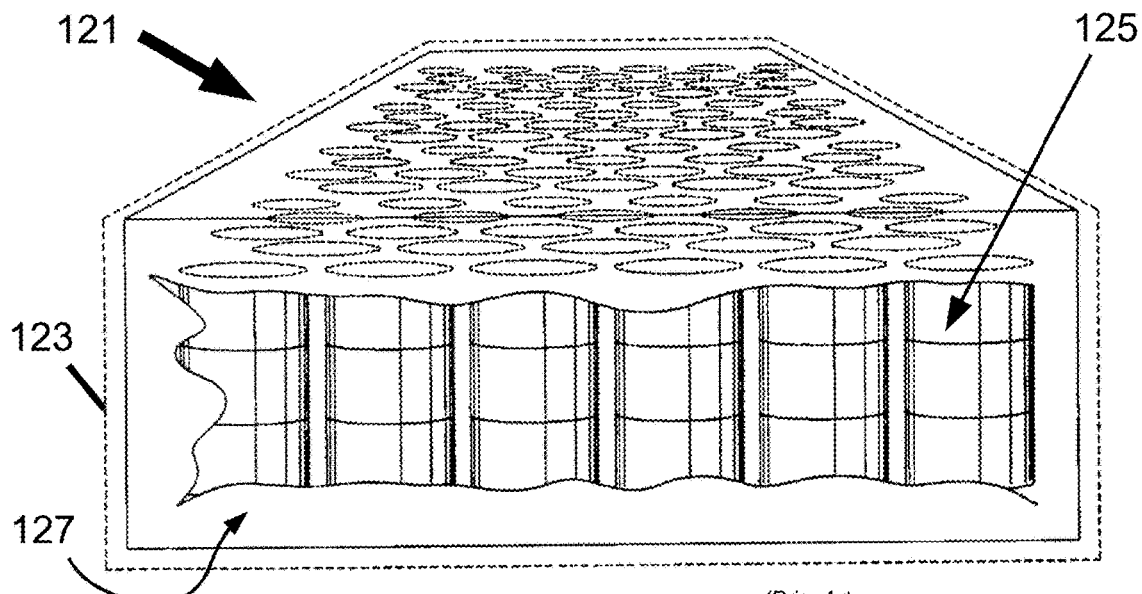
FIG. 1C may be a prior art schematic isometric view showing an overview of a prior art embodiment for the storage and/or disposal of radioactive materials within a carved-out room in a near surface salt deposit in the U.S.

FIG. 1C teaches a prior art embodiment in which disposal rooms 121 are implemented in a shallow salt cavern 123 and used as a repository for nuclear waste 125 disposal (see e.g., U.S. Pat. No. 5,171,483). This prior art embodiment contemplates storage in a shallow salt bed 123 or salt mine 123 at about 800 feet to a maximum 2,000 feet below ground level (below surface 139). A depth considerably less than the minimum 10,000 feet depth contemplated in the current application for utilizing deep salt formations 401. In this specific prior art process, the waste material 125 is in steel containers or barrels, stored in rooms 121 which are carved out of a shallow salt deposit in New Mexico state at the WIPP waste project. These shallow salt deposits are found at about 2,150 feet below ground level. After the waste 125 containers are loaded into the rooms 121, a removable load distributing fluidized medium of material 127 is added to and completely covers up the waste 125 canisters located within rooms 121 within shallow salt cavern 123. The load distributing material 127 may consist of sand, bentonite, and gypsum. The fluidized bed 127 of the prior art, may allow the waste material 125 to be retrieved after up to fifty (50) years for inspection or removal. It is also contemplated that during the thousands of years of residence in this shallow cavern 123, the shallow salt formation 123 that houses the rooms 121 may creep and embed all the waste 125 steel containers completely and thus protect the waste 125 from migration away from the shallow salt formation. However, there may be some difficulty in the expected creep process completely entombing the waste 125 barrels which are surrounded by a fluidized bed of granular solids 127 at this relatively shallow depth (e.g., both, granular fluidized material 127 minimizes creep and shallow depth does not have the required deformational pressures needed to initiate creep).

Continuing discussing FIG. 1C, in addition, this prior art itself (U.S. Pat. No. 5,171,483) specifically states that the fluidized granular material behaves as "a compressive load equalization system" which significantly reduces the ability of the salt to compress and crush the waste material drum containers." This prior art may not allow any salt creep to solidify the salt around the drums.

Continuing discussing prior art of FIG. 1A, FIG. 1B, and FIG. 1C, in which shallow (not deep) salt deposits have been described. Technically salt creep has been described as a molecular process, and that the time scale of a creep action depends on temperature and pressure differentials, which may lead to deviatoric stresses in the salt medium; the process generally speeds up in a non-linear fashion with increasing temperature and differential pressures in the salt formation (see e.g., FIG. 3). An increase in temperature will cause the salt creep/strain rate to increase. Temperatures ranging between 200 degrees Fahrenheit (° F.) to 400 degrees Fahrenheit (° F.) (93 degrees Celsius (° C.) to 204 degrees Celsius (° C.)) will cause a sharp increase in creep rate; and at temperatures over 400 degrees Fahrenheit (° F.) (204 degrees Celsius (° C.)), salt becomes almost completely plastic and will creep/flow easily if differential pressure is applied. Bedded deep salt formations 401 have the necessary and/or desired temperature and pressure conditions that allow the effective creep rate to occur that may be utilized in various embodiments of the present invention. Whereas, the shallow (not deep) salt deposits of the FIG. 1A, FIG. 1B, and FIG. 1C prior art do not have sufficient pressures and/or temperatures for sufficient creep as utilized in various embodiments of the present invention.

Deep salt 401 temperatures depend on the geothermal gradient in the formation and in the deep salt, and based on a typical geothermal gradient of one degree Fahrenheit per one hundred feet of depth (1°/100 ft depth), the deep salt temperatures have been measured and may easily exceed 200 degrees Fahrenheit (° F.). On the other hand, shallow near surface salt deposits (e.g., at 2,000 feet or less below surface 139) possess relatively low temperatures less than 100 degrees Fahrenheit (° F.) and based on the lithostatic gradient also have relatively low pressures, much less than 2,000 psi (pounds per square inch) and, these values are well below those of deep salt beds 401 where lithostatic pressures may exceed several thousand psi. One reported PETROBRAS company study in a Brazil oilwell reported pressure at 9,262 psi and temperature of 199 degrees Fahrenheit (° F.) in a "pre-salt" 11,968 ft deep formation. These demonstrated property differences (e.g., of temperature and/or pressure) make the deep salt 401 embodiments illustrated in this patent application preferable and an improvement over the prior art shallow salt systems.

Figure 1F:
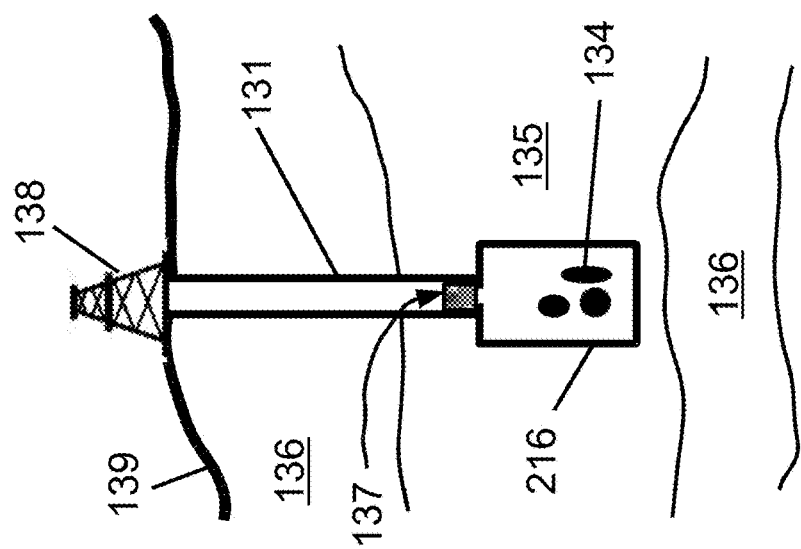
FIG. 1F may be a prior art schematic (cross-sectional side view) showing an overview of a prior art embodiment for the storage and/or disposal of radioactive materials within a human-made cavern drilled from the surface via a vertical wellbore and then reamed out in a disposal zone in a deep geological formation other than a deep salt formation and in which the HLW is stored inside the human-made cavern and a physical plug is implemented above the HLW inside the vertical wellbore.
Figure 1E:
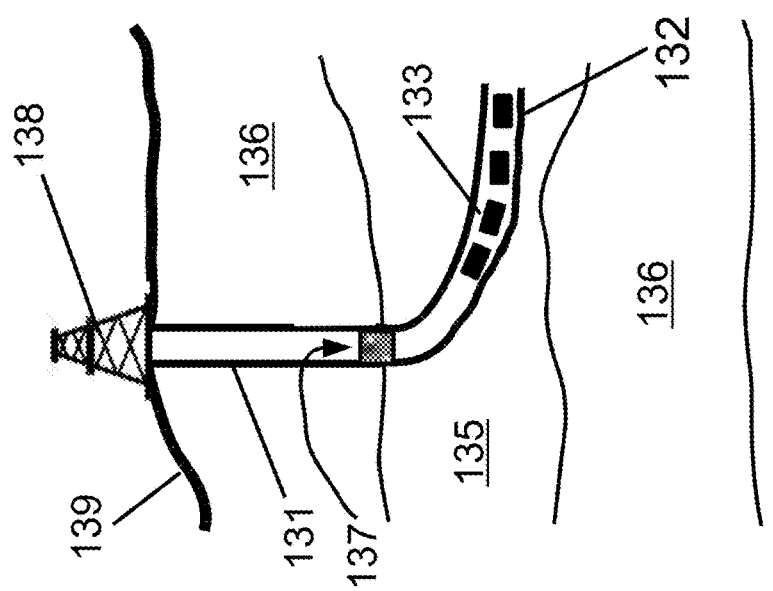
FIG. 1E may be a prior art schematic (cross-sectional side view) showing an overview of a prior art embodiment for the storage and/or disposal of radioactive materials within a horizontal (lateral) wellbore drilled from the surface then laterally into a disposal zone in a deep geological formation other than a deep salt formation and in which the HLW is stored inside the lateral wellbore and a physical plug is implemented above the HLW inside the vertical wellbore.
Figure 1D:
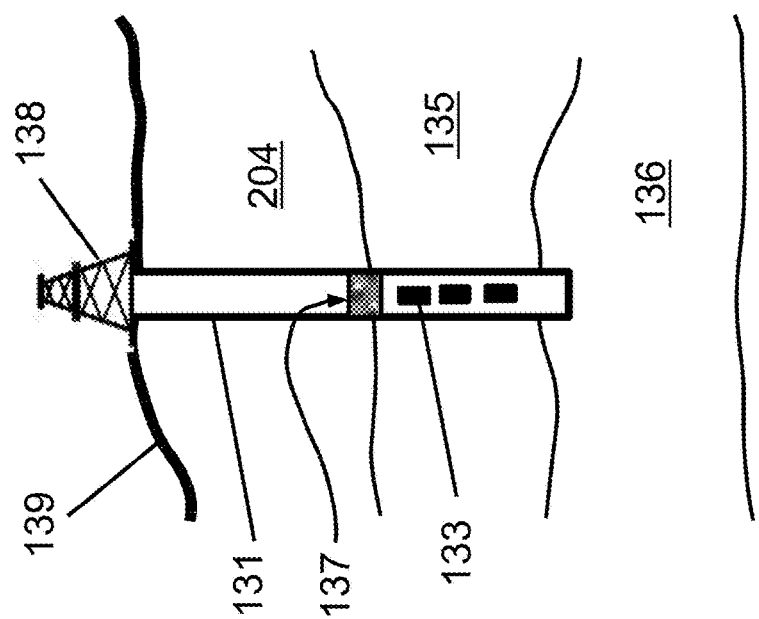
FIG. 1D may be a prior art schematic (cross-sectional side view) showing an overview of a prior art embodiment for the storage and/or disposal of radioactive materials within a single vertical wellbore drilled from the surface to a disposal zone in a deep geological formation other than a deep salt formation, and in which the HLW (high-level nuclear waste) is stored at the bottom of and inside the single vertical wellbore and a physical plug is implemented above the HLW inside the single vertical wellbore.

FIG. 1D illustrates a prior art example in which a vertical wellbore 131 is used to store HLW 134 material, within a waste capsule 133, in the wellbore 131, wherein the wellbore 131 is drilled into a "deep geological formation 135." Deep geological formation 135 may be disposed within other formations 136. As practiced today, the deep geological formation 135 is not considered a salt formation nor a deep salt formation 401. Today, the prior art contemplates these deep geological formations 135 to be various types of sedimentary rocks like shale, siltstone, conglomerates, limestones or clays; rather than targeting deep deformable salt zones 401. None of these types of prior art deep geological formations 135 allow creep to occur. The wellbore 131 is drilled out using a drilling rig 138 located on surface 139. Also shown in FIG. 1D is a wellbore plug 137 which is set in the vertical wellbore 131 to close off the HLW waste 134 material containing capsules 133 below the plug 137. This prior art embodiment has very low storage/disposal capacity of HLW 134 material in waste capsules 133 in the vertical wellbore 131 since it is contemplated to sequester the HLW 134 in waste capsules 133 in only the bottom section of the vertical wellbore 131 as far away from the surface 139 as possible (i.e., the majority of the wellbore 131 has no waste capsules 133). Further, stacking waste capsules 133 of very heavy and dense HLW 134 material (e.g., high density approximately nineteen [19] grams [g] per cubic centimeter [$cm^3$]) may create high bottom hole pressures leading to collapse of wellbore 131 casing material (e.g., steel liners and/or concrete/cement).

FIG. 1E illustrates a prior art example in which a conventional vertical wellbore 131 is connected to a lateral wellbore 132 and the lateral wellbore 132 is used to store waste capsules 133 (the waste capsules 133 contain the HLW 134 material). The lateral wellbore section 132 is drilled into the deep geological formation 135. Also shown in FIG. 1E is a wellbore plug 137 which is set in the vertical wellbore 131 section to close off the HLW 134 waste material below the plug 137. In this prior art embodiment, there is not a possibility of high bottom hole pressures since the HLW 134 is not stacked vertically but extends laterally across the disposal zone of deep geological formation 135 within the lateral wellbore 132.

FIG. 1F illustrates a prior art example in which a reamed out human-made cavern 140 is formed within the deep geological formation 135 and the human-made cavern 140 is utilized to store HLW 134 material. The reamed out human-made cavern 140 is under-reamed from a vertical wellbore 131 drilled from the surface 139 using a drilling rig 138. The human-made cavern 140 may store the HLW 134 in solid form. These human-made cavern(s) 140 are implemented in deep geological formations 135 consisting normally of shale or other sedimentary rocks (but not in deep salt formations 401). Also shown is a wellbore plug 137 which is set in the vertical wellbore 131 section to close off the HLW 134 material below the plug 137.

Figure 1G:
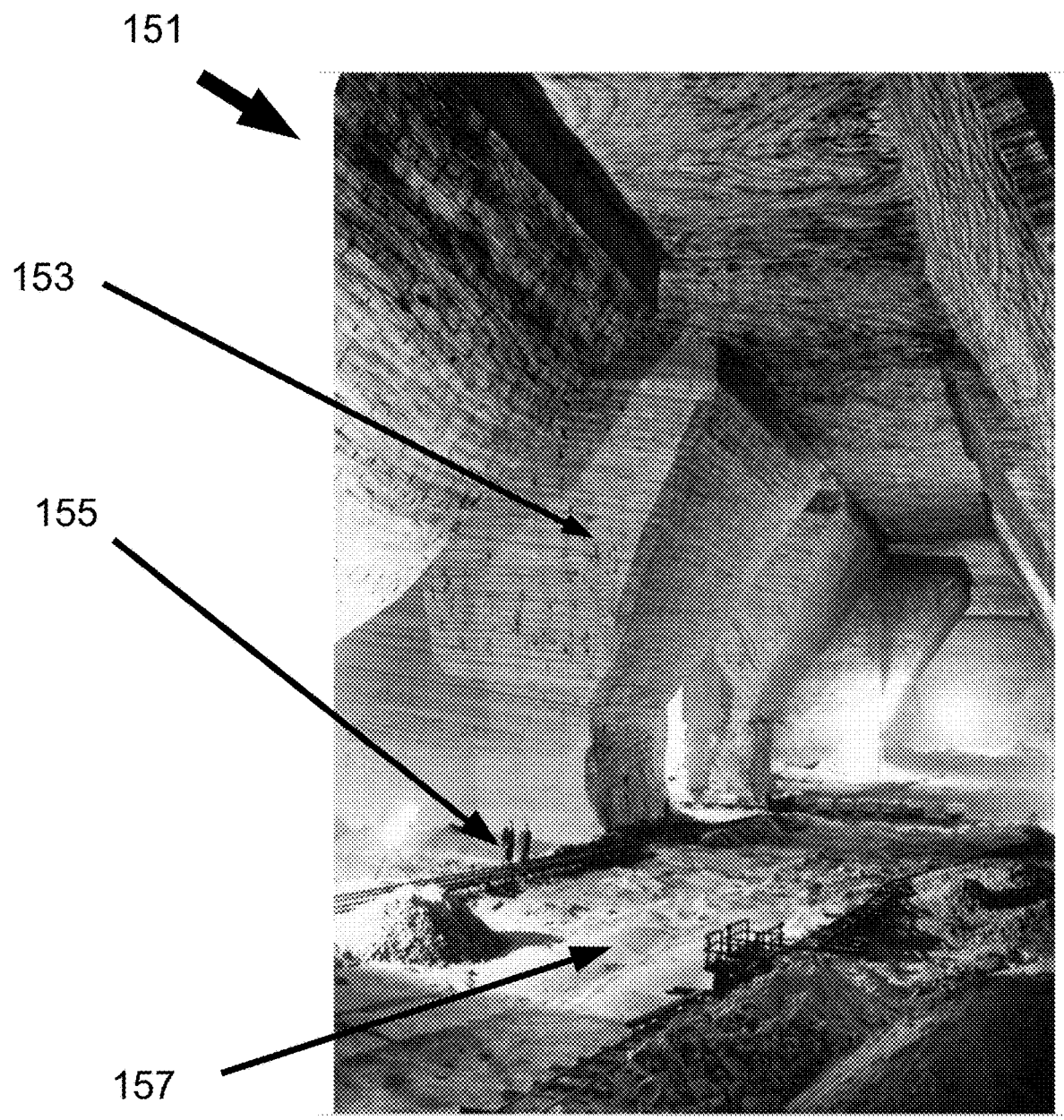
FIG. 1G may be a prior art pictorial illustration showing an overview of an operating surface salt mine today.

FIG. 1G illustrates an existing (2020) salt mine in which a hollowed-out salt cave 151 is implemented in a massive near surface shallow salt formation 153. For perspective, human sized figures 155 are shown on the salt floor 157 of the salt cave 151. This FIG. 1G illustrates the massive size of near surface salt deposits 153 and may provide a comparative sizing to the deep natural salt formations 401 utilized in at least some embodiments of the present invention. This shallow salt formation 153 in this FIG. 1G is only on the order of a few tens of feet thick; whereas, the deep salt formations 401 utilized in at least some embodiments of the present invention, have been measured at thousands of feet thick. With respect to deep salt formations 401 (not part of FIG. 1G), such thick zones at relatively great depths provide both the massive mass, geostatic pressure level, and the temperature conditions needed to initiate and provide creeping and sealing of the waste emplaced.

Figure 1H:
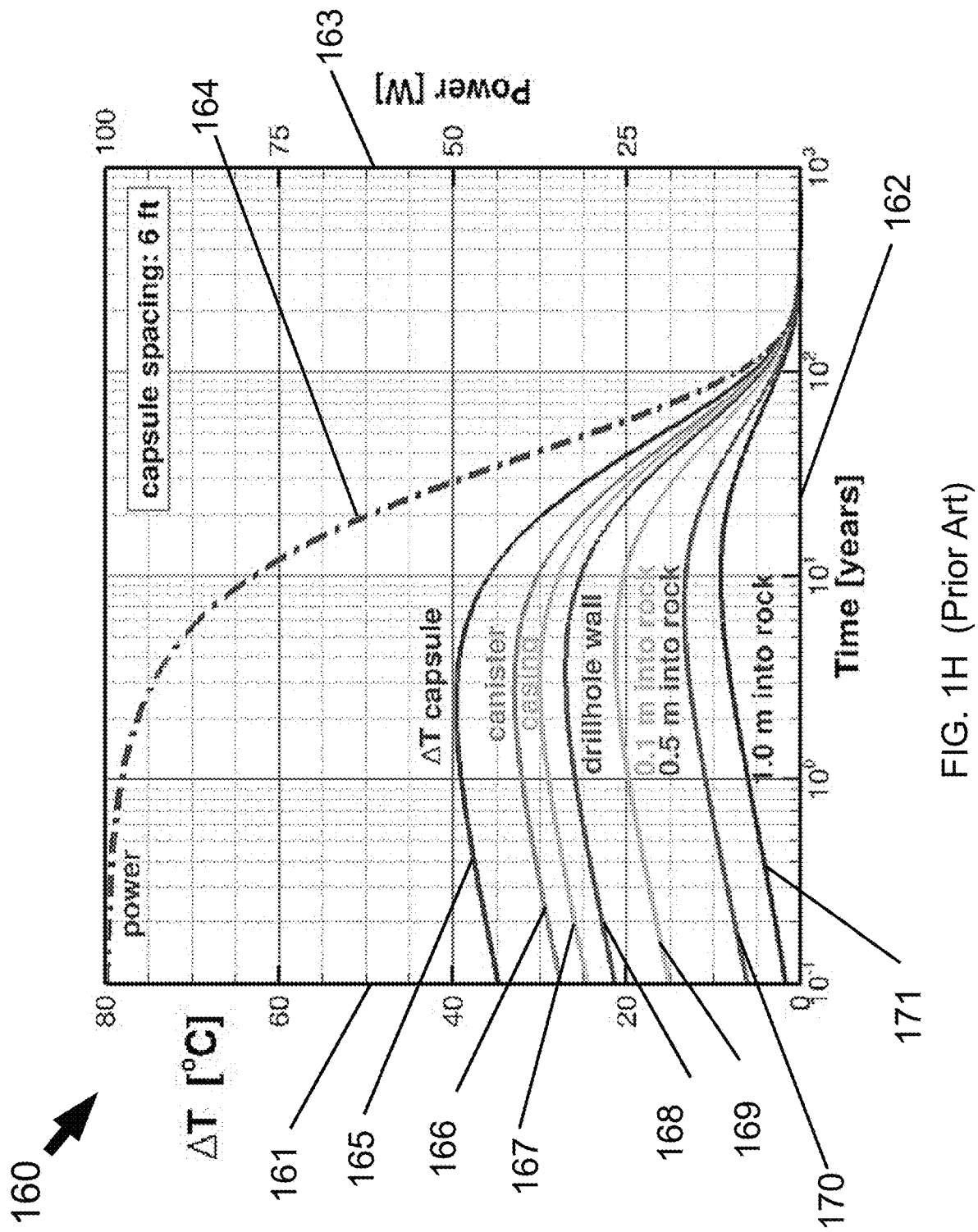
FIG. 1H may show temperature response curves of rock temperatures at various radial distances near a heat generating HLW containing canister disposed in a horizontal wellbore system in a rock formation.

FIG. 1H illustrates specific empirical temperature responses (heat pulse curves) and behavior of a deposited HLW/SNF containing waste capsule, within a casing, within a wellbore, within a geologic formation, with respect to a radial direction away from the HLW/SNF containing waste capsule and into the given host geologic formation of up to a distance of one (1) meter into that given host geologic formation. Note, the host geologic formation of FIG. 1H is not deep salt formation 401, rather is of some other type of geologic formation. However, the trends shown in FIG. 1H are applicable if the host geologic formation was deep salt formation 401. The data shown in FIG. 1H relates to a prior art experiment. (See e.g., Muller, Energies 2019, 12, 596; doi:10.3390/en12040596).

High-level nuclear waste (HLW), such as, but not limited to, spent nuclear fuel (SNF) assemblies keep generating sensible heat during the decay process after removal from the nuclear power plants. This rate decreases logarithmically with time. This property of the SNF assembly allows the SNF to reach a sufficiently low temperature level which can provide for a safe disposal process by keeping the generated temperature pulse at a safe and low-level.

The cooling period may be selected such that a maximum heat pulse expected in the capsule area (with HLW/SNF) of the repository does not create problems at the near wellbore region. The heat pulse is that temperature rise that occurs in the near wellbore region because of heat generated by the capsule (with HLW/SNF).

In this patent application, HLW 501/801 heat generation rate may be controlled by allowing sufficient time for the cooling of the SNF assemblies in the surface cooling ponds such that after sufficient time the HLW 501/801 may be cool enough for long-term/final disposal into a given deep salt formation 401. After some amount of surface cooling, the SNF assemblies may now be at an acceptable level of heat generation for final disposal into a given deep salt formation 401. This usually requires a matter of years of cooling pond residence.

In some embodiments, HLW 501/801 may be ready for long-term/final disposal into a given deep salt formation 401 after a predetermined time in the coolant ponds or in surface cooling cask(s). This minimizes the effects of any heat pulse problems in the waste repository region of the given deep salt formation 401.

Empirical studies have indicated that a maximum heat pulse of less than 100 degrees Celsius (° C.) may be easily obtained in HLW 501/801 capsule walls in about ten (10) years after disposal. A temperature rise at 0.1 meters into a geologic formation rock wall is less than 50 degrees Celsius (° C.); and is less than 25 degrees Celsius (° C.) at 0.5 meters into the geologic formation rock.

In this patent application, a level of a heat pulse may easily be attenuated by rapid heat conduction into relatively high thermal conductivity deep salt formation 401 zones (e.g., with a relatively high thermal conductivity of 2.0 to 9.0 watts per meter-Kelvin (W/mK)) which are the preferred geological systems for HLW disposal in this patent application. Note, the horizontal disposal wellbore region 507 is of relatively small diameter, being on the order of inches, as compared to the massive deep salt formation 401 being on the order of miles that entirely surrounds the horizontal disposal wellbore region 507. Because of such significant differences in the orders of magnitude, the combined physical system may essentially be called an "infinite line source model" conducting into an "infinite medium." This "infinite line source model" heat flow is a very easy equation to solve and analyze and has been solved analytically in 1882 (Kelvin) without the need of computers.

Continuing discussing FIG. 1H, the heat pulse graphic 160 comprises a set of axes and a set of empirically derived curves (e.g., 164, 165, 166, 167, 168, 169, 170, and 171). The temperature axis 161 (left vertical axis) shows the incremental rise in degrees Celsius for the sample conditions. The logarithmic time axis 162 (bottom horizontal axis) is horizontal from a matter of days to 1,000 years. The vertical power axis 163 (right vertical axis) indicates the generation power level in watts (W). The power decline curve 164 illustrates how the generated power is reduced over time. The temperature response curves are shown for different radial locations in the physical regions of the near wellbore. As expected, the first and highest temperature is the temperature curve 165 of a deposited waste capsule within a wellbore, within a geologic formation. Radially outward from the waste capsule is the waste capsule wall temperature 166. Radially outward next is the temperature of the well casing curve 167 (i.e., the well casing located where the waste capsule is located). Radially outward next is the temperature of wellbore wall curve 168 (i.e., the wellbore wall drilled out from the given formation at where the waste capsule is located). Radially outward next is the temperature curve 169 at 0.1 meters (m) into the host rock formation. Radially outward from the next location at a distance 0.5 meters (m) into the host rock formation is the temperature curve 170. Radially outward at a further distance is of one (1.0) meter (m) into the host rock formation is temperature curve 171. At one (1) meter into the host rock formation temperatures from the given HLW containing waste capsule that is only one (1) meter away are negligible.

In the case of a deep massive salt formation 401 the thermal conductivity is relatively high (e.g., higher than the host rock formation of FIG. 1H) and thus, heat pulse curves similar to those of FIG. 1H but with the host formation instead being deep massive salt formation 401, the heat pulse curves would show generally lower rises over time as the heat is conducted away from the heat source at a quicker rate. That is, with the host formation instead being deep massive salt formation 401, all the temperature curves 165, 166, 167, 168, 169, 170, and 171 would be shallower (lower) on the vertical axis and the generated heat would diffuse faster and further into the deep massive salt formation 401 for the same total quantity of heat generated.

This thermal property of deep massive salt formation 401 has broad practical importance. The thermal properties of deep massive salt formation 401 allow for better design and long-term modeling of nuclear waste repositories behavior, analysis, and performance assessment.

Whereas, in contrast, relatively low thermal conductivity values of formations are characteristic for dry, unconsolidated sedimentary rocks, such as, but not limited to, gravels and sands. Higher thermal conductivity values are for most sedimentary and metamorphic rocks.

Comparatively, a bedded deep salt formation 401 is a better and more effective medium for HLW disposal and storage.

For example, the thermal conductivity values of various rock formations are as follows:
(a) Sandstones: 2.50 to 4.20 watts per meter-Kelvin (W/mK);
(b) Shales: 1.05 to 1.45 watts per meter-Kelvin (W/mK);
(c) Claystones and Siltstones: 0.80 to 1.25 watts per meter-Kelvin (W/mK); and
(d) Halite (Salt) and/or deep salt formation 401: 2.699 to 9.975 watts per meter-Kelvin (W/mK).

This high-level of thermal conductivity of salt (e.g., deep salt formation 401) assures rapid conduction of generated heat away from the horizontal wellbore 507 and into the massive deep salt formation 401 bed and consequently a lower temperature rise at the interface of the wellbore 507 with the surrounding deep salt formation 401. The deep salt formation 401 may be a better and improved disposal system for heat generating HLW materials because of the salts thermal conductivity properties.

FIG. 1I illustrates a distribution of underground salt deposits across the continental U.S. These salt deposits are extremely large areally and widely distributed, some in areas of limited population density and development. Many of these salt deposits are also very deep and many and/or portions thereof may qualify as a deep salt formation 401. The Permian Basin (Texas) reaches a depth of 29,000 feet, the Paradox Basin (Colorado) reaches below 14,000 feet. These potential areas would provide a more remote, "user friendly" atmosphere, for utilization of this type of HLW disposal operations as contemplated herein; and may be less likely to be targeted by public resentment. Not all the salt zones shown in FIG. 1I are likely to be deep enough to meet the criteria required for appropriate salt creep rate and for waste capsule embedding; however, pre-disposal analysis of potential/candidate deep salt formations, as taught herein, of these large available deep salt regions, would provide the required choice of depths and salt quality of the formations for the safe disposal of HLW as taught herein.

Figure 2:
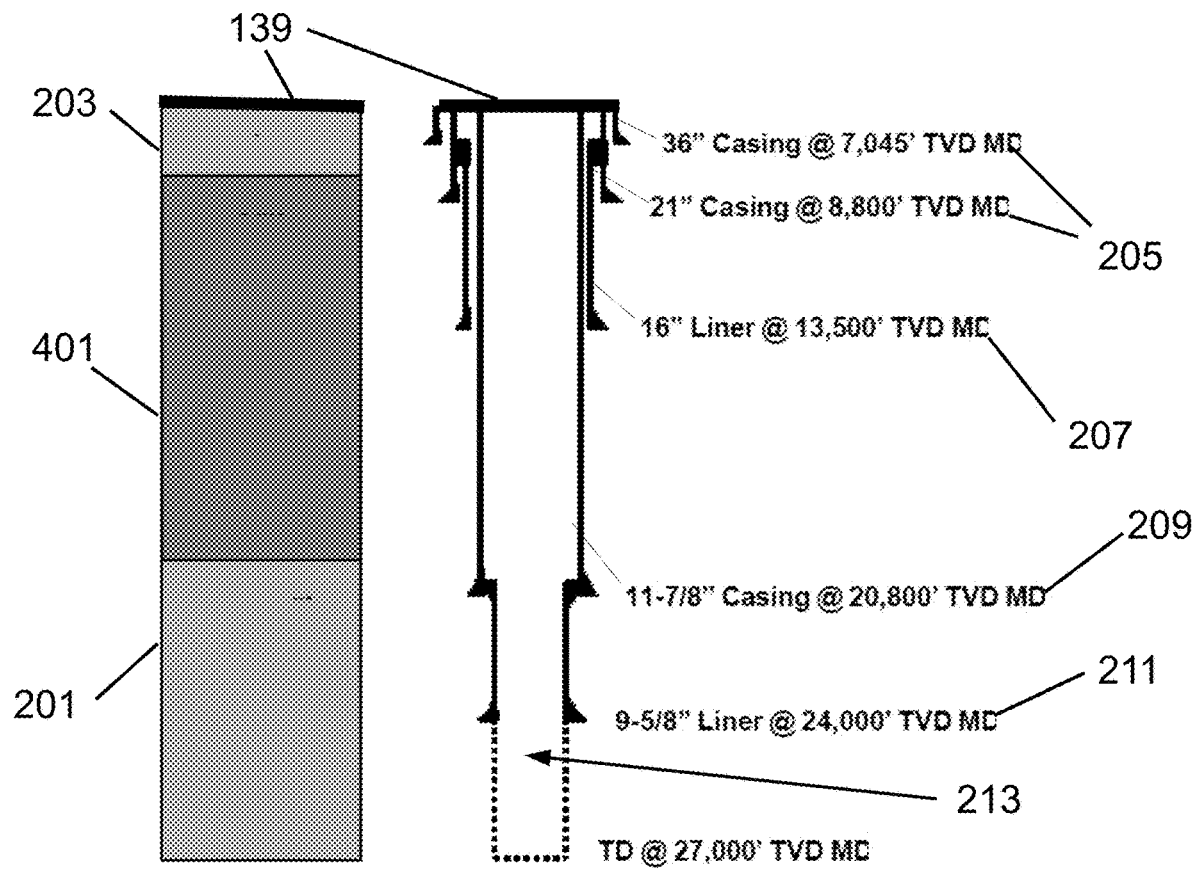
FIG. 2 may be a prior art schematic (cross-sectional side view) showing an overview of a typical well plan showing the formations generally encountered in deep drilling below deep salt formations for oil and gas exploration and production. This FIG. 2 well plan shows the implementation of casing/liner elements in the wellbore.

In FIG. 2, "refers to inches for wellbore diameters;" refers to feet for wellbore depths; TVD refers to "total/true vertical depth"; MD refers to "measured depth"; and TD refers to "total depth." In addition, casing and liner both refer to steel tubular "goods" or pipes used in the wellbores; however, liners may be internal to a casing string and "hung" from a "liner hanger" at a certain point in the wellbore and usually never cemented in place. Casing strings are usually always cemented completely or partially in the wellbore from the wellbore bottom to the surface in the oilfield drilling industry. The context may generally dictate the meaning of the casing or liner.

FIG. 2 illustrates the typical casing program and well plan used today (2021) in drilling for oil and gas which is produced from hydrocarbon zones that occur below the deep salt formations 401. The productive zones (zones with hydrocarbons to be extracted) are generally called pre-salt (below salt) productive formations 201 and/or supra-salt (above salt) productive formations 203. Pre-salt productive formations 201 and supra-salt productive formations 203 may be separated by a deep salt formation, which may be a deep salt formation 401. Pre-salt productive formations 201 and/or supra-salt productive formations 203 are often porous and/or permeable hydrocarbon containing sedimentary formations. Today pre-salt productive formations 201 productive oil and gas zones are usually in excess of 20,000 feet deep.

Pre-salt productive formations 201 may also be referred to as target zone 201. Target zone 201 may be reached by drilling a vertical wellbore from surface 139, using a drilling rig 138, to the desired depth in target zone 201. That vertical wellbore may be cased in steel liners/casings. In some instances, steel liners/casings may be installed inside the wellbore connecting wellbore section to another section in the wellbore. The casings/liners are sequentially installed in place from the surface 139 to the total measured depth (MD) of the wellbore. From surface 139 the vertical wellbore may be cased in casing string 205, then to liner 207, then to casing 209, then to liner 211, and lastly to open section 213 in target zone 201. In this FIG. 2 example, casing string 205 may have a diameter of thirty-six (36) inches to twenty-one (21) inches and a depth of 7,045 feet to 8,800 feet; liner 207 may have a diameter of sixteen (16) inches and a depth of 13,500 feet; casing 209 may have a diameter of eleven (11) and seven eighths (⅞) inches and a depth of 20,800 feet; liner 211 may have a diameter of nine (9) and five eighths (⅝) inches and a depth of 24,000 feet. Target zone 201 and open section 213 shown in FIG. 2 have a total/true vertical depth (TVD) of 27,000 feet (ft) in measured depth (MD). In the target zone 201 there may be an open-hole section that has an uncased wellbore zone 213. The open hole section 213 may be considered to be a "cylindrical void" or hollow cylinder surrounded by virgin, usually undisturbed sedimentary rock.

Figure 3:
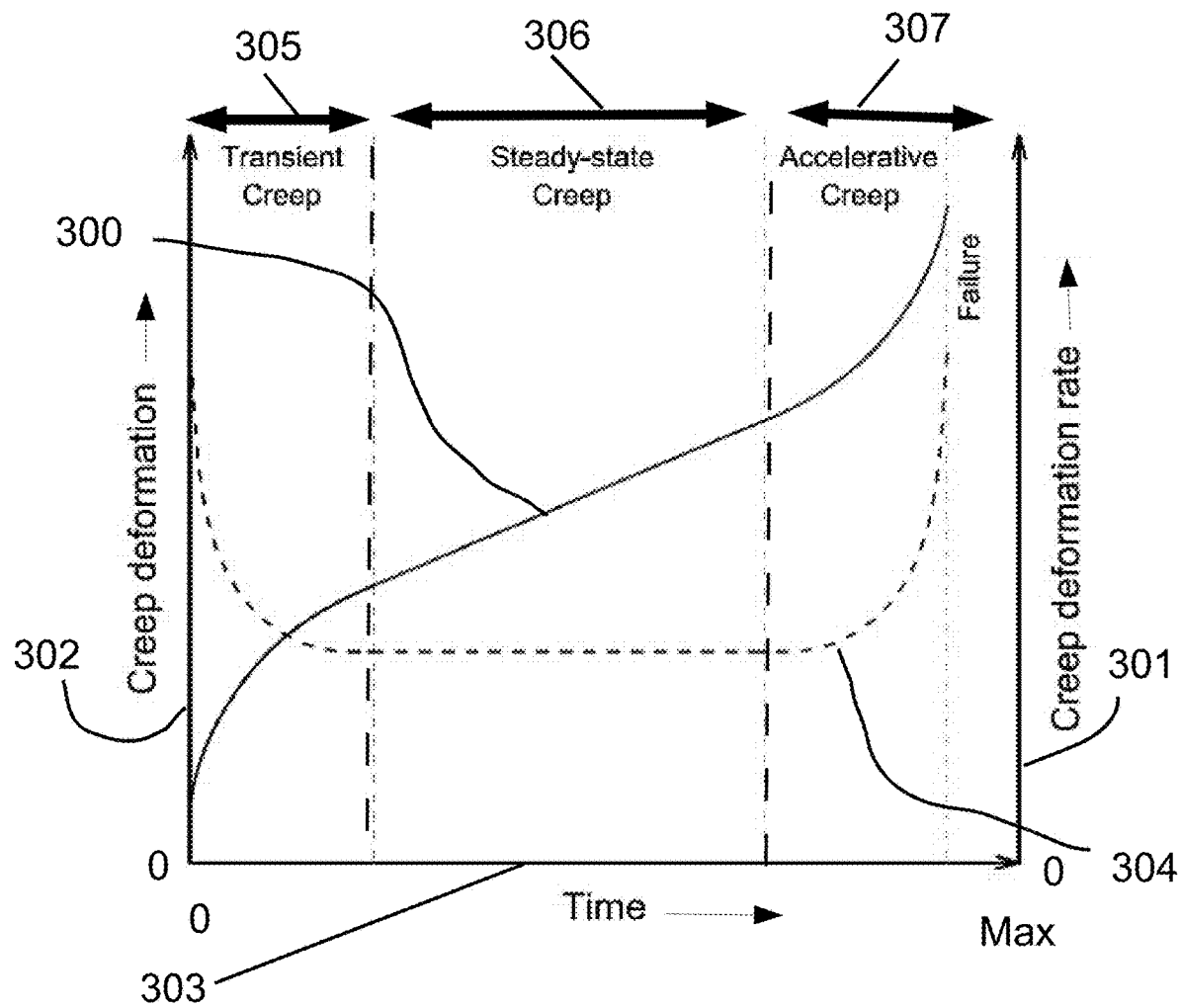
FIG. 3 may illustrate the behavior of deep salt material undergoing stress. Deep salt is primarily a massive halite (sodium chloride [NaCl]) deposit.
Figure 4:
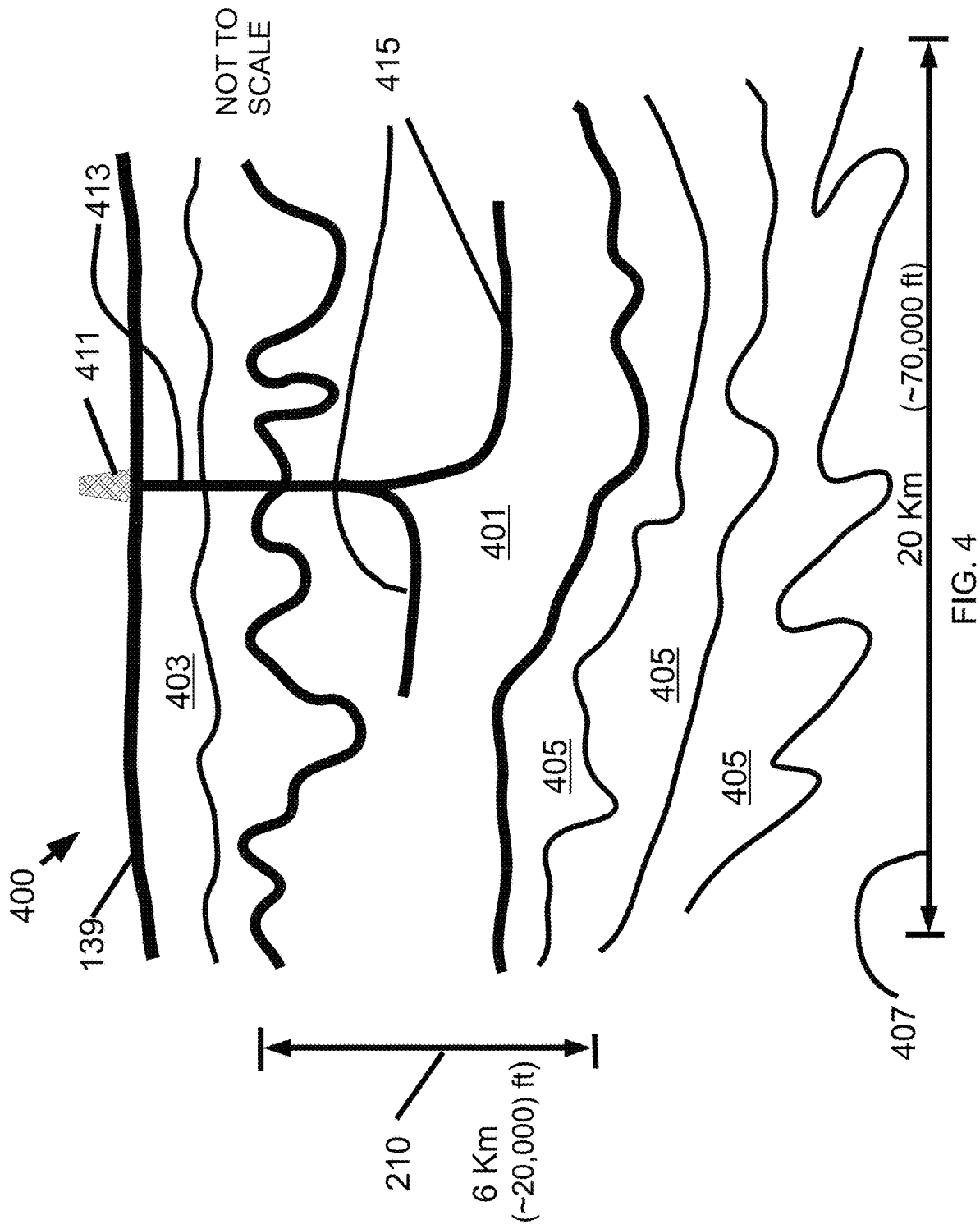
FIG. 4 may illustrate a cross-section of the typical geological zones in which a given deep salt formation and sedimentary rock formations coexist in natural settings.

FIG. 3 illustrates the behavior of deep salt formation 401 material undergoing stress. In this patent application, deep salt formations 401 refer to the deep "bedded" salt zones, deposits, and/or formations as distinguished from the "salt domes" which are intrusive rock systems within existing sedimentary formations. For example, FIG. 1A shows a portion of a salt dome formation 103; whereas, FIG. 4 shows a portion of deep salt formation 401. Deep salt formation 401 material may primarily be a massive halite (i.e., sodium chloride/NaCl) deposit averaging ninety-six percent (96%) NaCl purity, and an overall density of about 2.1 grams per cubic centimeter (gm/cc), with some occasional trapped sediment inclusions. The impurities are often classified into three categories: anhydrites, other evaporates (e.g., sylvite, gypsum, and/or carnalite), and other impurities (e.g., quartz, dolomite, feldspar, and/or clay). Generally, in deep salt deposits 401, the most common salt is halite (NaCl). Other common salt deposits and/or minerals associated with these deep salt deposits 401 may be: sylvite, carnallite, polyhalite, gypsum, anhydrite, combinations thereof, portions thereof, and/or the like; however, these other common salt deposits and/or minerals are usually less prevalent than the halite. Another lesser-known variety of salt is tachyhydrite. In this patent application, deep salt operations in salt zone with measurable amounts of tachyhydrite, which level is determined by testing, are not recommended for disposal of HLW materials in the embodiments herein. That is, if a deep salt formation has measurable amounts of tachyhydrite then that deep salt formation may not be a deep salt formation 401. Deep salt formations 401 are often (typically) one or more of: non-radioactive, non-porous, low density, high velocity, electrically nonconductive, soluble, combinations thereof, portions thereof, and/or the like.

Salt rock (e.g., halite) is a geomaterial that exhibits an instantaneous elastic deformation upon loading and is prone to creep (i.e., time-dependent deformation) as a response to an imposed differential (deviatoric) stress. Creep is considered to be a time-dependent phenomenon. Research has shown that the phenomenon of creep occurs at the molecular level of the given salt mass. See e.g., FIG. 3.

These phenomena of creep and/or of elastic deformation may be critical to understanding at least some reasons why some prior art embodiments shown in FIG. 1A, FIG. 1B, and in FIG. 1C, utilizing shallow salts in their disposal processes may be incorrect and/or infeasible for HLW (or other radioactive materials) disposal. Some prior art means, e.g., FIG. 1B, use fragmented salt, granular or other large particulate padding material, as a packing mass or as a plug 111 which would hopefully coalesce and creep and completely embed the HLW material that has been stored. However, molecular level creep within high porosity particulate masses may be difficult to achieve, since there is considerable existing void space between the particles of the packing mass.

Under differential stress conditions, deep salt formations 401 deform plastically and/or creep due to their inability to sustain imposed deviatoric (unbalanced) stress and relax to an isotropic state of stress. Salt rock (present in deep salt formations 401) has the potential to flow when subjected to differential pressures/stresses. This intrinsic creep property provides at least some of the inventive concepts utilized herein in this patent application. Creep may allow the wellbore(s) 413/415 and/or human-cavern 803 to desirably and/or beneficially "close up" completely over a period of time resulting in sealing in the HLW 501/801 within the deep salt formation 401.

Regarding deep salt formations 401, the most common salt is halite (NaCl). Salt rock (including halite) exhibits very low permeability and porosity and is characterized by having a relatively high thermal conductivity. This property of high thermal conductivity may mean that any sensible heat generated during the decay of disposed of HLW 501/801 material deposited therein may rapidly be conducted away from the relatively/comparatively small mass of HLW 501/801 into the significantly much larger mass of a given deep salt formation 401. For example, considering a 100-foot radius sphere of halite (salt formation) deep salt formation 401 surrounding a single capsule of HLW 501 in a horizontal wellbore 507. The approximate weight of each such capsule of HLW 501 may be about one (1.0) metric ton (1,000 kilograms (Kg) or 2,200 pounds (lbs)) of radioactive material and is about 15 feet long. Whereas, the calculated weight of the 100-foot radius spherical salt deep salt formation 401 volume surrounding this waste capsule of HLW 501, and not including the waste capsule, is about 250,000, 000 Kg (i.e., deep salt formation 401 has a density of about 2.1 grams per cubic centimeter (g/cc)). For all practical considerations, the deep salt formation 401 that surrounds a given deposited waste capsule of HLW 501 material is essentially comparatively infinite from a heat sink perspective (and that is even further so when one also considers the high thermal conductivity the deep salt formation 401 material). This is an infinitely larger mass than the HLW mass, juxtaposed to the capsule and as such would absorb all the heat generated by this HLW heat source.

When drilling a salt body, such as a given deep salt formation 401, the existing differential stress between borehole 413/415 hydrostatic pressure and overburden pressure may disturb the equilibrium state of stress near the wellbore 413/415 within that salt body. As a result, the wellbore 413/415 may undergo permanent deformation and may begin to close up. This observed phenomena which may be detrimental in oilwell drilling, may now be utilized as a desirable and/or beneficial phenomena to provide closure and sealing of the wellbore 413/415 after HLW 501/801 materials have been deposited in the given deep salt formation 401.

In the laboratory, a salt specimen/sample (e.g., from a deep salt formation 401) may typically be subjected to triaxial and/or uniaxial creep tests to generate differential pressures and promote and test salt creep. In a conventional triaxial test, a cylindrical salt specimen/sample (e.g., from a deep salt formation 401) is subjected to a constant confining pressure while increasing the axial pressure and, consequently, strain/time curves (axial strain vs. time) may be plotted to assess salt creep with constant loading conditions for isothermal situations.

FIG. 3 shows the plotted data with respect to the various stages of deformation during the salt creep process with respect to a given sample of salt (e.g., halite) (e.g., from a deep salt formation 401). Horizontal axis line 303 indicates the time of creep. Vertical axis line 302 quantifies the creep deformation. Vertical line axis 301 represents the rate of change of the creep function. Deformation rate of salt (right vertical axis) 301 may be considered to the first derivative of the creep deformation (left vertical axis) 302. Line 300 shows the specific behavior of the salt as creep is initiated after the time equals zero (0) point. This initial zone (left-side) may illustrate transient creep, shown as horizontal zone 305. The creep value 300 increases rapidly in transient creep zone 305, then creep value 300 slows to an almost/near constant rate. This near constant rate is the "steady-state creep" shown as horizontal zone 306 and is mostly a straight diagonal line in the middle section of the graph on line 300. On the line 300 the slope is almost constant throughout steady-state creep zone 306, and this steady state or near constant value is shown as a dotted line 304 which shows the creep deformation rate as an almost level horizontal line. The last section of line 300 (in the upper right of FIG. 3) illustrates the accelerated rate of creep shown as horizontal zone 307 which occurs until failure and fracture of the salt occurs. See e.g., FIG. 3.

FIG. 3 also illustrates a fully creep deformation (such as deep salt formation 401) follows the following three stages: (1) first the transient creep 305 (also denoted as primary or non-stationary creep); (2) then steady-state creep 306 (also denoted as secondary or stationary creep); and (3) lastly, accelerating creep 307 (also denoted as tertiary or creep failure). Typically, during transient creep 305 the strain rate is significantly high after the application of differential stress. High deformation rate decreases with time until steady-state creep 306 reached where the deformation rate 300 is near constant. And then during accelerating creep 307 the deformation rate 300 may accelerate with time.

During the creep processes envisaged in this patent application, transient creep 305 and steady-state creep 306 processes may predominate in the closure of the wellbores 413/415 and/or the human-made caverns 803 used to dispose of the HLW 501/801 material located within a given deep salt formation 401.

One or more factors may affect creep closure in deep salt formations 401. These factors may be analyzed in this patent application to select the conditions suited for and/or appropriate for the disposal of HLW in deep salt formations 401 (see e.g., step 1003 of method 1000 in FIG. 10).

Several factors affect salt creep in deep salt formations. The creep-strain rate (300 and/or 304) shown in FIG. 3 depends on several factors, including differential stress, temperature, confining pressure, grain size, the presence of inclusions of free water and/or free-gas bubbles, portions thereof, combinations thereof, and/or the like. Specifically, temperature and differential stress can be main drivers for salt creep. These two major conditions (temperature and differential stress) may be present in the deep salt formations 401; and as such, deep salt formations 401 may be preferred locations for the disposal of HLW 501/801 materials therein.

The mobility of the salt material (of a given deep salt formation 401) varies depending on evaporite type, such as, but not limited to, "low mobility evaporites" versus "high mobility evaporites." Low mobility evaporites may be characterized as being desirable and/or beneficial deep salt formations 401 locations for HLW 501/801 disposal because of low mobility evaporites relatively low creep rate in comparison with other more "creepy" evaporites. A typical example of this kind of evaporite is halite (NaCl). In some embodiments of the present invention, the given deep salt formation 401 for HLW disposal location(s) may be mostly (substantially) of low mobility evaporites, such as, but not limited to, halite (NaCl). In some embodiments, deep salt formation 401 may be comprised mostly of at least one mobile evaporate. In some embodiments, the at least one mobile evaporate may be at least one low mobility evaporate. In some embodiments, the at least one mobile evaporate (of deep salt formation 401) may be mostly sodium chloride (halite/NaCl). However, the at least one evaporate of deep salt formation 401 must still have an acceptable creep rate for that at least one evaporate and/or for that deep salt formation to qualify as deep salt formation 401. In some embodiments, that acceptable creep rate may be selected from a range of 0.01 inches per day to 0.10 inches per day (e.g., 0.04 inches per day) as the creep rate for the at least one evaporate and/or for the deep salt formation. In some embodiments of the present invention, the given deep salt formation 401 for HLW 501/801 disposal location(s) may be mostly (substantially) of low mobility evaporites, since the low mobility evaporites may allow for sufficient time for emplacement of the HLW material(s) from the surface 139 via the vertical wellbore(s) 413 and/or lateral wellbore(s) 415 before the wellbore(s) 413/415 and/or the human-made cavern(s) 803 implemented in the salt zones 401 close off from creep.

High mobility evaporites may be characterized by a more aggressive (rapid) creep closure in the salt(s) (as compared to low mobility evaporites), increasing the risk of stuck drill pipe in drilling operations and/or of prematurely collapsed wellbores and/or human-made caverns. A typical example of this kind of high mobility evaporite is tachyhydrite. High mobility evaporites (such as, but not limited to, tachyhydrite) are not a preferred type of salt for disposal of HLW 501/801 materials therein in this patent application. In some embodiments, deep salt formation 401 may contain little to no tachyhydrite and/or other high mobility evaporites. In some embodiments, deep salt formation 401 may contain minimal tachyhydrite and/or other high mobility evaporites.

One published extraordinarily high salt mobility rate based on creep was a well drilled in the Campos Basin in Brazil. The closure velocity (rate) was obtained in the order of 0.05 inches per hour in halite. Some salts, including sometimes that of halite, with a creep rate of 0.05 inches per hour is too high to qualify such salt for use a given deep salt formation 401. This 0.05 inches per hour rate of deformation is extremely fast and would not be the type of salt formation which would be beneficial to disposal of HLW 501/801, since the open hole wellbore section would literally close off before the HLW 501/801 material is loaded into the salt zone from the surface 139. This high rate of closure in the salt zone may be detected during initial drilling operations since the drill pipe may "stick" due to the salt trying close around it while making the hole. This observation would allow the practitioners of the embodiments taught herein to closely analyze and observe the drilling operations to provide additional early input into the proper disposal selection of a proper deep salt formation 401, which may be mostly of halite of an appropriate creep rate. See also steps 1001 and/or 1003 of method 1000 in FIG. 10.

In some embodiments, a predetermined creep rate of deep salt formation 401 may be a range of 0.01 inches per day to 0.10 inches per day (in/day).

Table 1 shows an empirical dataset of creep rate (in inches per day [in/day]) by salt type and drilling mud weight while maintaining the same state variables (temperature and stress) for each salt type. During a set of drilling operations, with different drilling mud weights which translates to different downhole hydrostatic pressures, the following data was obtained for a set of various evaporites. (Note, Table 1 is also reproduced as FIG. 11 in the accompanying drawing figures.)

| Salt Creep in in/day vs mud weight (ppg) or psi/ft | | | | |
|---|---|---|---|---|
| Mud Weight (ppg) | 10.5 | 12 | 13 | 14 |
| psi/ft | 0.54 | 0.624 | 0.676 | 0.728 |
| Salt Type | Creep (in/day) | | | |
| Tachyhydrite | 5.628 | 2.1096 | 1.0392 | 0.4704 |
| Carnallite | 1.0008 | 0.3576 | 0.1608 | 0.0624 |
| Halite | 0.1248 | 0.0432 | 0.0192 | 0.0096 |

Table 1 (above) may show that at higher hydrostatic pressures in the wellbore, that the salt creeps at a slower rate into the wellbore.

In the Gulf of Mexico and Brazil offshore areas, some potentially important oil and gas plays are located below salt bodies. To reach the hydrocarbon section it is necessary to drill through thick salt layers, up to 20,000 feet (ft). These types of massive deep salt deposits 401 are well suited for HLW 501/801 disposal because of their higher geostatic pressures and high bottomhole temperatures. At the current time however, offshore disposal of HLW 501/801 is not allowed under international law.

Several models are described in the literature to simulate the time-dependent deformation under unequal stress conditions. This creep behavior is influenced by the salt layer thickness, formation temperature, mineralogical composition, water content, presence of impurities, and the extent to which differential stresses are applied to the salt body.

Some mathematical models may simulate the borehole creep process. A published equation that may be used to predict the radius R of the wellbore during creep behavior is shown below in Equation 1 (Eq. 1):

$$R = R_0 \exp\left(-\frac{(\sqrt{3})^{(n+1)}}{4n-2} A e^{-\frac{B}{T}} (p_0 - p_w)^n \Delta t\right) \quad \text{Eq. 1}$$

where A is the salt constant $1.42 \times 10^{-13}$ $(\text{psi})^{-n}$ $\text{sec}^{-1}$; B=8,000 and is the temperature exponent of the salt; T is the formation temperature in degrees Kelvin; n=(4.5) and is the stress exponent of the salt; $p_0$ is the horizontal in-situ stress in psi (pounds per square inch); $p_w$ is the wellbore pressure in psi; R is the radius after creep in inches; $R_0$ is the original wellbore radius in inches; and $\Delta t$ is the creep time or exposure time in seconds. For deep salt formations 401, some variables used in the Eq. 1 may be determined experimentally, some from field measurements and logging data, by computer simulation modelling, and by comparing real wellbore derived measurements to laboratory derived data; and/or the like.

This mathematical equation (Eq. 1) solution has been widely used when designing drilling operations in salt zone areas and may be used to compute the behavior of the wellbore closure during process in which the HLW 501 capsules and/or HLW 801 materials are landed or placed in the deep salt 401 storage zones. This type of mathematical simulation may be used in step 1003 of the flow chart in FIG. 10 of the process for this patent application.

The efficacy of deep salt formations 401 for HLW 501/801 disposal may depend on the ability of the deep salt to creep over time at an appropriate rate and completely seal the HLW 501/801 in place within that deep salt formation 401. In order to provide safe and adequate disposal of HLW 501/801 within deep salt formations 401, deep salt formations 401 should have certain characteristics and exhibit certain physical properties that may be particularly favorable for the development of HLW 501/801 repositories and the sequestering and storage of HLW 501/801 material within the deep salt formations 401. These characteristics of a given deep salt formation 401 may include the following: (1) appropriate volumetric size of the given deep salt formation 401; (2) appropriate natural plasticity and/or creep of the given deep salt formation 401; (3) numerosity and/or distribution of deep salt formations 401; (4) stability of the given deep salt formation 401; (5) high thermal conductivity of the given deep salt formation 401; (6) protective gamma-ray-shielding properties of the given deep salt formation 401; (7) the given deep salt formation 401 only undergoes minor (minimal) radiolytic change when exposed to radioactivity (below a certain predetermined threshold); portions thereof; combinations thereof; and/or the like.

Deep salt formations 401 that meet minimum required volumetric size(s) for safe disposal of HLW 501/801 are widespread around the world and plentiful in the United States of America (U.S.). Furthermore, in the U.S. these specific areas are generally characterized by low levels of seismic and/or tectonic activity; thus, the potential for seismic or tectonic damage to the repository deep salt formation 401 structures is greatly reduced. As shown earlier in FIG. 1I, there are hundreds of thousands of square miles of geological salt deposits in the U.S., many of which, portions thereof, may qualify for a deep salt formation 401. The geologic Michigan/Appalachian basin alone has over 250,000 square miles of possible deep salt formations in the subsurface. Other basins include the Permian, Gulf Coast, Paradox, Green River, and others have salt formations at various depths. However, not all deep salt formations meet the criteria for effective deep salt disposal as described in this application. In some embodiments of this patent application, an area of at least 20 miles by 40 miles of the deep salt formation(s) at sufficient depth of 10,000 feet or more below surface 139, and with salt formation thickness of at least 1,000 feet (below that depth), may be selected as a given deep salt formation 401, based on field geology, field stratigraphy and seismic analyses to provide adequate volumetric capacity and depth for drilling multiple horizontal wellbores 507 and to implement multiple human-made caverns 803. See also steps 1001 and 1003 of method 1000 of FIG. 10.

Deep salt formation(s) 401 exhibit natural plasticity and/or creep within a predetermined acceptable range. In some embodiments, the predetermined creep rate of deep salt formation 401 may be a range of 0.01 inches per day to 0.10 inches per day (in/day). Salt is capable of "self-sealing" fractures developed in it from such natural plasticity and/or creep; thus, preventing access by fluids along zones of weakness, a problem that may exist or be typical of other non-deep-salt geologic rock formations.

Deep salt formations 401 are numerous (widespread) enough and well dispersed enough around the world and in the U.S.; such that, if sites in many deep salt formations 401 were selected as HLW repositories, there would be a large enough quantity of potential disposal sites available for additional disposal of HLW 501/801 throughout the world and especially in the U.S. In other words, the deep salt formations 401, as a resource, are sufficiently numerous and distributed to accommodate disposal of all the world's present (and contemplated near future) HLW.

Geological, geochemical, and/or petrophysical analysis over decades has indicated that many deep salt formations 401 beds have remained undisturbed and have remained dry for tens to hundreds of millions of years, indicative of long-term integrity and non-dissolution by hydrologic systems of such deep salt formations 401. This stability of deep salt formations 401 is advantageous for HLW disposal repositories.

Rock salt, including those in deep salt formations 401, exhibits a high thermal conductivity or the ability to dissipate large quantities of heat rapidly compared to other non-salt-based rock forms. Thus, sensible heat generated by decaying HLW 501/801 materials, assemblies, and/or capsules may be dissipated sufficiently fast into the surrounding mass of the deep salt formations 401. This prevents and/or minimizes overheating of the waste capsule or development of undesirable hot zones near the HLW 501/801 material. The waste capsules may stay at relatively low temperatures, within desired and designed parameters for maintaining integrity.

Further, deep salt formations 401 material may exhibit protective gamma-ray-shielding properties. Deep salt formations 401 protective gamma-ray-shielding properties may be comparable to concrete. Deep salt formations 401 material may also exhibit a compressive strength similar to that of concrete.

Further still, deep salt formations 401 may undergo only minor (minimal) radiolytic change when exposed to radioactivity (below a predetermined threshold). Deep salt formations have been extensively drilled across the globe, both onshore and offshore today (2021). The oilwell drilling technology is known and developed to an extent in which drilling into and across 20,000 feet of deep salt formations 401 is possible.

Figure 5:
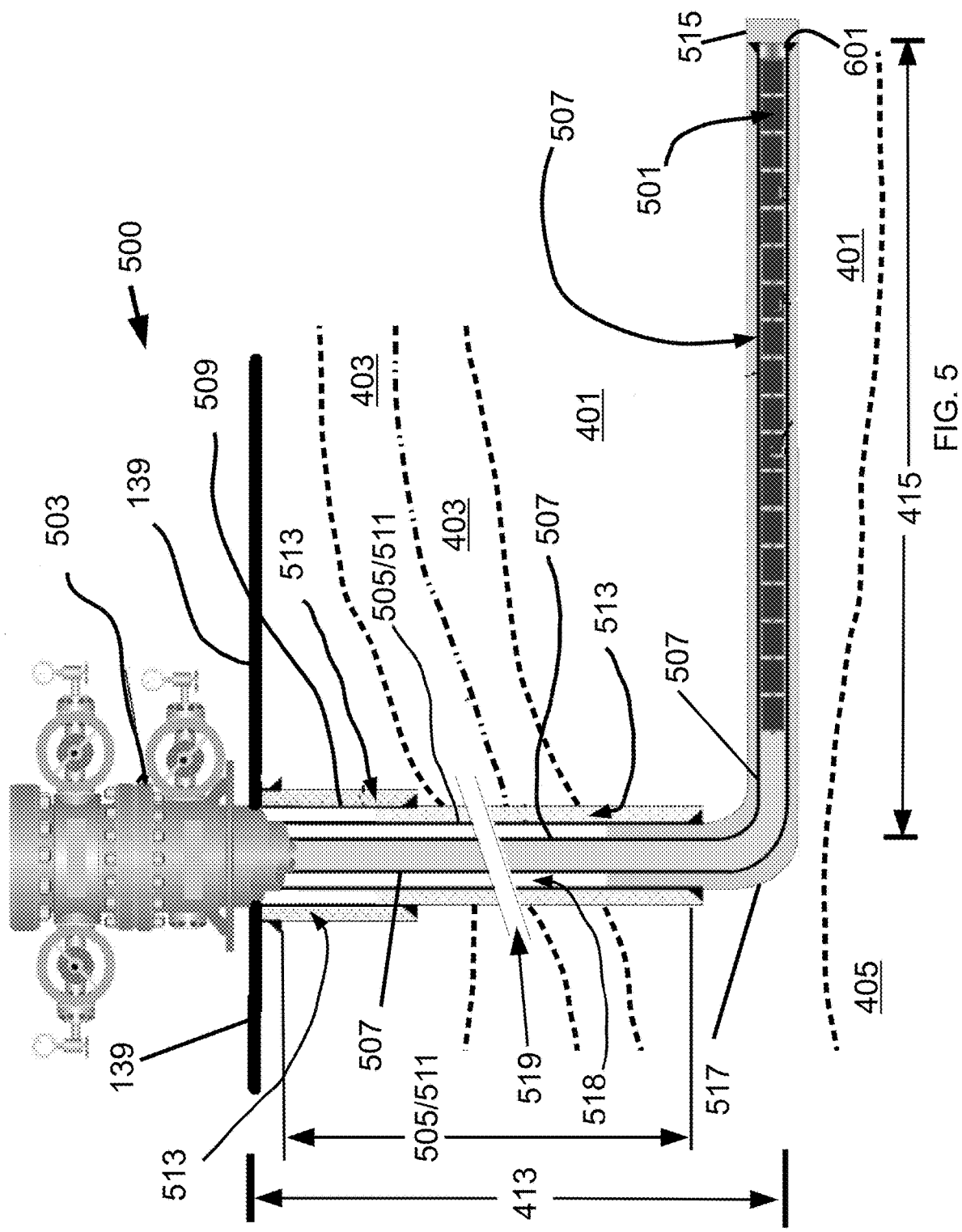
FIG. 5 may illustrate in cross-section an embodiment in which at least one nuclear waste disposal wellbore, with vertical and horizontal (lateral) sections, is implemented in the given deep salt formation. The casing plan of the well is shown and the location of waste capsules in the lateral wellbore are illustrated.

FIG. 4 illustrates at least a portion of a given HLW disposal system 400, wherein the HLW 501 is disposed (located and/or placed) within a given deep salt formation 401. (The HLW 501 is shown in FIG. 5.) FIG. 4 illustrates a cross-section of typical geological zones in which a given deep salt formation 401 may naturally coexist with other formations, such as, but not limited to, sedimentary rock formations. In some embodiments, deep salt formation 401 may be overlain by at least one other formation 403. In some embodiments, overlain other formation 403 may exist vertically above deep salt formation 401. In some embodiments, deep salt formation 401 may be underlain by at least one other formation 405. In some embodiments, underlain other formation 405 may exist vertically below deep salt formation 401. In some embodiments, overlain other formation 403 and/or underlain other formation 405 may be formation(s) different from deep salt formation 401. In some embodiments, overlain other formation 403 and/or underlain other formation 405 may be mostly non-salt formation(s). In some embodiments, overlain other formation 403 and/or underlain other formation 405 may be mostly sedimentary rock formation(s).

It is further illustrated in FIG. 4 that deep salt formation 401 is massive. For example, and without limiting the scope of the present invention, deep salt formations 401 have been routinely measured at more than twenty (20) kilometers (km) in lateral (horizontal) extent 407. For example, and without limiting the scope of the present invention, deep salt formations 401 have been routinely measured at an excess of six (6) km in vertical depth/thickness 409. In some embodiments, deep salt formation 401 may be found from 10,000 to 30,000 feet (ft) below surface 139. At these depths, deep salt formation 401 may have requisite physical properties and exist at the requisite temperatures such that deep salt formation 401 may be susceptible to appropriate and/or desirable plastic deformation and/or creep as discussed above (see e.g., the above FIG. 3 discussion); and wherein such plastic deformation and/or creep may occur when perturbations occur in the deep salt formation 401, such as, drilling wellbores into deep salt formation 401. In some embodiment, a minimum depth of about 10,000 feet, plus or minus (+/−) 1,000 feet, below surface 139 is suitable for deep salt formation 401 and subsequent operations therein.

In some embodiments, deep salt formation 401 may have a vertical dimension of at least one (1) kilometer (km) that extends vertically below a terminal location of a wellbore system. In some embodiments, the terminal location of the wellbore system is a location within a vertical wellbore 413 that is disposed away from surface 139 at or just below a highest point of deep salt formation 401, which may be at about 10,000 feet below surface 139 (plus or minus (+/−) 1,000 feet). In some embodiments, deep salt formation 401 may be from at least 500 feet thick to 5,000 feet thick or thicker. Some deep salt formations 401 may have a thickness greater than 5,000 feet.

In some embodiments, deep salt formation 401 may have horizontal (lateral) dimension(s) (areal extent) of at least one (1) kilometer (km) (below surface 139), wherein all of such horizontal (lateral) dimension(s) may be located about 10,000 feet below surface 139 (plus or minus (+/−) 1,000 feet) or more. In some embodiments, the areal extent of deep salt formation 401 may be at least 2,500 acres or about 4 square miles (or greater).

Note, many of U.S. deep salt deposits (see e.g., FIG. 1I) could be able to provide suitable deep salt formations based on these above noted dimensions (depth, thickness, and/or areal extent) physical criteria for qualifying as a given deep salt formation 401.

Continuing discussing FIG. 4, from surface 139, a given drilling-rig 411 may be used to drill a substantially (mostly) vertical wellbore 413 into deep salt formation 401. In some embodiments, vertical wellbore 413 may also be known as a pilot wellbore 413. In some embodiments, vertical wellbore 413 may terminate (disposed away from surface 139 and/or away from drilling-rig 411) into one or more of: at least one substantially (mostly) horizontal (lateral) wellbore 415, at least one human-made cavern 803, a HLW disposal location, portions thereof, combinations thereof, and/or the like—all and/or any of which may be located within the given deep salt formation 401. In some embodiments, HLW 501 may be disposed of within deep salt formation 401 and access to deep salt formation 401 may be from surface 139, via vertical wellbore 413 and/or horizontal wellbore 415. Note, the HLW 501 is not expressly shown in FIG. 4; however, in some embodiments, the HLW 501 may be disposed of in a terminal portion of vertical wellbore 413, horizontal wellbore 415, human-made cavern 803, portions thereof, combinations thereof, and/or the like—all and/or any of which may be located within the given deep salt formation 401. FIG. 4 shows two different horizontal wellbores 415 branching off of a single vertical wellbore 413; however, various embodiments of the present invention do contemplate other wellbore configurations. Note, a human-made cavern 803 is not shown in FIG. 4; see FIG. 8 for a human-made cavern 803.

In some embodiments, HLW disposal system 400 may comprise one or more of: (1) at least one vertical wellbore 413 terminating in a given deep salt formation 401; (2) at least one horizontal wellbore 415 terminating in the given deep salt formation 401; the at least one horizontal wellbore 415 connected to the at least one vertical wellbore 413; (3) at least one human-made cavern 803 in the given deep salt formation 401; the at least one human-made cavern 803 connected to the given at least one wellbore 413 and/or 415; (4) HLW 501 located within the given deep salt formation 401; the HLW coming to a final intended location being at least initially located within the at least one vertical wellbore 413, the at least one horizontal wellbore 415, the at least one human-made cavern 803, portions thereof, combinations thereof, and/or the like; (5) at least one drilling-rig 411; (6) at least one wellhead 503 (for each vertical wellbore 413); (7) wellbore 413/415 casings and/or liners; vertical liner 505; largest diameter casing/liner 509; medium diameter casing/liner 511; horizontal liner 507; portions thereof; combinations thereof; and/or the like. See e.g., FIG. 4 through FIG. 9. In some embodiments, after placement of the HLW 501/801 within the given deep salt formation 401, the wellbores 413/415 and/or the human-made cavern 803 may naturally close up and/or collapse, embedding and sealing the HLW 501/801 within the given deep salt formation 401, due to desired plasticity and/or creep of the given deep salt formation 401.

FIG. 5 illustrates at least a portion of a given HLW disposal system 500, wherein the HLW 501 is disposed (located and/or placed) within a given deep salt formation 401. In some embodiments, at least one vertical wellbore 413 and at least one lateral wellbore 415 both may extend into the deep salt formation 401. In some embodiments, the at least one vertical wellbore 413, may physically connect to the at least one lateral wellbore 415, such that materials (e.g., HLW 501) may be passed from the at least one vertical wellbore 413 to the at least one lateral wellbore 415 without exposure to surrounding environments. In some embodiments, both the at least one vertical wellbore 413 and the at least one lateral wellbore 415 may be configured to receive the at least one unit of HLW 501; with HLW 501 in the at least one vertical wellbore 413 intended to be temporary and transient and with the HLW 501 intended to be permanently deposited into the at least one horizontal wellbore 415. That is, the at least one vertical wellbore 413 may be a transportation means to reach the at least one horizontal wellbore 415. In some embodiments, a distal/terminal end of the at least one horizontal wellbore 415, disposed furthest away from an Earth surface 139, drilling-rig 411, and/or wellhead 503, may be a final depository location for HLW 501. In some embodiments, the at least one horizontal wellbore 415 may be a final depository location for disposal/storage of at least some HLW 501. In some embodiments, the at least some HLW 501 may be received into the at least one horizontal wellbore 415. In some embodiments, the at least one wellbore 413 may be a transit means (route) configured for transit of HLW 501 through the at least one wellbore 413 and into the at least one horizontal wellbore 415. In some embodiments, the at least one vertical wellbore 413 may be formed from drilling-rig 411 using drilling operations at a given drill site location on surface 139 above the given deep salt formation 401. In some embodiments, the at least one horizontal wellbore 415 may be formed from drilling-rig 411 using drilling operations at the same given drill site location on surface 139 above the given deep salt formation 401. In some embodiments, a distal/terminal end of the at least one horizontal wellbore 415 may terminate/end in/at toe 515 of the at least one horizontal wellbore 415.

Note, reference numeral 519 in FIG. 5 merely indicates the vertical lengths of the vertical wellbore 413 and/or its vertical casing/liner elements 505/509/511 may be greatly longer than could be shown reasonably in FIG. 5. That is, reference numeral 519 in FIG. 5 does not indicate a physical break in the vertical lengths of the vertical wellbore 413 and/or its vertical casing/liner elements 505/509/511.

Continuing discussing FIG. 5, in some embodiments, the at least one wellbore(s) 413/415 may be substantially cylindrical in shape. In some embodiments, a vertical wellbore 413 may be substantially orthogonal to the Earth's surface 139. In some embodiments, the horizontal wellbore section 415 may be substantially parallel to the Earth's surface 139 within a deviation of plus or minus (+/−) five (5) degrees from the horizontal.

In FIG. 5 and/or in HLW disposal system 500, the at least one vertical wellbore 413 and/or the at least one horizontal wellbore 415 may be (temporarily and/or transiently) lined with one or more liners and/or casings. In some embodiments, during wellbore 413/415 drilling operations or soon thereafter (e.g., soon after a given wellbore has been formed/drilled out), at least a section of the given newly formed wellbore 413/415 may be lined with one or more liners and/or casings. In some embodiments, such installed liners/casings may prevent premature collapse and/or closure of a given section of wellbore 413/415 within the given deep salt formation 401. Premature collapse and/or closure of a given section of wellbore 413/415 within the given deep salt formation 401 may be such collapse and/or closure before HLW 501 loading into the deep salt formation 401. In some embodiments, such installed liners/casings may facilitate the loading (transport) of the HLW 501 through a given wellbore 413/415 section and into a final resting location within the given deep salt formation 401. In some embodiments, after loading of at least some HLW 501 into a given location within the deep salt formation 401 (e.g., at least within a terminal/distal portion of horizontal wellbore 415), at least a portion of the liner(s)/casing(s) may be retracted (withdrawn) from the given wellbore 413/415 section. Such withdrawal/retraction operations of liners are shown in FIG. 6A through FIG. 6C.

Continuing discussing FIG. 5, in some embodiments, the one or more liners and/or casings of given wellbore 413/415 section(s) may also be referred to as a plurality of liners and/or a plurality of liners casings or a casing string. In some embodiments, vertical wellbore 413 may be lined with one or more liners and/or casings. In some embodiments, vertical wellbore 413 may be lined with a plurality of liners and/or casings. In some embodiments, vertical wellbore 413 may be lined with a casing string. A casing string may be a plurality of casings and/or a two or more connected sections of casings called "joints." Sections (e.g., sections of casings) may be connected via couplings. In some embodiments, horizontal wellbore 415 may be lined with one or more liners and/or casings. In some embodiments, horizontal wellbore 415 may be lined with a plurality of liners and/or casings. In some embodiments, horizontal wellbore 415 may be lined with a casing string. In some embodiments, the liners/casings of vertical wellbore 413 may be different from the liners/casings of horizontal wellbore 415.

Continuing discussing FIG. 5, in some embodiments, as distance increases away from a wellhead 503 at/on surface 139 along lengths of wellbore(s) 413/415, diameters of the wellbore(s) 413/415 may decrease. In some embodiments, as distance increases away from wellhead 503 at/on surface 139 along lengths of wellbore(s) 413/415, diameters of the casings/liners may decrease. In some embodiments, liner 507 may be referred to as horizontal liner 507 and may be deployed within horizontal wellbore 415; however, significant portions of liner 507 may be in a vertical orientation while other significant portions of liner 507 may be in a horizontal orientation as liner 507 may run from surface 139/wellhead 503 vertically downwards inside of vertical liner(s) 505 and then into horizontal wellbore 415. In some embodiments, exterior diameters of horizontal wellbore 415 liner(s) 507 may be less than any interior diameter of vertical wellbore 413 liner(s) 505. In some embodiments, horizontal wellbore 415 liner(s) 507 may be deployed and/or subsequently retracted through interior diameters of vertical wellbore 413 liner(s) 505. In some embodiments, deployment and/or retraction of casings/liners may be facilitated by wellhead 503 and/or drilling-rig 411. (Note, drilling-rig 411 is shown in FIG. 4 but not shown in FIG. 5, but drilling-rig 411 may be utilized in FIG. 4 or in FIG. 5 and wellhead 503 may be utilized in FIG. 4 or in FIG. 5.)

Continuing discussing FIG. 5, in some embodiments, vertical wellbore 413 liner(s) 505 may comprise largest (first) diameter liner 509 and medium (second) diameter liner 511. In some embodiments, an exterior diameter of medium (second) diameter liner 511 may fit into an interior diameter of largest (first) diameter liner 509. In some embodiments, medium (second) diameter liner 511 may be deployed and subsequently retracted through interior diameters of largest (first) diameter liner 509. In some embodiments, an exterior diameter of horizontal wellbore 415 liner(s) 507 may fit into an interior diameter of medium (second) diameter liner 511. In some embodiments, horizontal wellbore 415 liner(s) 507 may be deployed and subsequently retracted through interior diameters of medium (second) diameter liner 511.

Continuing discussing FIG. 5, a distal portion of a given liner/casing in that portion of the wellbore may be furthest away from surface 139 and/or furthest away from wellhead 503. In some embodiments, after largest (first) diameter liner 509 and medium (second) diameter liner 511 deployment, distal portions of largest (first) diameter liner 509 may be closer to surface 139 and/or closer to wellhead 503 than distal portions of medium (second) diameter liner 511. In some embodiments, prior to medium (second) diameter liner 511 retraction, distal portions of largest (first) diameter liner 509 may be closer to surface 139 and/or closer to wellhead 503 than distal portions of medium (second) diameter liner 511. In some embodiments, after medium (second) diameter liner 511 and liner 507 deployment, distal portions of medium (second) diameter liner 511 may be closer to surface 139 and/or closer to wellhead 503 than distal portions of liner 507. In some embodiments, prior to medium (second) diameter liner 511 and liner 507 retraction, distal portions of medium (second) diameter liner 511 may be closer to surface 139 and/or closer to wellhead 503 than distal portions of liner 507.

Continuing discussing FIG. 5, in some embodiments, the first short casing string (e.g., largest (first) diameter casing/liner 509) may protect groundwater near the surface 139 and the multiple inner casing strings (e.g., 511) may be installed all the way down to heel 517 of wellbore 413. In some embodiments, the liner 507 may be "hung" inside the inner most casing string 511. In some embodiments, liners 507 may not usually be cemented in place.

In some embodiments, a given vertical wellbore 413 may have a diameter from ten (10) inches (in) to forty-eight (48) inches (in), plus or minus (+/−) two (2) inches. In some embodiments, a given horizontal (lateral) wellbore 415 may have a diameter from ten (10) inches (in) to twenty-four (24) inches, plus or minus (+/−) four (4) inch.

Continuing discussing FIG. 5, in some embodiments, the at least one vertical wellbore 413 may have at least one diameter that is drilled at a particular and predetermined size. In some embodiments, wellbores 413 may have different diameters, but each different diameter may be of a fixed size. In some embodiments, a diameter of wellbore 413 may be from ten (10) inches to forty-eight (48) inches, plus or minus (+/−) two (2) inches. In some embodiments, the at least one vertical wellbore 413 may have a length from 10,000 feet to 30,000 feet total measured depth, plus or minus (+/−) 1,000 feet (which may place distal/terminal portions of the given substantially vertical wellbore 413 into the deep salt formation 401).

Continuing discussing FIG. 5, in some embodiments, each horizontal (lateral) wellbore 415 selected from a plurality of wellbores 415 may have a predetermined fixed diameter and a predetermined fixed length (which may yield the predetermined volumetric disposal capacity of the wellbore). In some embodiments, the predetermined diameter for a given horizontal (lateral) wellbore 415 may be selected from a range of ten (10) inches to twenty-four (24) inches, plus or minus four (4) inches; wherein the predetermined length for a given horizontal (lateral) wellbore 415 may be selected from a range of 500 feet to 15,000 feet, plus or minus (+/−) 100 feet.

Continuing discussing FIG. 5, in some embodiments, wellbore(s) 413/415 may be initially drilled by drilling-rig 411 (not shown in FIG. 5 but shown in FIG. 4), vertically downwards from the Earth's surface 139 until deep salt formation 401 is reached. In some embodiments, vertical wellbore 413 may be drilled through several geological zones of overlaying other formation(s) 403 between the surface 139 and the target disposal zone 401 (deep salt formation 401). In some embodiments, geological zone(s) of underlay formation(s) 405 may extend below the target zone 401 (deep salt formation 401). In some embodiments, vertical wellbore 413 may extend downwards vertically from surface 139 and into deep salt formation 401. In some embodiments, vertical wellbore 413 may vary from 10,000 feet (ft) to 30,000 ft in linear length, plus or minus (+/−) 1,000 ft. In some embodiments, horizontal (lateral) wellbore 415 may vary in linear length from 500 feet (ft) to more than 15,000 ft, plus or minus (+/−) 100 ft. In some embodiments, a given horizontal wellbore 415 may be referred to as a "SuperLAT™."

Continuing discussing FIG. 5, in some embodiments, the multiple wellbore casings/liners of a given wellbore 413/415 system may be of varying sizes. In some embodiments, the multiple wellbore casings/liners of the given wellbore 413/415 system may be concentrically installed to allow environmental protection of near surface 139 waters and other zones whose protection may be required by regulatory agencies, laws, and/or prudence. In some embodiments, these casings/liners may be placed in the drilled-out wellbore 413/415 section. In some embodiments, at least some of the emplaced casings/liners within the wellbore 413 section(s) may then be cemented in place by pumping/injecting cement 513 down the bore of the wellbore 413 section(s) and allowing that pumped in cement 513 to circulate into an outside annulus between casings/liners and/or between casings/liners and formation wall surfaces and then with portions of the pumped in cement 513 returning to the surface 139 via such annuli. In some circumstances, cement 513 may only fill the annulus partially to the top, with an annular section without cement at the top of a given casing string. The initial or largest outermost casing may always be cemented to ground level 139 (e.g., to protect potable water zones). Note, such a casing cementing process is routine and well-known in many oilfield operations.

Continuing discussing FIG. 5, in some embodiments, it may be portions of the vertical wellbore 413 that receive cemented in casings/lining(s) (e.g., liners 505, 509, and/or 511). In some embodiments, casings/linings of horizontal wellbore 415 (e.g., liner 507) may not be cemented in. In some embodiments, casings/linings of horizontal wellbore 415 (e.g., liner 507) may be retractable. In some embodiments, cemented in casings/linings may not be retractable.

Continuing discussing FIG. 5, in some embodiments, casings and/or liners (such as, but not limited to liners 505, 507, 509, and/or 511) of the given wellbore 413/415 system may be substantially (mostly) constructed from structural and/or rigid materials. In some embodiments, casings and/or liners (such as, but not limited to, liners 505, 507, 509, and/or 511) of the given wellbore 413/415 system may be substantially (mostly) constructed from one or more of: a metal, steel, a plastic, a ceramic, a composite, a laminate, portions thereof, combinations thereof, and/or the like. In some embodiments, at least some portions of casings/liners of the given wellbore 413/415 system may be at least partially lined with cement 513. In some embodiments, at least some exterior portions of casings/liners of the given wellbore 413/415 system may be at least partially in contact with cement 513.

Further, illustrated in FIG. 5 may be wellhead 503 apparatus which may allow control, manipulation, and/or movement of materials, services, and/or equipment entering and/or leaving the below located wellbore 413/415 system. In some embodiments, wellhead 503 may allow suspending and/or hanging of various systems (e.g., casings and/or liners) from the surface 139 and into the wellbore 413/415 sections below.

Continuing discussing FIG. 5, in some embodiments, casings and/or liners (such as, but not limited to, liners 505, 507, 509, and/or 511) of the given wellbore 413/415 system may be utilized to facilitate HLW 501 disposal operations into a particular location(s) in deep salt formation 401. In some embodiments, a given liner (such as, but not limited to, liners 505, 507, 509, and/or 511) may comprise connected or coupled "strings" of casings (pipes or hollow cylindrical elements). In some embodiments, a given liner (such as, but not limited to, liners 505, 507, 509, and/or 511) may be hung inside a given wellbore 413 section and may be hung from the surface 139 level or from a lower distance in the wellbore 413 below the top of the well. In some embodiments, a given liner (such as, but not limited to, liners 505, 507, 509, and/or 511) may be hung from an installed liner hanger apparatus (not shown inside the wellhead 503). Such liner hanging (deployment) may be routine and common in oilfield operations.

Continuing discussing FIG. 5, in some embodiments, liner 507 may be hung from the wellhead 503, inside the vertical casings 505, and allowed to extend completely to a bottom or a most distal/terminal end of the horizontal (lateral) wellbore section 415. This distal/terminal end may be referred to as a toe 515 of the wellbore 413/415 system. A position where the horizontal (lateral) wellbore 415 meets the vertical wellbore 413 section, i.e., the curved section between the vertical and horizontal sections, may be called a heel 517 of the lateral wellbore 415. This hanging or liner landing process is routine in the oil industry and the liner is suspended, attached, deployed, and/or "hung" from a liner hanger apparatus, (not shown), inside the wellhead 503. In some embodiments, the wellbore 413/415 system liners become a continuous conduit which allows HLW 501 to be transferred from the surface 139, past the heel 517 of the wellbore, and eventually to the toe 515 of the horizontal (lateral) wellbore 415.

Continuing discussing FIG. 5, in some embodiments, the horizontal (lateral) wellbore 415 may extend from heel 517 to toe 515. In some embodiments, the horizontal (lateral) wellbore 415 may be completely surrounded by deep salt formation 401 material, except where 415 joins to vertical wellbore 413 (but even that transition region of the wellbore [horizontal to vertical] is located within deep salt formation 401). In some embodiments, internal to horizontal wellbore 415 may liner 507 (at least until liner 507 is retracted back through liner 505). In some embodiments, this liner 507 may not be cemented to the wellbore sides and/or to other liners; but rather, liner 507 may be resting free on/against portions of the deep salt formation 401 and liner 507 may be axially (laterally) pulled back (retracted) from the surface 139 and towards surface 139.

Continuing discussing FIG. 5, once liner 507 may be hung and deployed, reaching toe 515, one or more discreet packets of HLW 501 may be loaded from surface 139 into liner 507 and then delivered within liner 507 towards toe 515, within the deep salt formation 401. In some embodiments, such a discrete packet of HWL 501 may be a capsule or a container containing a set/predetermined amount of HLW 501; i.e., it may be these capsules/containers that contain HLW 501 that may be loaded into the liner 507 and that may move downwards through the liner 507 and to final resting locations within deep salt formation 401. In some embodiments, only the first such loaded HWL 501 capsule/container may actually reach to toe 515, with subsequently loaded HLW 501 capsules/containers being spaced away from toe 515 by their loading order and the overall length of the HLW 501 capsules/containers therein. FIG. 5 shows a plurality of such HLW 501 capsules within liner 507, within horizontal wellbore 415, within deep salt formation 401, but only one such HLW 501 capsule is at toe 515. In some embodiments, when all HLW 501 capsules (for a given horizontal wellbore 415) reach their final resting locations within that deep salt formation 401, all such HLW 501 capsules will be located between heel 517 and toe 515 of that given horizontal wellbore 415.

Continuing discussing FIG. 5, in some embodiments, the given deep salt formation 401 that is adjacent to and surrounding horizontal wellbore 415 may creep into horizontal wellbore 415 and is expected to completely fill horizontal wellbore 415 void spaces around the deposited HLW 501 capsules, sealing the deposited HLW 501 capsules within that section of deep salt formation 401. In order to facilitate this desirable creep/seal phenomenon or process to occur, liner 507 may be removed from horizontal wellbore 415, in a partial and/or a sequential manner, after a given section of liner 507 has received a HLW 501 capsule that is no longer moving with respect to horizontal wellbore 415. This liner 507 retrieval process is shown in FIG. 6A through FIG. 6C.

Continuing discussing FIG. 5, in some embodiments, annulus 518 may be an annulus of void space between an exterior of interior liner 507 and an interior of casings/liners 505/511 that may surround liner 507. This annulus 518 may facilitate deployment and/or retraction of liner 507. In some embodiments, annular 518 may be devoid of cement, such as cement 513.

Note, in the oilfield industry, there are generally two types of liners. First, there are solid walled liners (standard liners), which are steel casing materials or strings, made of solid walled cylinders. Secondly, there are "slotted" liners which have holes, perforations or openings cut into the walls of the casing strings that make up the slotted liners. These slotted liners are not a preferred use in embodiments of the present invention, since the creeping of salt into hundreds or thousands of such slots or holes of the slotter liners would create physical obstructions or salt protrusions into the slotted liners that may hinder deployment and/or removal of the slotted liner from the horizontal (lateral) wellbore 415 sections; which could cause problems, such as, but not limited to, depositing the HLW 501 through the liner(s). Thus, liner(s) and/or casing(s) utilized in the embodiments of the present invention are of the solid walled type. In some embodiments, liner(s) and/or casing(s) utilized in the embodiments of the present invention are not slotted liners.

FIG. 6A, FIG. 6B, and FIG. 6C collectively together may illustrate a sequence of operations that describes the processes of landing, depositing, and/or disposing of HLW 501 capsules into horizontal (lateral) wellbores 415 and subsequent retraction of liner(s) 507 to allow deep salt formation 401 creep to occur to seal the now deposited HLW 501 capsules. FIG. 6A, FIG. 6B, and FIG. 6C are, sequential in time (e.g., with FIG. 6A occurring before FIG. 6B and FIG. 6B occurring before FIG. 6C), partial cross-sectional diagrams of HLW disposal system 500 showing just the terminal/distal portions of vertical wellbore 413 (disposed away from surface 139) and showing the entirety of a given horizontal wellbore 415. FIG. 6A, FIG. 6B, and FIG. 6C do not show the upper portions of vertical wellbore 413, surface 139, drilling-rig 411, nor wellhead 503; however, those elements may be seen in FIG. 4 and/or in FIG. 5. In terms of temporal sequence, FIG. 6A occurs after FIG. 5; FIG. 6B occurs after FIG. 6A; and FIG. 6C occurs after FIG. 6B. In FIG. 5 there may be no liner 507 retraction. FIG. 6A may have some liner 507 retraction. FIG. 6B may have more liner 507 retraction than FIG. 6B and FIG. 6C may have the most liner 507 retraction shown.

Continuing discussing FIG. 6A, FIG. 6B, and FIG. 6C, in some embodiments, the vertical wellbore 413 may be drilled out from the surface 139 using drilling-rig 411 as discussed earlier in FIG. 4 and in FIG. 5. In some embodiments, at least some portions of newly formed vertical wellbore 413 may be cased/lined (e.g., with liner(s) 505, 509, and/or 511). In some embodiments, liner(s) 505, 509, and/or 511, all in the vertical orientation, may be cemented in place with cement 513. In some embodiments, drilling operations may continue using drilling-rig 411 such that horizontal wellbore 415 is formed from vertical wellbore 413; i.e., horizontal wellbore 415 extends horizontally from the distal/terminal portion of vertical wellbore 413. In some embodiments, a distal/terminal portion of vertical wellbore 413 and all of horizontal wellbore 415 may be located in deep salt formation 401. In some embodiments, horizontal wellbore 415 may extend to toe 515 in deep salt formation 401. In some embodiments, at least some of horizontal wellbore 415, up to toe 515, may be (temporarily) lined with liner 507. In some embodiments, liner 507 may not be cemented in place; rather, the horizontal portions of liner 507 may be in direct physical contact with portions of deep salt formation 401 where horizontal wellbore 415 was drilled through. In reality, between exterior surfaces of horizontal portions of liner 507 the wall surfaces of deep salt formation 401 that form horizontal wellbore 415 may be some void spaces. In some embodiments, liner 507, when fully deployed, may extend from surface 139 all the way to toe 515, with a terminal end 601 of liner 507 teaching to toe 515. (FIG. 6A shows terminal end 601 of liner 507 already retracted some distance away from toe 515; whereas, FIG. 5 shows terminal end 601 of liner 507 at toe 515.)

Continuing discussing FIG. 6A, FIG. 6B, and FIG. 6C, in some embodiments, once liner 507 may be fully deployed (or near so), one or more HLW 501 capsules (or without capsules) may be landed into liner 507 portions that are within horizontal wellbore 415, wherein horizontal wellbore 415 may be located within deep salt formation 401. In some embodiments, HLW 501 capsules may be landed either singly or in groups or strings into vertical wellbore 413 and ultimately into horizontal wellbore 415 (within the applicable casings/liners). Depending on the size and lifting capacity of the drilling-rig 411 and also on safety requirements, dozens of HLW 501 capsules may be connected serially and landed as a single group (string) in the wellbores 413/415 (within the applicable casings/liners). A typical HLW 501 capsule (with HLW) may weigh about one (1) metric ton (1,000 kilograms [kg] or about 2,200 pounds [lbs]), more or less; and a typical drilling-rig 411 lift operating capacity is in the hundreds of thousands of pounds. In some embodiments, once a given discrete packet of HLW 501 has reached a final stopping point in liner 507 (e.g., because a down hole HLW 501 has stopped moving or that HLW 501 has reached toe 515), at least some of liner 507 may be retracted such that the HLW 501 that has stopped moving in horizontal wellbore 415 is now uncovered of that portion of liner 507. Uncovered HLW 501 in horizontal wellbore 415 may be (or become) in direct physical contact with deep salt formation 401. Reference numeral "603" is the direction of retraction for liner 507 and also points to surface 139, drilling-rig 411, and/or wellhead 503. That is, liner 507 is sequentially and/or incrementally retracted from surface 139 via wellhead 503 as HLW 501 within horizontal wellbore 415 reach their intended final stopping/resting points. In some embodiments, the region of horizontal wellbore 415 now without a portion of liner 507 (because of some partial liner 507 retraction), i.e., the region of HLW 501 now able to be in direct physical contact with deep salt formation 401 may be designated as, "region of wellbore without liner 605." FIG. 6A shows the least amount/length of region of wellbore without liner 605; whereas, FIG. 6C shows the most amount/length of region of wellbore without liner 605; and with FIG. 6B showing an amount/length of region of wellbore without liner 605 being between that shown in FIG. 6A and that shown in FIG. 6C. In some embodiments, as more liner 507 is retracted, the amount/length of region of wellbore without liner 605 grows. In some embodiments, a maximum length of region of wellbore without liner 605 may be about the length of horizontal wellbore 415, to where liner 507 is stopped being retracted, such as, at or around heel 517. In some embodiments, a maximum length of region of wellbore without liner 605 may be from about heel 517 to toe 515.

In some embodiments, a rate of liner 507 retraction only need be slightly faster than the applicable creep rate 300 for that particular deep salt formation 401.

Continuing discussing FIG. 6A, FIG. 6B, and FIG. 6C, in some embodiments, region of wellbore without liner 605 may now be a region of horizontal wellbore 415 where creep from deep salt formation 401 will occur, wherein once such creep is at least mostly complete, the deposited HLW 501 will be sealed off entirely within the deep salt formation 401 and such regions of horizontal wellbore 415 will essentially cease to exist because of that creep. Over time, all that will remain is a horizontal length/chain of HLW 501 that is completely surrounded (entombed) and in direct physical contact with portions deep salt formation 401, see e.g., FIG. 7. In some embodiments, HLW 501 in region of wellbore without liner 605 may become in direct physical contact with portions of deep salt formation 401.

After all the HLW 501 capsules that were planned for disposal in that particular horizontal wellbore 415 are sequestered in region of wellbore without liner 605, the liner 507 may be removed completely from the horizontal wellbore 415 and the HLW 501 capsules are now in direct physical contact with a mobile and sealing deformable salt medium of deep salt formation 401. Using an example creep rate of halite of 0.04 inches per day (e.g., as discussed in the FIG. 3 and Table 1 discussion section), a twelve (12) inch horizontal wellbore 415 would be fully closed in about 300 days depending on the geostatic pressures. In a matter of less than two years, that deep salt formation 401 will completely engulf the deposited HLW 501 therein and fix that deposited HLW 501 in a deep massive repository of deep salt formation 401. See e.g., FIG. 6C.

Figure 6:
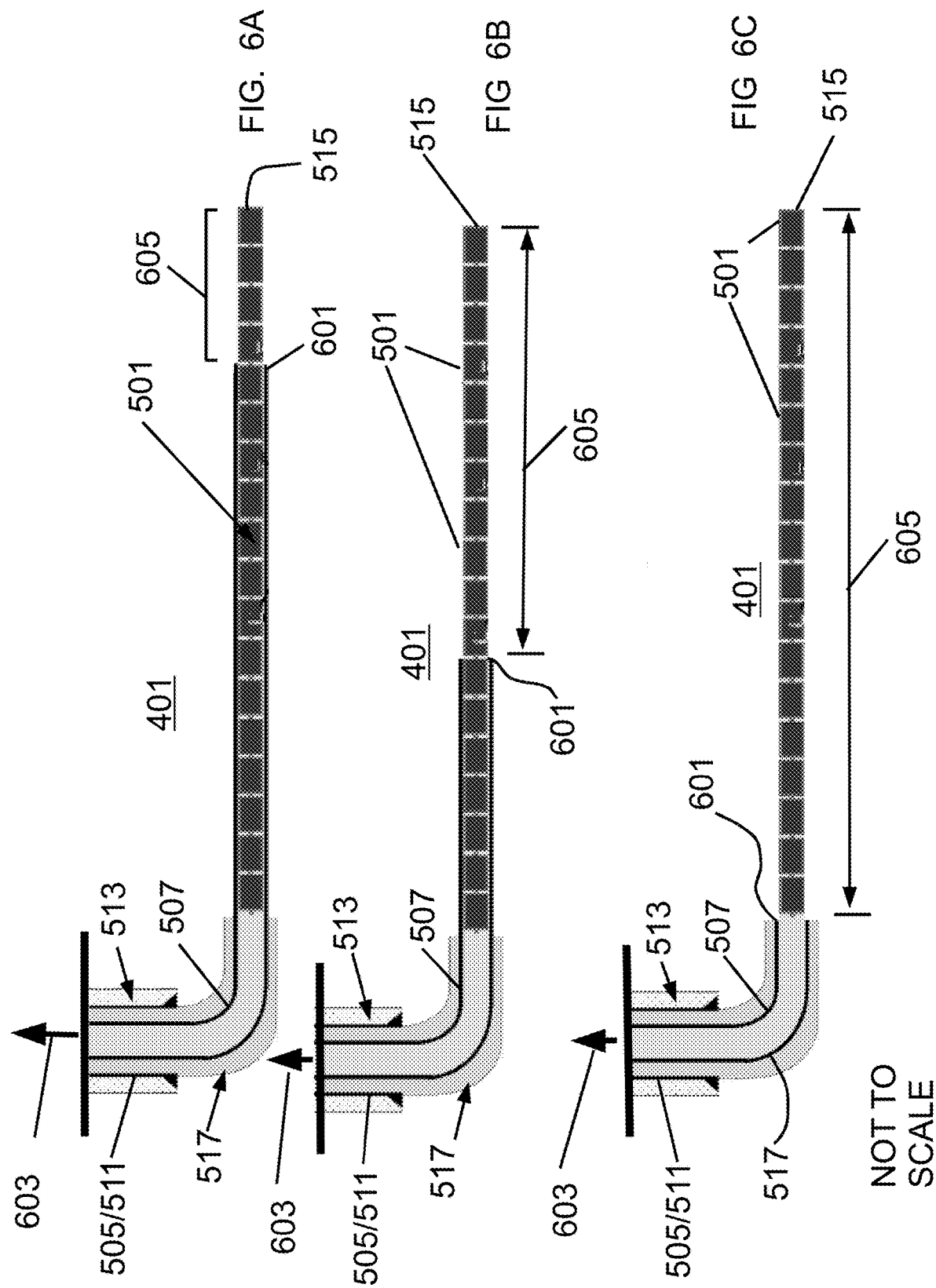
FIGS. 6A, 6B, and 6C all together may illustrate in cross-section an embodiment in which at least one nuclear waste disposal wellbore with a retractable liner is implemented in the given deep salt formation and the sequential operations to remove (retract) the retractable liner after landing of the waste capsules within the at least one horizontal wellbore.
Figure 7:
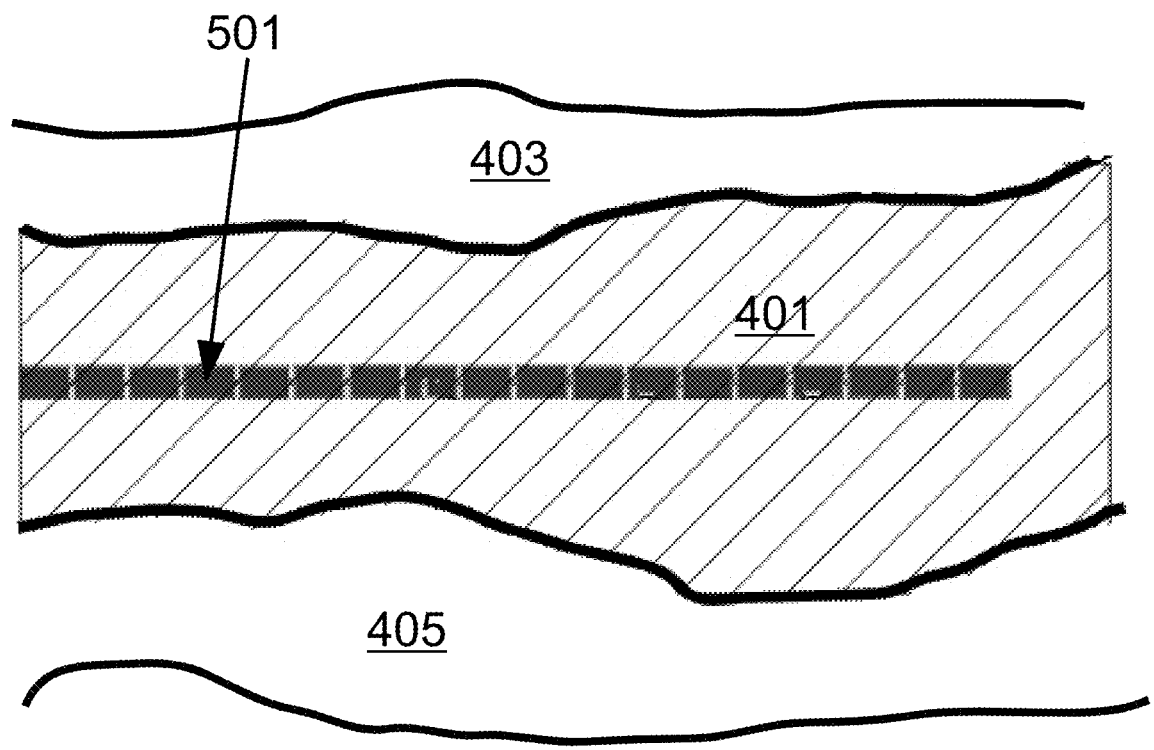
FIG. 7 may illustrate in cross-section an embodiment in which at least one nuclear waste disposal wellbore with waste capsules is implemented in the given deep salt formation and the subsequent creep and sealing of the deposited waste capsules within that deep salt formation.

FIG. 7 may occur in a period of time after FIG. 6C. FIG. 7 may be partial cross-sectional diagram of only some deposited HLW 501 capsules deposited in a particular deep salt formation 401 according to HLW disposal system 400/500 and FIGS. 4 through 6C. In FIG. 7 creep of deep salt formation 401 into former horizontal wellbore 415 has completed, such that former horizontal wellbore 415 no longer exists, but the deposited HLW 501 do persist, being completely sealed within deep salt formation 401. FIG. 7 may illustrate the expected long-term status of the disposal process after disposal of the deposited HLW 501 in deep salt formation 401 and the creeping and sealing of the deep salt formation 401 has completed. In some embodiments, above deep salt formation 401 may be sedimentary geological formations 403. In some embodiments, below deep salt formation 401 may be sedimentary geological formations 405. As indicated earlier in FIG. 5, FIGS. 6A, 6B, and 6C, the HLW 501 capsules (or similar waste materials) are landed inside the horizontal wellbore 415 (initially within liner 507 portions within horizontal wellbore 415). In some embodiments, the sequential removal of the wellbore liner 507 leaves the sequestered/deposited HLW 501 capsules in direct contact with the deep salt formation 401. Over a relatively short period of time, that may vary from days to years (but often less than decades), depending on the creep rate of that deep salt formation 401, the native salt molecules of that particular deep salt formation 401 creep into, around, and/or fills void spaces around the HLW 501 capsules deposited therein. In some embodiments, that deposited HLW 501 is now entombed within the salt rock matrix of that particular deep salt formation 401 and may remain safely disposed for millions of years.

Figure 8:
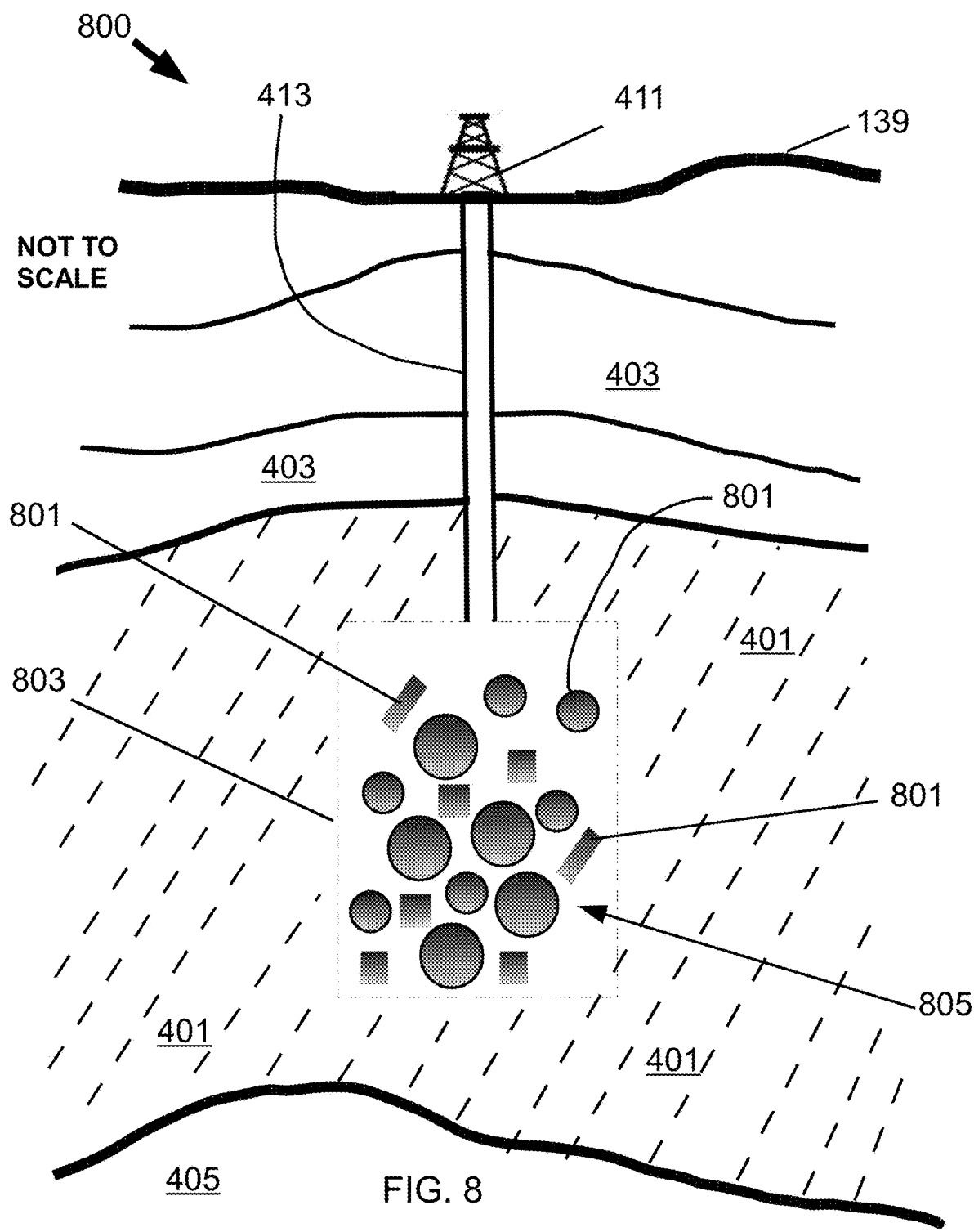
FIG. 8 may illustrate in cross-section an embodiment in which at least one nuclear waste disposal human-made cavern with HLW material is implemented in a given deep salt formation.

FIG. 8 illustrates at least a portion of a given HLW disposal system 800 from a vertical cross-sectional, wherein the HLW 801 is disposed (located and/or placed) within a given deep salt formation 401. In some embodiments, in HLW disposal system 800, at least one vertical wellbore 413 is still formed (bored and/or drilled out) using drilling-rig 411 on surface 139; and the least one vertical wellbore 413 is still drilled to a depth from surface 139 of reaching/entering a particular deep salt formation 401. In some embodiments, a distal/terminal end of at least one vertical wellbore 413 may terminate at a beginning of at least one substantially vertical human-made cavern 803. In some embodiments, a distal/terminal end of at least one vertical wellbore 413 may terminate at an entrance to at least one human-made cavern 803, wherein the at least one human-made cavern 803 may be located within the deep salt formation 401. In some embodiments, vertical wellbore 413 may be cased/lined with casings and/or liners (e.g., liner(s) 505, 509, and/or 511). In some embodiments, these vertical liner(s) 505, 509, and/or 511 may be cemented in place (e.g., using cement 513). In some embodiments, these vertical liner(s) 505, 509, and/or 511 may not be cemented in place.

Continuing discussing FIG. 8, in some embodiments, in HLW disposal system 800, from a distal/terminal portion of vertical wellbore 413 (disposed furthest away from surface 139 and/or drilling-rig 411), in deep salt formation 401, underreaming operations are carried out downwards to form at least one human-made cavern 803. In some embodiments, one or more reaming devices may be used for the underreaming operations to form human-made cavern 803. Such reaming devices are not shown herein; however, such reaming devices may be shown in U.S. Pat. No. 10,807,132 by the same inventor. In some embodiments, a given newly formed human-made cavern 803 may be a substantially (mostly) hollow cylinder, that is closed at the bottom and only open at the top where that given human-made cavern 803 joins its vertical wellbore 413. In some embodiments, human-made cavern 803, once formed, may be located entirely within deep salt formation 401. In some embodiments, the underreaming operations may be carried out entirely within a given deep salt formation 401. In some embodiments, walls (side, bottom, and/or top) of human-made cavern 803 are of deep salt formation 401 salt materials, as human-made cavern 803 is formed directly in deep salt formation 401. In some embodiments, a vertical length (vertical depth) of human-made cavern 803 may be substantially parallel with the substantially vertical section of wellbore 413.

Continuing discussing FIG. 8, in some embodiments, human-made cavern 803, once formed in deep salt formation 401, may then receive one or more of HLW 801. In some embodiments, human-made cavern 803 may be configured to receive the at least one unit of nuclear waste 801. In some embodiments, the at least one human-made cavern 803 may be a final depository location for disposal/storage of at least some nuclear waste material 801. In some embodiments, the at least some waste material 801 (with at least some nuclear waste in some embodiments) may be received into the at least one human-made cavern 803. In some embodiments, human-made cavern 803 may receive a predetermined amount, mass, weight, and/or level of HLW 801 therein. In some embodiments, drilling-rig 411 or the like at or near surface 139 may be used to insert, load, deposit, place, move, pump, and/or land HLW 801 into the formed human-made cavern 803, by using vertical wellbore 413 as a transportation route/conduit to human-made cavern 803. Note, such landing means in wellbores for various wellbore equipment are routine in the oilfield industries. In some embodiments, after human-made cavern 803 has received its predetermined quantity/amount of HLW 801, adjacent portions of deep salt formation 401 may creep into human-made cavern 803, and over time that creep may essentially eradicate that previously formed human-made cavern 803, such that the deposited HLW 801, after creep completion, resides in direct physical contact with the deep salt formation 401, see e.g., FIG. 9. In some embodiments, human-made cavern 803 only needs to be filled with HLW 801 at a faster rate than the creep rate 300 of that particular deep salt formation 401 destroys that initially formed human-made cavern 803.

FIG. 8 also shows initial human-made cavern void spaces 805 that may initially exist in a formed human-made cavern 803, wherein such void spaces may exist in and around HLW 801 located within human-made cavern 803. In some embodiments, after HLW 801 deposit into a newly formatted human-made cavern 803, subsequent creep of that deep salt formation 401 may eradicate most of initial human-made cavern void spaces 805. In some embodiments, a given human-made cavern 803 may be referred to as a "Super-SILO™."

Continuing discussing FIG. 8, in some embodiments, HLW 801 may differ from HLW 501, in that HLW 501 may have exterior shapes that are configured for movement (that minimizes blockage) and/or final storage in a cylindrical liner/wellbore (e.g., liner 507 and/or horizontal wellbore 415); whereas, HLW 801 may have exterior shapes that a configured for movement (that minimizes blockage) and/or final storage in a given human-made cavern 803; and diameters of human-made caverns 803 may be larger than diameters of liners/wellbores. So, in some applications HLW 801 and HLW 501 may be the same or substantially the same. For example, and without limiting the scope of the present invention, in some embodiments, both HLW 801 and HLW 501 may be in capsule form; i.e., a capsule containing HLW. However, in some embodiments, HLW 801 may be in brick form, spherical form, elliptical form, encapsulated liquid form; encapsulated slurry form; portions thereof; combinations thereof; and/or the like. In some embodiments, the radioactive and/or nuclear materials of HLW 801 may be in solid form, liquid form, slurry form, pellet form, powder form, portions thereof, combinations thereof, and/or the like. In some embodiments, HLW 501 and/or HLW 801 capsules and/or containers may be configured to withstand pressures typical within deep salt formations 401.

Note, while FIG. 8 shows one human-made cavern 803 being attached to one vertical wellbore 413; in some embodiments, one vertical wellbore 413 may branch out to a plurality of vertically oriented human-made caverns 803 (with all such human-made caverns 803 being located within deep salt formation 401) similar to configurations/arrangements show in U.S. Pat. No. 10,807,132 by the same inventor.

Continuing discussing FIG. 8, in some embodiments, a given human-made cavern 803 may have an initial, fixed, and/or predetermined vertical length (i.e., vertical depth) from a top of the given human-made cavern 803 to a bottom of the given human-made cavern 803 selected from a range of 500 feet to 10,000 feet, plus or minus (+/−) 100 feet. In some embodiments, the top of the given human-made cavern 803 may be where vertical wellbore 413 transitions into that given human-made cavern 803. In some embodiments, this vertical length and/or vertical depth may be how deep the underreaming operations go in that particular deep salt formation 401. The entirety of the given human-made cavern 803 may be located within the particular deep salt formation 401. Note, this vertical length (e.g., 500 feet to 10,000 feet) may be the initial vertical length upon formation of the given human-made cavern 803; i.e., creep of deep salt formation 401 will eventually eradicate that given human-made cavern 803. In some embodiments, two different human-made caverns 803 may have different initial fixed and predetermined vertical lengths (e.g., 1,000 feet and 9,000 feet, respectively).

Continuing discussing FIG. 8, in some embodiments, a given human-made cavern 803 may have an initial, fixed, and/or predetermined diameter selected from a range of twenty-four (24) inches to 120 inches, plus or minus (+/−) six (6) inches. In some embodiments, a given human-made cavern 803 may have an initial, fixed, and/or predetermined diameter selected from a range of twenty-four (24) inches to seventy-two (72) inches, plus or minus (+/−) four (4) inches. In some embodiments, such human-made cavern 803 diameter may be a result of the horizontal/lateral cutting reach of a given underreaming device that may be forming or have formed the given human-made cavern 803. Note, this human-made cavern 803 diameter may be the initial diameter upon formation of the given human-made cavern 803; i.e., creep of deep salt formation 401 will eventually eradicate that given human-made cavern 803. In some embodiments, two different human-made caverns 803 have different initial fixed and predetermined diameters (e.g., 30 inches and 72 inches, respectively).

Continuing discussing FIG. 8, in some embodiments, due the predetermined vertical length and the predetermined diameter that result from the underreaming operations, a given human-made cavern 803 has an initial, fixed, and predetermined volume. In some embodiments, a given human-made cavern 803 may have an initial, fixed, and/or predetermined volume selected from a range of about 35,000 cubic feet to about 384,000 cubic feet, plus or minus (+/−) 5,000 cubic feet. Based on its geometry and size, the given human-made cavern 803 may be capable of a capacity of hundreds of thousands of cubic feet of storage volume for HLW 801, before creep of the surrounding deep salt formation 401 reduces this volumetric capacity.

In some embodiments, the predetermined diameter and/or the predetermined length of one human-made cavern 803 selected from a plurality of human-made caverns 803 may be different from the predetermined diameter and/or the predetermined length of another human-made cavern 803 selected from the plurality of human-made caverns 803. In some embodiments, this may be so, to accommodate nuclear waste 801 of a particular format (e.g., slurry versus brick) into a given human-made cavern 803.

Continuing discussing FIG. 8, co-located on the surface 139 may be surface operations equipment/structures, drill rig support buildings; wherein such surface operations equipment/structures and/or drill rig support buildings may be located near to, next to, adjacent to, proximate to, the given drilling-rig 411 and/or wellbore site. These surface equipment apparatus and structures are customary in the oil drilling industry and are not shown in FIG. 8; however, may be seen in U.S. Pat. No. 10,807,132 by the same inventor.

Note, human-made caverns 803 of this patent application differ from prior art human-made caverns that are located in deep sedimentary and/or igneous rock formations (see e.g., U.S. Pat. No. 10,807,132 by the same inventor) because human-made caverns 803 are intended to be destroyed after HLW 801/501 loading from deep salt formation 401 creep; whereas, the prior art human-made caverns are intended to remain and retain their initial formed dimensions over geologic time periods because the prior art human-made caverns are not located in deep salt formation 401 but are rather located in sedimentary and/or igneous rock formations that do not undergo the same creep phenomena as deep salt formation 401.

Figure 9:
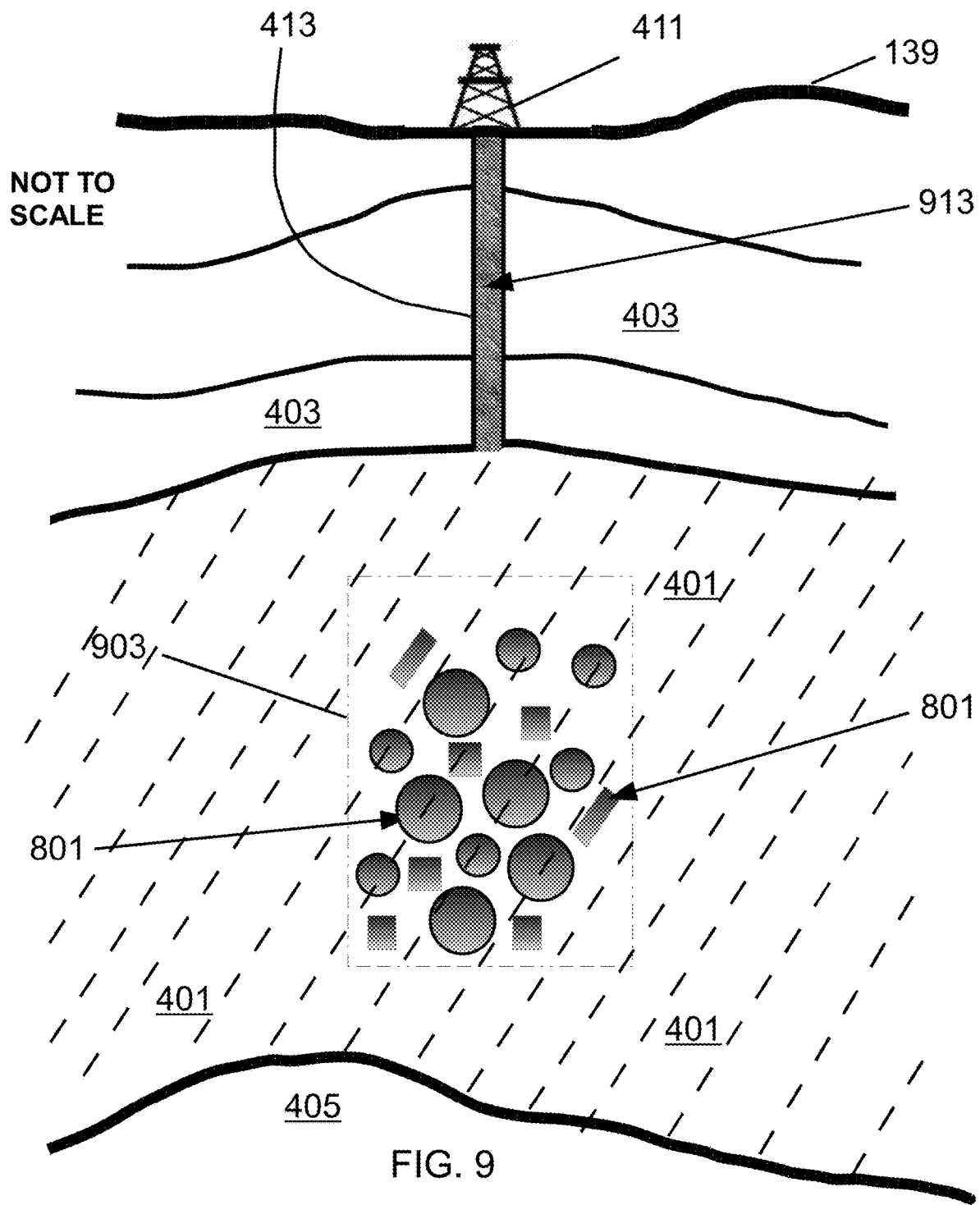
FIG. 9 may illustrate in cross-section an embodiment in which at least one nuclear waste disposal human-made cavern with HLW material is implemented and in which salt creep has occurred and/or completed to eventually completely and entirely entomb the deposited HLW material in that deep salt formation.

FIG. 9 may occur after FIG. 8. FIG. 9 may show the HLW 801 deposited directly within the deep salt formation 401 after creep has completed such that the former walls (sides, top, and bottom) of former human-made cavern 803 (in FIG. 8) no longer exist in FIG. 9 because of such deep salt formation 401 creep. Compare FIG. 9 with FIG. 8. In FIG. 9 the FIG. 8 initial human-made cavern void spaces 805 no longer exist because creep of adjacent portions of deep salt formation 401 has compressed these former void spaces such that the initial human-made cavern void spaces 805 no longer exist in FIG. 9. In FIG. 9 the former human-made cavern 803 wall outline are shown in broken lines only, with reference numeral 903, since the human-made cavern 803 will not exist after the deep salt formation 401 has crept, sealed, and filled in all the original human-made cavern 803 and its initial human-made cavern void spaces 805.

Continuing discussing FIG. 9, over time, depending on the creep rate of that deep salt formation 401, the salt formation matrix 401 may creep into and around and seal the contents (e.g., HLW 801) of that former human-made cavern 803 such that the contents are now in direct physical contact with deep salt formation 401. In some embodiments, the former human-made cavern 803 extent, shown in the dotted outline only with reference numeral 903, may now be completely filled over a period of time by the deformable deep salt formation 401 and the filled in former human-made cavern 803 may become seamlessly integrated and continuous within the existing matrix of deep salt formation 401. For example, and without limiting the scope of the present invention, a large diameter human-made cavern 803 of 120 inches should be completely gone from creep in less than nine (9) years at a creep rate of 0.04 inches per day. For example, and without limiting the scope of the present invention, a human-made cavern 803 with a diameter of seventy-two (72) inches should be completely gone from creep in about five (5) years at a creep rate of 0.04 inches per day. In some embodiments, it is contemplated that over time, depending on the creep rate of the specific deep salt formation 401 material(s), the HLW 801 deposited within that deep salt formation 401 may become "fossilized" and permanently embedded in that deep salt formation 401 for geologic time periods.

Continuing discussing FIG. 9, in some embodiments, vertical wellbore 413 and/or vertical casings/liners (e.g., liner(s) 505, 509, and/or 511) may be completely and/or entirely sealed off with one or more plug(s) 913. In some embodiments, such sealing off of vertical wellbore 413 and/or vertical casings/liners (e.g., liner(s) 505, 509, and/or 511) may be done after loading of HLW 801 into that human-made cavern 803 is completed; and/or after creep of deep salt formation 401 has completed around the former human-made cavern 803. In some embodiments, plug(s) 913 may be implemented from surface 139 via drilling-rig 411, wellhead 503, and/or the like. In some embodiments, plug(s) 913 may be substantially (mostly) comprised of cementitious materials. In some embodiments, plug(s) 913 may be substantially (mostly) of one or more types of cements. In some embodiments, plug(s) 913 may be utilized irrespective of creep rates of that deep salt formation 401. In some embodiments, plug(s) 913 may be substantially without internal void spaces. In some embodiments, plug(s) 913 may be substantially solid (once cured). In some embodiments, plug(s) 913 may be substantially non-porous with very little or permeability values essentially at zero.

Figure 10:
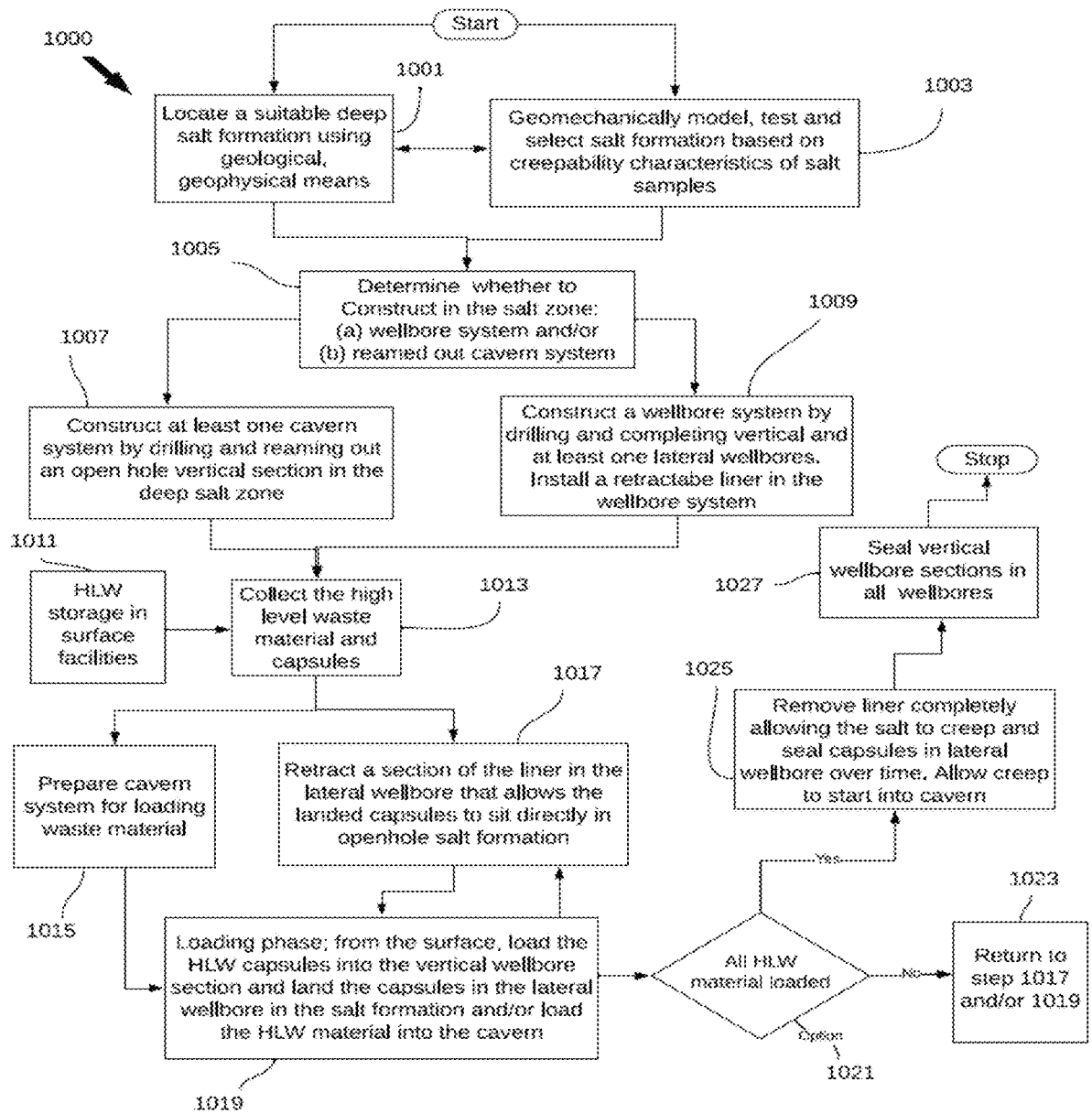
FIG. 10 is a flow chart that illustrates at least some steps for disposing of HLW within a given deep salt formation.

FIG. 10 may depict a flowchart. FIG. 10 may depict a method 1000. FIG. 10 may depict at least some steps of method 1000. In some embodiments, method 1000 may be a method for disposing of radioactive material (such as, but not limited to, HLW 501/801) within deep salt formation 401. In some embodiments, method 1000 may be a method for disposing of HLW 501/801 produced/generated from nuclear operations and/or produced from other radioactive sources, within at least one deep salt formation 401. In some embodiments, method 1000 may be a method of disposing of HLW 501/801 in at least one deep underground bedded salt formation 401. In some embodiments, method 1000 may be a method of disposing of HLW 501/801 within at least one human-made cavern(s) 803; wherein the at least one human-made cavern 803 is located entirely within at least one deep salt formation 401. In some embodiments, method 1000 may be a method of disposing of HLW 501/801 within at least one wellbore(s) 413/415; wherein a terminal/distal portion the at least one at least one vertical wellbore(s) 413 is located within at least one deep salt formation 401; and/or the at least one at least one horizontal wellbore(s) 415 is located entirely within the at least one deep salt formation 401. In some embodiments, method 1000 may be a method of constructing at least one vertical wellbore 413 and of constructing at least one horizontal wellbore 415 that is connected to the at least one vertical wellbore 413, wherein the at least one horizontal wellbore 415 is located within deep salt formation 401, and wherein at least portions of the at least one horizontal wellbore 415 are configured to receive and to contain at least one unit of HLW 501/801. In some embodiments, method 1000 may be a method of constructing at least one vertical wellbore 413 and of constructing at least one human-made cavern 803 that is connected to the at least one vertical wellbore 413, wherein the at least one human-made cavern 803 is located within deep salt formation 401, and wherein the at least one human-made cavern 803 is configured to receive and to contain at least one unit of HLW 501/801. In some embodiments, method 1000 may be a method of constructing a human-made cavern 806 in a deep salt formation 401 to contain at least one unit of HLW 501/801. In some embodiments, method 1000 may be a method of locating, geomechanically modelling, and/or selecting an appropriate deep salt formation 401 of appropriate salt type(s) with appropriate deformation and/or creep properties needed for efficient disposal of HLW 501/801 in such located deep salt formation 401. In some embodiments, method 1000 may be a method of sequentially retracting portions(s) of liner 507 from a horizontal wellbore 415 with HLW 501 located in that horizontal wellbore 415. In some embodiments, method 1000 may be a method of landing at least one HLW 501 capsule in at least one horizontal wellbore 415 implemented in a deep salt formation 401. In some embodiments, method 1000 may be a method of landing at least one unit of HLW 801 in a human-made cavern 803 that is located within a deep salt formation 401. In some embodiments, method 1000 may be an operational process initiating, not restricting creep, and allowing the creep of deep salt formation 401 material into a horizontal wellbore 415 containing at least one HLW 501 capsule, wherein upon completion of such creep the horizontal wellbore 415 loses its structural integrity and the at least one HLW 501 capsule becomes fully and entirely encapsulated within that deep salt formation 401 material. In some embodiments, method 1000 may be an operational process initiating, not restricting creep, and allowing the creep of deep salt formation 401 material into a human-made cavern 803 containing at least one unit of HLW 801, wherein upon completion of such creep the human-made cavern 803 loses its structural integrity and the at least one unit of HLW 801 becomes fully and entirely encapsulated within that deep salt formation 401 material.

Continuing discussing FIG. 10, in some embodiments, method 1000 may comprise at least one (or one or more) of the following steps: 1001, 1003, 1005, 1007, 1009, 1011, 1013, 1015, 1017, 1019, 1021, 1023, 1027, portions thereof, combinations thereof, and/or the like. In some embodiments, at least one such step may be optional, skipped, and/or repeated. In some embodiments, some such steps may be executed out of numerical order, with respect to the steps reference numerals.

Continuing discussing FIG. 10, in some embodiments, step 1001 may be a step of locating a suitable and/or appropriate deep salt formation 401 for receiving HLW 501/801 for disposal. In some embodiments, method 1000 may begin with step 1001. In some embodiments, step 1001 may be a step of analyzing and/or examining geological and geophysical data associated with given surface sites and/or the formations located below such surface sites (e.g., surfaces sites that may have deep salt formations located thereunder). In some embodiments, at least some of this data may be routinely produced from oil exploration processes and/or geological survey missions. In some embodiments, in step 1001 a parametric analysis of candidate deep salt formations may be used to determine the sufficiency of each potential candidate deep salt formation under scrutiny to act as a suitable HLW 501/801 repository. In some embodiments, in step 1001 suitability of any given potential candidate deep salt formation under scrutiny may also depend on extrinsic properties such as, but not limited to, size, temperature, depth and location accessibility; along with intrinsic properties which relate to physical and chemical behavior of the salt(s) located within such potential candidate deep salt formation(s). These intrinsic properties may be determined in step 1003. In some embodiments, step 1001 may include a process of analytically and/or empirically quantifying the volumetric dimensions of the potential candidate deep salt formation under scrutiny; and/or to determine if that potential candidate deep salt formation under scrutiny may remain static at depth for the hundreds of thousands of years needed to keep sequestered the HLW 501/801 materials safe from external environments and/or the biosphere. In some embodiments, these analytical means may include regional geophysical and current seismic analyses and/or database examinations of such data. In some embodiments, an appropriate deep salt formation 401 has very little future chance of the deep salt formation 401 moving upwards as a future salt dome intrusion and creating radioactive migration problems related to the sequestered HLW 501/801 materials located therein. It is generally known that deep salt beds, such as deep salt formations 401, may not migrate upwards (diapirism) easily. Simultaneous effects must occur before deep salt beds may migrate, intrude or move upwards. Tectonic forces like regional folding and faulting are needed to trigger deep salt motion, and thermal and gravity forces must exceed the resistance from formations above of the deep salt layer(s) to flow. This resistance is due to the overlying formations and the lithostatic pressures exerted by those overlying formation layers. The possibility of all three needed conditions occurring simultaneously is extremely small and may occur only over millions of years and as such, HLW disposal in deep salt formations 401 may preclude HLW being migrated to the surface 139 and the overall HLW disposal process contemplated herein may be considered to be an extremely safe process.

In some embodiments, step 1001 may progress to step 1003 and/or to step 1005. In some embodiments, step 1001 may progress to step 1005 if step 1003 has already yielded acceptable modeling and/or test results for that particular site; or if step 1003 is unnecessary for a particular site because the data that would be generated from step 1003 for that site already exists.

Continuing discussing FIG. 10, in some embodiments, step 1003 may be a step of determining deep salt formation intrinsic properties (e.g., creep rate) for a particular candidate deep salt formation under scrutiny for HLW 501/801 disposal suitability. As discussed earlier in FIG. 3, deep salt formations may have requisite properties to allow deformation, creep, and sealing of the HLW 501/801 therein to occur over time. In some embodiments, step 1003 may allow quantification of deep salt formation intrinsic properties which may be important for disposing of HLW 501/801 into such deep salt formations. In some embodiments, step 1003 may comprise simulating, modelling, mathematical modelling, computer modeling, numerical methods, portions thereof, combinations thereof, and/or the like, with respect to the particular candidate deep salt formation under scrutiny. In some embodiments, step 1003 may be a computational, analytical, and/or simulation step. In some embodiments, in step 1003 the specific intrinsic properties may be determined by computational finite element type analyses (FEA) to provide more realistic definitive conclusions, suggestions, and/or recommendations for the salt suitability associated with the particular candidate deep salt formation under scrutiny. In some embodiments, step 1003 may involve scanning the surface sites above the particular candidate deep salt formation under scrutiny with deep penetrating radar, seismic operations, and/or the like; and then evaluating such field data. In some embodiments, step 1003 may comprise taking physical sample(s) from the particular candidate deep salt formation produced by drilling new wells or by logging data from offset wells drilled earlier, and that are under scrutiny for qualifying as a deep salt formation 401. In some embodiments, in step 1003 core samples of the particular candidate deep salt formation under scrutiny may be made by coring the particular candidate deep salt formation under scrutiny during an exploratory drilling process, with a downhole coring barrel tool in which a cylindrical sample of the particular candidate deep salt formation under scrutiny is retrieved intact for testing/analysis on the surface. In some embodiments, step 1003 may comprise one or more physical tests of the physical sample(s) (e.g., core sample(s)) from the particular candidate deep salt formation under scrutiny. In some embodiments, in step 1003, analyses may be made empirically in the laboratory and/or in the field to determine salt creep (e.g., in inches per day or inches per hour) based on confining pressures and ambient temperatures; and/or also on the chemistry and/or type of salt material(s) located within that particular candidate deep salt formation under scrutiny. In some embodiments, deep salt formations of mostly halite (NaCl) may have appropriate creep rates (e.g., 0.04 inches per day) for qualifying as a given deep salt formation 401. In some embodiments, an acceptable creep rates in the given deep salt formation may be from 0.01 inches per day (in/day) to 0.10 inches per day (in/day) for that deep salt formation to qualify as a deep salt formation 401. In some embodiments, step 1003 may progress to step 1001 and/or to step 1005. In some embodiments, step 1003 may progress back to step 1001 if modeling and/or test results from step 1003 indicate that the tested/modeled deep salt formation is unsuitable for HLW 501/801 disposal therein. In some embodiments, completion of step 1001 and/or step 1003 may result in finding and/or locating at least one appropriate and/or suitable deep salt formation 401 for HLW 501/801 disposal therein.

In some embodiments, for a deep salt formation to qualify as a deep salt formation 401 the following requirements must be met: (a) a salt creep rate therein of 0.01 inches per day (in/day) to 0.10 inches per day (in/day) (note, acceptable salt creep rates often occur in deep salt formations located 10,000 feet below surface 139 or greater in depth); (b) an areal extent of the deep salt formation of at least 2,500 acres or about 4 square miles (or greater); and (c) the deep salt formation may be from at least 500 feet thick to 5,000 feet thick or thicker. Some deep salt formations 401 may have a thickness greater than 5,000 feet. Note, many of U.S. deep salt deposits (see e.g., FIG. 1I) could be able to provide suitable deep salt formations based on these physical criteria for qualifying as a given deep salt formation 401.

In some embodiments, completion of step 1001 and/or step 1003 may result in selection of at least one deep salt formation 401.

Continuing discussing FIG. 10, in some embodiments, step 1005 may be a step of determining whether horizontal wellbore(s) 415 and/or human-made cavern(s) 803 are to be implemented in the selected deep salt formation 401. For example, and without limiting the scope of the present invention, deep salt formations 401 that are generally large in horizontal (lateral) dimensions may be suitable for implementation of horizontal wellbore(s) 415. For example, and without limiting the scope of the present invention, deep salt formations 401 that are generally deep in vertical dimensions may be suitable for implementation of human-made cavern(s) 803. Many candidate deep salt formations 401 are capable of supporting horizontal wellbore(s) 415 and/or human-made cavern(s) 803. For example, and without limiting the scope of the present invention, deep salt formations 401 that are generally large in horizontal (lateral) dimensions and generally deep in vertical dimensions may be suitable for implementation of horizontal wellbore(s) 415 and/or suitable for implementation of human-made cavern(s) 803. For example, and without limiting the scope of the present invention, if the contemplated HLW 801 to be disposed of at a given site is mostly in non-capsule form, then use of human-made cavern(s) 803 over horizontal wellbore(s) 415 might be suggested. For example, and without limiting the scope of the present invention, if the contemplated HLW 501/801 to be disposed of at a given site is mostly in capsule form, then use of horizontal wellbore(s) 415 and/or human-made cavern(s) 803 might be suggested. For example, and without limiting the scope of the present invention, if underreaming equipment is to be unavailable for a given well site, then use of horizontal wellbore(s) 415 over human-made cavern(s) 803 might be suggested. For example, and without limiting the scope of the present invention, if liners 507 are to be unavailable, then use of human-made cavern(s) 803 over horizontal wellbore(s) 415 human-made cavern(s) 803 might be suggested. In some embodiments, completion of step 1005 may result in determining (selecting) to use horizontal wellbore(s) 415 and/or human-made cavern(s) 803 for implementation at the selected deep salt formation 401. In some embodiments, step 1005 may progress into step 1007 and/or into step 1009.

Continuing discussing FIG. 10, in some embodiments, regardless if at least one human-made cavern 803 and/or at least one horizontal wellbore 415 is to be implemented in the selected deep salt formation 401, at least one vertical wellbore 413 must be first constructed from surface 139, using drilling-rig 411. In some embodiments, before implementing the at least one human-made cavern 803 and/or before implementing the at least one horizontal wellbore 415, the at least one vertical wellbore 413 must be constructed/formed, as the at least one vertical wellbore 413 is used as a means to reach where the at least one human-made cavern 803 and/or the at least one vertical wellbore 413 is used as a means to reach the at least one horizontal wellbore 415. In some embodiments, the at least one vertical wellbore 413 may be drilled to a prescribed depth of from 10,000 feet to 30,000 feet below surface 139 and into deep salt formation 401 (plus or minus 1,000 feet). In some embodiments, a distal/terminal portion of the at least one vertical wellbore 413 (disposed furthest away from surface 139 and located in deep salt formation 401) may be physically and communicatively connected to the at least one human-made cavern 803 and/or to the at least one horizontal wellbore 415, such that HLW 501/801 may be transported from surface 139, through the at least one vertical wellbore 413, and into the at least one human-made cavern 803 and/or into the at least one horizontal wellbore 415. Recall, in some embodiments, each horizontal wellbore 415 may be located entirely inside the deep salt formation 401. In addition, in some embodiments, the human-made cavern 803 may be located entirely within deep salt formation 401. Furthermore, in some embodiments, each such horizontal wellbore 415 and/or human-made cavern 803 may be accessed via the connecting at least one vertical wellbore 413 (see e.g., FIG. 4, FIG. 5, and FIG. 8). In some embodiments, in the case of the at least one horizontal wellbore 415, the vertical connecting wellbore 413 runs from the given horizontal wellbore 415 to the surface 139. In some embodiments, with respect to the least one human-made cavern 803, the at least one vertical wellbore 415 connects the deep human-made cavern 803 to the wellhead 503 on the Earth's surface 139. In some embodiments, the at least one vertical wellbore 413 may be drilled with conventional drilling equipment, such as, but not limited to drilling-rig 411, from the surface 139 down to and penetrating the selected deep salt formation 401. In some embodiments, the at least one vertical wellbore 413 may be cased, lined, and/or cemented with vertical liner(s) (such as, but not limited to, liner(s) 505, 509, and/or 511) and/or cement 513.

Continuing discussing FIG. 10, in some embodiments, the step of forming/constructing the at least one vertical wellbore 413 may be part of step 1005, step 1007, and/or step 1009. In some embodiments, the step of forming/constructing the at least one vertical wellbore 413 may also comprise casing/lining the at least one vertical wellbore 413 with vertical liners (such as, but not limited to, liner(s) 505, 509, and/or 511). In some embodiments, the step of forming/constructing the at least one vertical wellbore 413 may also comprise cementing the vertical liners in place (e.g., with cement 513).

Continuing discussing FIG. 10, recall, in some embodiments, step 1005 may progress into step 1007 and/or into step 1009.

Continuing discussing FIG. 10, in some embodiments, step 1007 may be a step of constructing the at least one human-made cavern 803 in the (selected) deep salt formation 401. In some embodiments, a size of the at least one human-made cavern 803 may be determined by pre-drill computations which then define the at least one human-made cavern 803 vertical extent, its diameter, and its final volumetric storage capacity (before significant creep occurs). In some embodiments, the cavern drillers may utilize such data to drill and ream out the at least one human-made cavern 803 in the deep salt formation 401. In some embodiments, at the end of step 1007 the at least one human-made cavern 803 may be a substantially (mostly) cylindrical void space inside the massive deep salt formation 401. In some embodiments, this void space within the at least one human-made cavern 803 may be partially filled later with at least one unit of HLW 501/801; and any remaining initial human-made cavern void spaces 805 after the HLW 501/801 may be later filled/eliminated by the encroachment of deep salt formation 401 from its creep and sealing actions.

Continuing discussing FIG. 10, in step 1007, the at least one human-made cavern 803 may be drilled with conventional drilling and reaming equipment from the surface 139 down to and penetrating vertically downwards into deep salt formation 401. In some embodiments, at least one reamer or under-reamer device (well-known in the industry and/or from U.S. Pat. No. 10,807,132 by the same inventor) may be used to drill out and form the at least one human-made cavern 803 from within deep salt formation 401. In some embodiments, the at least one under-reamer device may be run into the at least one vertical wellbore 413 and activated at a distal/terminal portion of the at least one vertical wellbore 413 (in deep salt formation 401) for the reaming process to begin, resulting in formation of the at least one human-made cavern 803 in deep salt formation 401. In some embodiments, the at least one reamer device may include tandem units in the field operations. In some embodiments, the under-reaming process continues either directly or sequentially in phases to ream out the at least one human-made cavern 803 in deep salt formation 401, such that the at least one human-made cavern 803 may have vertical length (vertical depth) of 500 feet to 5,000 feet (or more) as measured from where deep salt formation 401 begins beneath surface 139 (e.g., deep salt formation 401 may begin at 10,000 feet below surface 139 and then human-made cavern 803 may extend 500 feet to 5,000 feet [or more] into that deep salt formation 401). In some embodiments, the under-reaming may form the at least one human-made cavern 803 with a diameter from twenty-four (24) inches to 120 inches.

Continuing discussing FIG. 10, in some embodiments, step 1007 may progress into step 1013.

Continuing discussing FIG. 10, in some embodiments, step 1009 may be a step of drilling out and/or forming the at least one horizontal wellbore 415 in the (selected) deep salt formation 401 from the at least one vertical wellbore 413. In some embodiments, the dimensions, vertical and lateral extents of the at least one horizontal wellbore 415 (e.g., as illustrated in FIG. 5) may be predetermined before drilling by design, modelling, simulation, and/or constraints of the given deep salt formation 401 (e.g., deep salt formation 401 size) (e.g., from steps 1001 and/or 1003). In some embodiments, the actual drilling process may proceed physically uninterrupted from the surface 139 down the at least one vertical wellbore 413 and then turning the drilling into a horizontal position to continue drilling in a horizontal direction within deep salt formation 401 to form the at least one horizontal wellbore 415. In some embodiments, after the drilling process is completed (and the at least one horizontal wellbore 415 is formed), one or more liner(s) 507 may be installed inside the at least one vertical wellbore 413 and inside of the at least one horizontal wellbore 415. Thus, at least some of liner 507 may be in a horizontal position after installation; and at least some of liner 507 may be in a vertical position after installation. In some embodiments, after this step 1009, an open transit conduit may exist from wellhead 503 and/or surface 139 down the at least one vertical wellbore 413 (which may be lined with other liners in addition to liner 507) and all the way to a distal/terminal end or toe 515 of the at least one horizontal wellbore 415. In some embodiments, this open transit conduit structure may permit safe and reliable movement of HLW 501/801 from surface 139 and into the at least one horizontal wellbore 415. In some embodiments, step 1009 may progress into step 1013.

Continuing discussing FIG. 10, in some embodiments, step 1011 may be a step of managing and/or storing HLW 501/801 and/or the like materials at/in various storage facilities that are on or near surface 139. In some embodiments, these surface storage facilities may be in locations remote and/or distant from a given wellsite, or in some situations at, near, or proximate to a given wellsite. In some embodiments, step 1011 may be omitted from method 1000. In some embodiments, step 1011 may be optional in method 1000. In some embodiments, step 1011 may progress to step 1013.

Continuing discussing FIG. 10, in some embodiments, step 1013 may be a step of preparing and/or encapsulating the HLW 501/801 and/or the like materials at surface facilities for transportation/movement in wellbores 413/415 and/or human-made cavern(s) 803. In some embodiments, these surface facilities in step 1013 may be the same or different facilities as compared to the surface storage facilities of step 1011. In some embodiments, these surface facilities in step 1013 may be in locations remote and/or distant from a given wellsite, or in some situations at, near, or proximate to a given wellsite. In some embodiments, in this step 1013, the HLW 501/801 and/or the like materials may be packed in various capsules, containers and/or similar systems which may be configured to easily transit wellbore liner(s) and/or the wellbore(s) 413/415 without obstruction. In some embodiments, step 1013 may progress into step 1015 and/or into step 1017. In some embodiments, if the disposal site has at least one human-made cavern 803 in the deep salt formation 401, then step 1013 may progress into step 1015. In some embodiments, if the disposal site has at least one horizontal wellbore 415 in the deep salt formation 401, then step 1013 may progress into step 1017.

Continuing discussing FIG. 10, in some embodiments, step 1015 may be a step of preparing the at least one human-made cavern 803 for receiving at least one unit of HLW 510/801. In some embodiments, in step 1015 the at least one human-made cavern 803 may be evacuated of all (or mostly all) residual wellbore drilling fluids, drilling fluid materials, completion fluids (such as, but not limited to KCI), and/or any other drilling/formation operations chemicals, that may be residing in the at least one human-made cavern 803 as byproducts from its formation. In some embodiments, this evacuation may be accomplished by several means including circulating compressed air (or another gas or gas mixture) from the surface 139 to push and clean out residual fluids from the at least one human-made cavern 803. In some embodiments, this evacuation may be accomplished by several means including a pump system to lift the residual wellbore fluids (and/or the like) out of the at least one human-made cavern 803. In some embodiments, the pump system may comprise an electrically driven submersible pump may be routinely used to evacuate the cavern system. In some embodiments, this evacuation may be accomplished by several means, including circulating a gas, using a pump, portions thereof, combinations thereof, and/or the like. In some embodiments, step 1015 may progress into step 1019.

Continuing discussing FIG. 10, in some embodiments, step 1017 may be a step of retracting (only) a distal/terminal portion of liner 507 away from toe 515 in the at least one horizontal wellbore 415 in deep salt formation 401. In some embodiments, prior to a process of landing HLW 501/801 within the at least one horizontal wellbore 415 (e.g., in step 1019), a calculated and/or predetermined length, section, and/or portion of liner 507 may be retracted (pulled back) from the at least one horizontal wellbore 415 (such that terminal end of liner 601 is no longer at toe 515, see e.g., FIG. 6A). In some embodiments, execution of step 1017 may result in region of wellbore without liner 605 of the at least one horizontal wellbore 415, see e.g., FIG. 6A. In some embodiments, during execution of step 1017, the liner retraction step, drilling-rig 411 and/or wellhead 503 may be used to lift and/or pull one or more strings of the liner 507 from wellbores 413/415; which in turn may result in region of wellbore without liner 605 of the at least one horizontal wellbore 415. In some embodiments, in practice, one or more liner 507 strings, depending on drilling-rig 411 and/or wellhead 503 lift capacity, may be uncoupled simultaneously at the wellhead 503 and as many as three strings (e.g., about ninety (90) feet) may be lifted as a unit. In some embodiments, drilling-rig 411 and/or wellhead 503 may continue this retraction (lift) process until the prescribed, predetermined, and/or calculated length of liner 507 may be removed from wellbores 413/415. In some embodiments, liner 507 retraction (as discussed in FIG. 6A, FIG. 6B, FIG. 6C) makes a section of the at least one horizontal wellbore 415 free of liner 507 and this wellbore section is now in fully open to the immediately adjacent portions of deep salt formation 401; wherein such section(s) are region of wellbore without liner 605. In some embodiments, region of wellbore without liner 605 (i.e., without liner 507) now no longer has any restrictions emplace to impair creep from the immediately adjacent portions of deep salt formation 401 into region of wellbore without liner 605 of the at least one horizontal wellbore 415. In some embodiments, region of wellbore without liner 605 may now behaves as an open/naked hole, trench, and/or cylinder of the at least one horizontal wellbore 415; and region of wellbore without liner 605 may now be available for the creep and seal process to encroach unobstructed into region of wellbore without liner 605 of the at least one horizontal wellbore 415. In some embodiments, step 1017 may progress into step 1019. In some embodiments, step 1019 may occur after step 1017 in a timely manner of faster than the creep rate of deep salt formation 401. In some embodiments, step 1017 and step 1019 may occur substantially (mostly) concurrently.

Continuing discussing FIG. 10, in some embodiments, step 1019 may be a step of loading (depositing) one or more units of HLW 501/801 into the at least one human-made cavern 803 (through the at least one vertical wellbore 413 and/or its vertical casings/liners) and/or into the at least one horizontal wellbore 415 (through the at least one vertical wellbore 413 and/or its vertical casings/liners and/or through remaining portions of liner 507).

Continuing discussing FIG. 10, in some embodiments, in step 1019, with respect to loading of the at least one human-made cavern 803 with one or more units of HLW 501/801, HLW 501/801 may be first inserted into an innermost liner of the at least one vertical wellbore 413 at the surface 139 by using drilling-rig 411 and/or wellhead 503; and then, the inserted HLW 501/801 in that innermost and vertical liner may travel down and within the at least one vertical wellbore 413 and within its vertical liners (e.g., liner(s) 505, 507, 509, and/or 511); and upon the reaching the distal/terminal portion of the at least one vertical wellbore 413, then the HLW 501/801 may be deposited directly into the at least one human-made cavern 803. In some embodiments, this human-made cavern 803 loading (insertion) process may include multiple and/or different types of the capsules and/or containers of HLW 501/801 and/or other solid forms of HLW 501/801 that needs to be sequestered/disposed of. In some embodiments, HLW 501/801 may be mostly a solid. This may allow for effective entombment of the deposited HLW 501/801 when subsequent creeping and sealing by the deep salt formation 401 occurs into initial human-made cavern void space 805 and into former human-made cavern walls 903 (e.g., as shown in FIG. 9). In some embodiments, units of HLW 501/801 may be deposited into the at least one human-made cavern 803 at a rate faster than the creep rate of deep salt formation 401. In some embodiments, step 1019 may progress to step 1021.

Continuing discussing FIG. 10, in some embodiments, in step 1019, with respect to the loading of the at least one horizontal wellbore 415 with HLW 501/801 capsules, HLW 501/801 capsules may be first inserted into the liner 507 at the surface 139 by using drilling-rig 411 and/or wellhead 503; and then, the inserted HLW 501/801 capsules in liner 507 may travel down and within the at least one vertical wellbore 413 and within its vertical liners (e.g., liner(s) 505, 509, and/or 511), before liner 507 transitions into the at least one horizontal wellbore 415; and those inserted HLW 501/801 capsules in liner 507 may travel into the at least one horizontal wellbore 415—and some portions of the at least one horizontal wellbore 415 may be with or without liner 507. In some embodiments, this HLW 501/801 capsule insertion process may include using multiples (plurality) of the HLW 501/801 capsules in a compound capsule string. In some embodiments, this HLW 501/801 capsule loading (insertion) process of step 1019 may be repeated several times to achieve a complete filling of the at least one horizontal wellbore 415 with HLW 501/801 capsules (from heel 517 to toe 515). In some embodiments, step 1019 may progress to step 1021. In some embodiments, step 1019 may progress back to step 1017 for further liner 507 retraction and then back to step 1019 for further loading of the at least one horizontal wellbore 415 with HLW 501/801.

Continuing discussing FIG. 10, in some embodiments, step 1021 may be a decision/determination step. In some embodiments, in this step 521, a determination may be made about completion of the HLW 501/801 material loading in the final repository location(s) of the at least one human-made cavern 803 and/or of the at least one horizontal wellbore 415. In some embodiments, if a given of the at least one human-made cavern 803 and/or a given of the at least one horizontal wellbore 415 is filled to its predetermined fill capacity with HLW 501/801, then step 1021 may progress to step 1025. In some embodiments, if there is no more HLW 501/801 present to be loaded at the wellsite (e.g., all HLW 501/801 generated from a given batch run of step 1013 has been loaded per step 1019), then step 1021 may progress to step 1025. In some embodiments, if a given of the at least one human-made cavern 803 and/or a given of the at least one horizontal wellbore 415 is not filled to its predetermined fill capacity with HLW 501/801 and there is still more HLW 501/801 present to be loaded at the wellsite, then step 1021 may progress to step 1023. In some embodiments, HLW 501/801 loading (insertion/depositing) process may be repeated several times to achieve the complete filling of the at least one human-made cavern 803 and/or of the at least one horizontal wellbore 415, assuming there is sufficient HLW 501/801 available onsite at the given wellsite.

Continuing discussing FIG. 10, in some embodiments, in step 1023, the process/method may return to step 1017 and/or to step 1019. In some embodiments, if the at least one human-made cavern 803 is not yet filled to fill capacity and there is HLW 501/801 available onsite at the given wellsite, then step 1023 returns the method/process to step 1019 for further loading of that the at least one human-made cavern 803 with additional present HLW 501/801. In some embodiments, if the at least one horizontal wellbore 415 is not yet filled to its fill capacity and there is HLW 501/801 available onsite at the given wellsite, then step 1023 returns the method/process to step 1017 (for further liner 507 retraction) and/or to step 1019 for further loading of that the at least one horizontal wellbore 415 with additional present HLW 501/801.

Continuing discussing FIG. 10, in some embodiments, step 1025 may be a step of fully and/or completely retracting any and/or all of liner 507 from the at least one horizontal wellbore 415. In some embodiments, step 1025 may be a step of fully and/or completely retracting any and/or all of liner 507 from the wellbores 413/415. In some embodiments, liner 507 retraction in step 1025 may be carried by using drilling-rig 411 and/or wellhead 503 from surface 139. Once there is no liner 507 in the at least one horizontal wellbore 415, there may be no further impediments to deep salt formation 401 creep into the at least one horizontal wellbore 415. In some embodiments, completion of step 1025 and/or completion of creep into the at least one horizontal wellbore 415 may result in region of wellbore without liner 605 and the at least one horizontal wellbore 415 being of the same or about the same lengths. In some embodiments, step 1025 may progress into step 1027.

Continuing discussing FIG. 10, with respect to the at least one human-made cavern 803, step 1025 may not involve any additional actions. With respect to the at least one human-made cavern 803, in step 1025 deep salt formation 401 creep into the at least one human-made cavern 803 continues to occur, eventually resulting in the scenario shown in FIG. 9 where the at least one human-made cavern 803 no longer exists due to the creep, but the deposited HLW 501/801 may be fully entombed in direct physical contact with portions of deep salt formation 401.

Continuing discussing FIG. 10, in some embodiments, step 1027 may be a closure step of the wellbore 413/415 systems. In some embodiments, in step 1027 one or more plug(s) 913 may be deposited within the at least one vertical wellbore 413, with an intention to permanently and/or completely closing off and/or sealing off that the at least one vertical wellbore 413. In some embodiments, the one or more plug(s) 913 may be of one or more predetermined cements and/or cementitious materials. In some embodiments, the one or more plug(s) 913 may be inserted, deposited, landed, and/or pumped into place within the at least one vertical wellbore 413 by use of drilling-rig 411 and/or wellhead 503 from surface 139. In some embodiments, completion of step 1027 may result in completion of method 1000.

In some embodiments, method 1000 may comprise steps (a), (b), (c), and (d). In some embodiments, step (a) may be a step of drilling at least one vertical wellbore 413 downwards from a predetermined surface 139 location to a terminal location, wherein the terminal location is located within deep salt formation 401. In some embodiments, deep salt formation 401 may be located at least ten thousand feet (10,000 feet) directly (or mostly directly) vertically below the predetermined surface 139 location, such that the terminal location is located below this ten thousand feet (10,000 feet) depth. In some embodiments, details of step (a) may be addressed by step 1005, step 1007, and/or step 1009. In some embodiments, with respect to step (a), see e.g., step 1005, step 1007, and/or step 1009.

In some embodiments, step (b) may be a step of forming at least one receiver volume within deep salt formation 401 from the terminal location of the least one vertical wellbore 413. In some embodiments, the at least one receiver volume may be configured to receive at least some of the radioactive material (such as, but not limited to, HLW 501/801). In some embodiments, the at least one receiver volume may be fashioned out, drilled out, carved out, reamed out, under-reamed out, portions thereof, combinations thereof, and/or the like from deep salt formation 401. In some embodiments, the at least one receiver volume may have an initial boundary that delineates between the at least one receiver volume and deep salt formation 401. In some embodiments, this initial boundary may be where a void space of the at least one receiver volume meets a wall of deep salt formation 401. In some embodiments, details of step (b) may be addressed by step 1007 and/or step 1009. In some embodiments, with respect to step (b), see e.g., step 1007 and/or step 1009.

In some embodiments, the at least one receiver volume may be at least one human-made cavern 803 and/or at least one horizontal wellbore 415. In some embodiments, at least one human-made cavern 803 may extend vertically downwards below the terminal location and into deep salt formation 401. See e.g., step 1007 and FIG. 8. In some embodiments, at least one horizontal wellbore 415 may extend horizontally from the terminal location into deep salt formation 401 in a generally horizontal/lateral direction. See e.g., step 1009 and FIG. 5.

In some embodiments, step (c) may be a step of depositing at least one unit of the radioactive material (such as, but not limited to, HLW 501/801) within the at least one receiver volume. In some embodiments, such depositing may involve the at least one unit of the radioactive material traveling from the predetermined surface 139 location to the at least one receiver volume through the at least one vertical wellbore 413. In some embodiments, details of step (c) may be addressed by step 1019. In some embodiments, with respect to step (c), see e.g., step 1019.

In some embodiments, step (d) may be a step of eradicating the initial boundary between deep salt formation 401 and the at least one receiver volume by creep of the deep salt formation 401 into the at least one receiver volume, such that the at least one unit of the radioactive material may become entirely encased within the deep salt formation 401 and the at least one unit of the radioactive material may be in physical contact with at least some portion of deep salt formation 401.

In some embodiments, prior to the step (c), method 1000 may comprise a step of installing at least one casing string (e.g., 505, 509, and/or 511) within the at least one vertical wellbore 413. In some embodiments, the method may comprise cementing the at least one casing string (e.g., 505, 509, and/or 511) in place. See e.g., step 1009 and FIG. 5.

In some embodiments, prior to the step (c), the method 1000 may comprise a step of installing at least one retractable liner 507 into the at least one vertical wellbore 413 and into the at least one horizontal wellbore 415, from the predetermined surface 139 location to toe 515 of the at least one horizontal wellbore 415, including with an upper portion (vertical portion) of the least one retractable liner 507 passing through the at least one vertical wellbore 413. In some embodiments, toe 515 of the at least one horizontal wellbore 415 may be a distal portion of at least one horizontal wellbore 415 disposed further away from the predetermined surface 139 location along at least one horizontal wellbore 415. See e.g., step 1009 and FIG. 5.

In some embodiments, prior to the step (c), method 1000 may comprise a step of preparing the at least one unit of the radioactive material for the step (c), by sealing some amount of the radioactive material into at least one capsule, such that the at least one capsule with the some amount of the radioactive material may be the at least one unit of the radioactive material that is deposited in the step (c). See e.g., step 1013.

In some embodiments, after at least one retractable liner 507 may be installed into at least one horizontal wellbore 415, then before, during, or after the step (c), the method 1000 may comprise a step of retracting a bottom distal portion of the at least one retractable liner 507 away from toe 515, such that a region of the at least one horizontal wellbore 415 is without the at least one retractable liner 507 (i.e., creation of region of wellbore without liner 605); such that after execution of the step (c) and after the execution of this retraction step, the at least one unit of the radioactive material that was deposited into the at least one horizontal wellbore 415 during the step (c) may be capable of being in direct physical contact with at least a portion of deep salt formation 401. See e.g., step 1017 and FIG. 6A, FIG. 6B, and FIG. 6C.

In some embodiments, after at least one retractable liner 507 may be installed in at least one horizontal wellbore 415, method 1000 may comprise a step of depositing a plurality of radioactive materials into the at least one horizontal wellbore 415 (see e.g., step 1019 and FIG. 5), wherein this depositing step occurs prior to the step (d). In some embodiments, after this depositing step and before the step (d), method 1000 may comprise a step of retracting all of the least one retractable liner 507 out from the at least one horizontal wellbore 415 (see e.g., step 1025 and FIG. 6A, FIG. 6B, and FIG. 6C); such that after execution of the depositing step (step 1019) and after the execution of the liner 507 retraction step (step 1025), the plurality of radioactive materials that was deposited into the at least one horizontal wellbore 415 is capable of being in direct physical contact with at least a portion of the deep salt formation 401.

In some embodiments, prior to the step (c), the method 1000 may comprise a step of evacuating residual wellbore fluids from the at least one human-made cavern 803 by using a gas to push and/or a pump system to lift the residual wellbore fluids out of the at least one human-made cavern 803. See e.g., step 1015.

In some embodiments, prior to the step (a), method 1000 may comprise a step of determining the predetermined surface 139 location by analyzing geological data and geophysical data associated with at least one candidate surface site and of at least one formation located below the at least one candidate surface site, such that the at least one formation may exhibit parameters that meet requirements for deep salt formation 401. In some embodiments, if the at least one formation possesses certain petrophysical parameters, that at least one formation may qualify as deep salt formation 401; and if so, that at least one candidate surface site may qualify as the predetermined surface 139 location. See e.g., step 1001 and/or step 1003.

In some embodiments, prior to the step (a), method 1000 may comprise a step of determining the predetermined surface 139 location by analyzing core sample test data from at least one formation that is located below at least one candidate surface site, such that the core sample test data meets requirements for deep salt formation 401. See e.g., step 1003.

In some embodiments, at least some of those parameters, petrophysical parameters, and/or requirements for a given at least one formation to qualify as a deep salt formation 401, may be: (a) a salt creep rate therein of 0.01 inches per day (in/day) to 0.10 inches per day (in/day) (note, acceptable salt creep rates often occur in deep salt formations located 10,000 feet below surface 139 or greater in depth); (b) an areal extent of the deep salt formation of at least 2,500 acres or about 4 square miles (or greater) or alternatively, a horizontal dimension of at least one (1) kilometer (km); and (c) the deep salt formation may be from at least 500 feet thick to 5,000 feet thick or thicker.

In some embodiments, after at least the step (c) (and/or possibly before completion of step (d) or after the completion of step (d)), method 1000 may comprise a step of installing at least one plug 913 within the at least one vertical wellbore 413. In some embodiments, at least one plug 913, once installed, may seal off and/or close the at least one unit of radioactive material deposited into deep salt formation 401 from the predetermined surface 139 location. See e.g., step 1027 and/or plug 913 in FIG. 9.

In some embodiments, a distal end of the at least one wellbore 413/415 and/or of human-made cavern 803, disposed away from an Earth surface 139 location of the at least one wellbore 413/415 may be a final depository location for some nuclear waste 501/801 products. In some embodiments, the at least one wellbore 413/415 may be a transit means (route) configured for transit of nuclear waste material 501/801 through the at least one wellbore 413/415.

Systems and/or methods of radioactive and/or nuclear waste disposal within deep salt formations have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for disposing of radioactive material within a deep salt formation, wherein the method comprises steps of:
   (a) drilling at least one vertical wellbore downwards from a predetermined surface location to a terminal location, wherein the terminal location is located within the deep salt formation;
   (b) forming at least one receiver volume within the deep salt formation from the terminal location of the least one vertical wellbore, wherein the at least one receiver volume is configured to receive at least some of the radioactive material, wherein the at least one receiver volume is fashioned out from the deep salt formation and has an initial boundary that delineates between the at least one receiver volume and the deep salt formation,
       wherein the at least one receiver volume is at least one human-made cavern or at least one horizontal wellbore,
       wherein the at least one human-made cavern extends vertically downwards below the terminal location into the deep salt formation,
       wherein the at least one horizontal wellbore extends horizontally from the terminal location into the deep salt formation;
   (c) installing at least one retractable liner into the at least one vertical wellbore and into the at least one horizontal wellbore, from the predetermined surface location to a toe of the at least one horizontal wellbore, including with an upper portion of the least one retractable liner passing through the at least one vertical wellbore, wherein the toe of the at least one horizontal wellbore is a distal portion of the at least one horizontal wellbore disposed further away from the predetermined surface location along the at least one horizontal wellbore;
   (d) depositing at least one unit of the radioactive material within the at least one receiver volume, with the at least one unit of the radioactive material traveling from the predetermined surface location to the at least one receiver volume through the at least one vertical wellbore;
   (e) eradicating the initial boundary between the deep salt formation and the at least one receiver volume by creep of the deep salt formation into the at least one receiver volume, such that the at least one unit of the radioactive material is entirely encased within the deep salt formation and the at least one unit of the radioactive material is in physical contact with the deep salt formation;
   after the at least one retractable liner is installed in the step (c), then before, during, or after the step (d), the method comprises a step (f) of retracting a bottom distal portion of the at least one retractable liner away from the toe, such that a region of the at least one horizontal wellbore is without the at least one retractable liner; such that after execution of the step (d) and after the execution of the step (f), the at least one unit of the radioactive material that was deposited into the at least one horizontal wellbore is capable of being in direct physical contact with at least a portion of the deep salt formation.

2. The method according to claim 1, wherein the deep salt formation is located at least ten thousand feet vertically below the predetermined surface location, such that the terminal location is located below this ten thousand feet.

3. The method according to claim 1, wherein the deep salt formation is comprised mostly of at least one mobile evaporate.

4. The method according to claim 3, wherein the at least one mobile evaporate is mostly sodium chloride.

5. The method according to claim 1, wherein the deep salt formation has a creep rate that is selected from a range of 0.01 inches per day to 0.10 inches per day.

6. The method according to claim 1, wherein the deep salt formation has a vertical dimension of at least one kilometer that extends vertically below the terminal location.

7. The method according to claim 1, wherein the deep salt formation has a horizontal dimension of at least one kilometer.

8. The method according to claim 1, wherein prior to the step (d), the method comprises a step of installing at least one casing string within the at least one vertical wellbore.

9. The method according to claim 8, wherein the method comprises cementing the at least one casing string in place.

10. The method according to claim 1, wherein prior to the step (d), the method comprises a step of evacuating residual wellbore fluids from the at least one human-made cavern by using a gas to push or a pump system to lift the residual wellbore fluids out of the at least one human-made cavern.

11. The method according to claim 1, wherein after at least the step (d), the method further comprises a step of installing at least one plug within the at least one vertical wellbore, wherein the at least one plug once installed seals off the at least one unit of radioactive material deposited into the deep salt formation from the predetermined surface location.

12. The method according to claim 1, wherein prior to the step (a) the method comprises a step of determining the predetermined surface location by analyzing geological data and geophysical data associated with at least one candidate surface site and of at least one formation located below the at least one candidate surface site, such that the at least one formation exhibits parameters that meet requirements for the deep salt formation.

13. The method according to claim 1, wherein prior to the step (a) the method comprises a step of determining the predetermined surface location by analyzing core sample test data from at least one formation that is located below at least one candidate surface site, such that the core sample test data meets requirements for the deep salt formation.

14. The method according to claim 1, wherein prior to the step (d), the method comprises a step of preparing the at least one unit of the radioactive material for the step (d), by sealing some amount of the radioactive material into at least one capsule, such that the at least one capsule with the some amount of the radioactive material is the at least one unit of the radioactive material that is deposited in the step (d).

15. A method for disposing of radioactive material within a deep salt formation, wherein the method comprises steps of:
   (a) drilling at least one vertical wellbore downwards from a predetermined surface location to a terminal location, wherein the terminal location is located within the deep salt formation;

(b) forming at least one receiver volume within the deep salt formation from the terminal location of the least one vertical wellbore, wherein the at least one receiver volume is configured to receive at least some of the radioactive material, wherein the at least one receiver volume is fashioned out from the deep salt formation and has an initial boundary that delineates between the at least one receiver volume and the deep salt formation, wherein the at least one receiver volume is at least one human-made cavern or at least one horizontal wellbore, wherein the at least one human-made cavern extends vertically downwards below the terminal location into the deep salt formation, wherein the at least one horizontal wellbore extends horizontally from the terminal location into the deep salt formation;

(c) installing at least one retractable liner into the at least one vertical wellbore and into the at least one horizontal wellbore, from the predetermined surface location to a toe of the at least one horizontal wellbore, including with an upper portion of the least one retractable liner passing through the at least one vertical wellbore, wherein the toe of the at least one horizontal wellbore is a distal portion of the at least one horizontal wellbore disposed further away from the predetermined surface location along the at least one horizontal wellbore;

(d) depositing at least one unit of the radioactive material within the at least one receiver volume, with the at least one unit of the radioactive material traveling from the predetermined surface location to the at least one receiver volume through the at least one vertical wellbore; and (e) eradicating the initial boundary between the deep salt formation and the at least one receiver volume by creep of the deep salt formation into the at least one receiver volume, such that the at least one unit of the radioactive material is entirely encased within the deep salt formation and the at least one unit of the radioactive material is in physical contact with the deep salt formation; and after the at least one retractable liner is installed in the step (c), the method comprises a step (f) of depositing a plurality of radioactive materials into the at least one horizontal wellbore, wherein the step (f) occurs prior to the step (e); wherein after the step (f) and before the step (e), the method comprises a step (g) of retracting all of the least one retractable liner out from the at least one horizontal wellbore; such that after execution of the step (f) and after the execution of the step (g), the plurality of radioactive materials that was deposited into the at least one horizontal wellbore is capable of being in direct physical contact with at least a portion of the deep salt formation.

* * * * *